(12) United States Patent
Sato

(10) Patent No.: US 9,123,130 B2
(45) Date of Patent: Sep. 1, 2015

(54) IMAGE PROCESSING DEVICE AND METHOD WITH HIERARCHICAL DATA STRUCTURE

(75) Inventor: Kazushi Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 167 days.

(21) Appl. No.: 13/977,573

(22) PCT Filed: Dec. 26, 2011

(86) PCT No.: PCT/JP2011/080066
§ 371 (c)(1),
(2), (4) Date: Jun. 28, 2013

(87) PCT Pub. No.: WO2012/093611
PCT Pub. Date: Jul. 12, 2012

(65) Prior Publication Data
US 2013/0287309 A1     Oct. 31, 2013

(30) Foreign Application Priority Data
Jan. 7, 2011   (JP) .................................. 2011-002451

(51) Int. Cl.
G06K 9/36      (2006.01)
G06T 9/20      (2006.01)
H04N 19/176    (2014.01)
H04N 19/70     (2014.01)
H04N 19/119    (2014.01)
H04N 19/162    (2014.01)
H04N 19/174    (2014.01)

(52) U.S. Cl.
CPC ................ *G06T 9/20* (2013.01); *H04N 19/119* (2014.11); *H04N 19/162* (2014.11); *H04N 19/174* (2014.11); *H04N 19/176* (2014.11); *H04N 19/70* (2014.11)

(58) Field of Classification Search
None
See application file for complete search history.

(56) References Cited

U.S. PATENT DOCUMENTS 8,532,185 B2 *   9/2013   Jung et al. ................. 375/240.12
8,861,587 B2 *   10/2014  Sjoberg et al. ................ 375/240
2012/0106652 A1 *  5/2012  Huang et al. ............. 375/240.25

FOREIGN PATENT DOCUMENTS

WO       WO98/10591        3/1998
WO       WO2012/011858 A1  1/2012

OTHER PUBLICATIONS

Jie Zhao, et al., "New Results using Entropy Slices for Parallel Decoding", Jul. 16-18, 2008, pp. 1-9, ITU—Telecommunications Standardization Sector, Video Coding Experts Group (VCEG), 35th Meeting: Berlin, Germany.

(Continued)

*Primary Examiner* — Chan Park
*Assistant Examiner* — Eueng-Nan Yeh
(74) *Attorney, Agent, or Firm* — Sherr & Jiang, PLLC

(57) ABSTRACT

The present technology includes a setting unit that sets the position of a boundary of image data in an upper hierarchy unit to be in a lower hierarchy unit that is lower than the upper hierarchy unit when the image data is encoded in a unit of encoding with a hierarchical structure; an encoding unit that generates encoded data by encoding the image data according to the position of the boundary set by the setting unit; and an addition unit that adds information on the image data in the upper hierarchy unit before encoded data in an intermediate hierarchy unit that includes the boundary set by the setting unit, is lower than the upper hierarchy unit, and is higher than the lower hierarchy unit. The present technology can be applied to, for example, an image processing device.

12 Claims, 24 Drawing Sheets

(56) References Cited

OTHER PUBLICATIONS

Rickard Sjoberg, et al., "Fine granularity slices", Oct. 7-15, 2010, pp. 1-4, Joint Collaborative Team on Video Coding (JCT-VC) of ITU-T SG16 WP3 and ISO/IEC JTC1/SC29/WG11, $3^{rd}$ Meeting: Guangzhou, China.

Kiran Misra, et al., "Entropy Slices for Parallel Entropy Coding", Jul. 21-28, 2010, pp. 1-5, Joint Collaborative Team on Video Coding (JCT-VC) of ITU-T SG16 WP3 and ISO/IEC JTC1/SC29/WG11, $2^{nd}$ Meeting: Geneva, Switzerland.

"Test Model under Consideration", Jul. 21-28, 2010, pp. 1-180, Joint Collaborative Team on Video Coding (JCT-VC) of ITU-T SG16 WP3 and ISO/IEC JTC1/SC29/WG11, $2^{nd}$ Meeting: Geneva, Switzerland.

* cited by examiner

FIG. 4

| slice_type | Name of Slice_type |
|---|---|
| 0 | P(P slice) |
| 1 | B(B slice) |
| 2 | I(I slice) |
| 3 | SP(SP slice) |
| 4 | SI(SI slice) |
| 5 | P(P slice) |
| 6 | B(B slice) |
| 7 | I(I slice) |
| 8 | SP(SP slice) |
| 9 | SI(SI slice) |

FIG. 10

| (SCU0) | (SCU1) | (SCU4) | (SCU5) |
|  | CU0 |  | CU1 |
| (SCU2) | (SCU3) | (SCU6) | (SCU7) |
| CU2 (SCU8) | CU3 (SCU9) | (SCU12) | (SCU13) |
|  |  |  | CU6 |
| CU4 (SCU10) | CU5 (SCU11) | (SCU14) | (SCU15) |

HEAD ADDRESS OF SLICE 2 = 9

FIG. 11

|  | 0 | 1 | 2 | 3 |
| 0 |  |  |  |  |
|  | CU0 |  | CU1 |  |
| 1 |  |  |  |  |
| 2 | CU2 | CU3 |  |  |
|  |  |  | CU6 |  |
| 3 | CU4 | CU5 |  |  |

HEAD ADDRESS OF SLICE 2 = (1, 2)

HEAD ADDRESS OF SLICE 2 = 3

IMAGE PROCESSING DEVICE AND METHOD WITH HIERARCHICAL DATA STRUCTURE

CROSS REFERENCE TO PRIOR APPLICATION

This application is a National Stage Patent Application of PCT International Patent Application No. PCT/JP2011/080066 (filed on Dec. 26, 2011) under 35 U.S.C. §371, which claims priority to Japanese Patent Application No. 2011-002451 (filed on Jan. 7, 2011), which are all hereby incorporated by reference in their entirety.

TECHNICAL FIELD

The present invention relates to an image processing device and a method, and particularly to an image processing device and a method that can suppress deterioration in control accuracy of data in an upper hierarchy while suppressing deterioration in convenience of data for data having a hierarchical structure even when control accuracy of data in a lower hierarchy deteriorates.

BACKGROUND ART

In recent years, devices that deal with digital image information aim to transmit and accumulate information with high efficiency in such circumstances, and are based on a format of an MPEG (Moving Picture Experts Group), or the like for compressing information using orthogonal transform such as discrete cosine transform and motion compensation using redundancy that is unique for image information have been widely spread to both sides of a distribution of chain of information such as a broadcasting station and the reception of information by general households.

Particularly, MPEG2 (ISO (International Organization for Standardization)/IEC (International Electrotechnical Commission) 13818-2) is defined as a general-purpose image encoding format, and is widely used at present in an extensive range of applications for professionals and consumers as a standard that is inclusively applied to both of interlacing scanning images and sequential scanning images, and standard resolution images and high-definition images. By using the MPEG2 compression format, code quantity (bit rate) of 4 to 8 Mbps is allocated to an interlacing scanning image with a standard resolution having pixels of, for example, 720×480, a code quantity of 18 to 22 Mbps is allocated to an interlacing scanning image with high resolution having pixels of 1920×1088, and thereby a high compression rate and satisfactory image quality can be realized.

The MPEG2 mainly targets encoding with high image quality that is appropriate for broadcasting, but is not suitable for code quantity (bit rate) that is lower than that of MPEG1, in other words, it fails to satisfy an encoding format of a high compression rate. As mobile terminals have been supplied, a need for such an encoding format has been considered to increase, and in response to the need, an MPEG4 encoding format has been standardized. With regard to an image encoding format, the standard was approved as an international standard with the number ISO/IEC 14496-2 in December 1998.

Furthermore, in recent years, standardization of H.26L (ITU-T (International Telecommunication Union Telecommunication Standardization Sector) Q6/16 VCEG (Video Coding Expert Group)) has proceeded for the initial purpose of image encoding for video conferencing. H.26L is known for realizing even higher encoding efficiency, whereas it requires a larger amount of arithmetic operation due to encoding and decoding thereof than existing encoding formats such as MPEG2 or MPEG4. In addition, at present, as a part of an action for MPEG4, standardization to realize even higher encoding efficiency by incorporating a function that is not supported in H.26L into the H.26L as the base has been performed as a Joint Model of Enhanced-Compression Video Coding.

In the schedule of the standardization, the standardization was internationally attained in the name of H.264 and MPEG-4 Part 10 (Advanced Video Coding, hereinafter referred to as AVC) in March 2003.

Furthermore, as an extension of the format, FRExt (Fidelity Range Extension) that includes an encoding tool for business use in, such as RGB, 4:2:2: or 4:4:4 sampling format, 8×8DCT (Discrete Cosine Transform) defined in MPEG-2, and a quantization matrix has been standardized in February 2005, and accordingly, the standardization came to serve as a vehicle used in a wide range of applications such as Blu-Ray Discs as an encoding format that can satisfactorily express even film noise included in videos using AVC.

However, in recent years, the need for encoding with an even higher compression rate such as the desire to compress an image having about 4000×2000 pixels, which is four times larger than a high-vision image, or to distribute a high-vision image in an environment with a limited transmission capacity such as the Internet have soared. For this reason, VCEG (Video Coding Expert Group) under the ITU-T continues discussions about improvements in encoding efficiency.

Meanwhile, at present, for the purpose of further improving encoding more efficiency than AVC, the ITU-T and the JCTVC (Joint Collaboration Team—Video Coding) that is a standardization group established by both the ISO and IEC promotes standardization of an encoding format which is called HEVC (High Efficiency Video Coding) (for example, refer to Non-Patent Literature 1).

In the HEVC format, a coding unit (CU (Coding Unit)) is defined as a unit of processing that is the same as a macroblock in AVC. A CU does not have the size fixed to be 16×16 pixels different from the macroblock of AVC, but the size is designated in image compression information in respective sequences.

A CU is hierarchically constituted by an LCU (Largest Coding Unit) which is the maximum unit and by an SCU (Smallest Coding Unit) which is the minimum unit. In other words, it can be considered that, broadly, an LCU corresponds to a macroblock of AVC and a CU in a lower hierarchy than the LCU (a CU which is smaller than the LCU) corresponds to a sub macroblock of AVC.

Meanwhile, in order to shorten a processing time of encoding in AVC (in other words, to reduce a processing time by improving a processing speed), for example, there is a method of dividing an encoding process into a plurality of pipe processes in which processes are executed in parallel (hereinafter, referred to as parallelization). For example, in order to parallelize an encoding process for one picture, the one picture may be divided into a plurality of slices. In AVC, division of a picture into slices as above can be performed in units of macroblocks. In other words, one slice is designed to include one or a plurality of macroblocks. For this reason, in syntax, a so-called onion ring structure in which an upper profile completely includes a lower profile is formed.

Accordingly, since a code stream has a hierarchical structure of VCL (Video Coding Layer)-NAL (Network Abstraction Layer), an improvement in random access or error resistance can be realized.

Meanwhile, another method for independently providing an entropy slice that is a slice only for lossless encoding of a slice (a so-called slice in AVC, or the like) for a process of intra-prediction or encoding a motion vector other than lossless encoding has been proposed (for example, refer to Non-Patent Literature 2).

In this case, a lossless encoding process such as CABAC, or CAVLC is not allowed to perform over an entropy slice, but such a process of intra-prediction or encoding a motion vector other than lossless encoding may be performed over an entropy slice.

CITATION LIST

Non Patent Literature

NPL 1: "Test Model under Consideration", JCTVC-B205, Joint Collaborative Team on Video Coding (JCT-VC) of ITU-T SG16 WP3 and ISO/IEC JTC1/SC29/WG112nd Meeting, Geneva, CH, 21-28, July 2010

NPL 2: "New Results using Entropy Slices for Parallel Decoding" by Jie Zhao, Andrew Segall, VCEG-A132, ITU-Telecommunications Standardization SectorSTUDY GROUP 16 Question 6Video Coding Experts Group (VCEG) 35$^{th}$ Meeting, Berlin, Germany, 16-18, July, 2008

SUMMARY OF INVENTION

Technical Problem

However, as the resolution of one picture improves, as described above, the size requirements of an LCU is beginning to increase. To this end, if slice division can be controlled in units of LCUs in the same manner as in macroblocks so as to maintain the onion ring structure in syntax, there is concern that control accuracy in slice division will be lowered as the size of an LCU increases. Since accuracy in parallelization of encoding processes is lowered as the control accuracy in slice division is lowered, there is concern that parallelization with even higher accuracy and an improvement in high processing speed are difficult to be realized.

In addition, if the onion ring structure in syntax collapses, for example, there is concern that convenience of encoded data deteriorates in such a way that random access of encoded data is difficult to be realized, or error resistance is lowered.

Note that there is the same concern described above even in the case of entropy slices as described in Non-Patent Literature 2.

When data of an upper hierarchy includes data of a lower hierarchy with regard to general data having a hierarchical structure, there is concern that control accuracy of the data of the upper hierarchy is lowered to the extent of exceeding a tolerable range due to reduction in control accuracy of the data of the lower hierarchy, which is not limited to image encoding. In addition, if the hierarchical structure collapses, there is concern that convenience of data significantly deteriorates.

The present disclosure considers the above-described circumstances, and aims to suppress deterioration in control accuracy of data of an upper hierarchy while suppressing deterioration in convenience of data in data having a hierarchical structure even when control accuracy of data in a lower hierarchy is lowered. Particularly, the disclosure aims to suppress deterioration in control accuracy in slice division while suppressing deterioration in convenience of encoded data even when the size of an LCU is set to be large in image encoding.

Solution to Problem

According to an aspect of the present disclosure, there is provided an image processing device that includes a setting unit that sets the position of a boundary of image data in an upper hierarchy unit to be in a lower hierarchy unit that is lower than the upper hierarchy unit when the image data is encoded in a unit of encoding with a hierarchical structure; an encoding unit that generates encoded data by encoding the image data according to the position of the boundary set by the setting unit; and an addition unit that adds information on the image data in the upper hierarchy unit before encoded data in an intermediate hierarchy unit that includes the boundary set by the setting unit, is lower than the upper hierarchy unit, and is higher than the lower hierarchy unit.

The upper hierarchy unit may be a slice, the intermediate hierarchy unit may be an LCU (Largest Coding Unit), and the lower hierarchy unit may be a CU (Coding Unit).

The information on the image data in the upper hierarchy unit may be a slice header of the encoded data.

A computation unit that computes a slice boundary address indicating the position of the boundary set by the setting unit and a generation unit that generates the slice header that includes the slice boundary address computed by the computation unit may be further included and the addition unit may add the slice header generated by the generation unit before the LCU that includes the boundary.

When a plurality of boundaries of slices are set in one LCU by the setting unit, the addition unit may add the slice header of a slice of which the boundary thereof serves as the head before the LCU.

The slice boundary address may be information indicating the position of the boundary in a data processing order in a unit of SCU (Smallest Coding Unit) within the LCU.

The slice boundary address may be information indicating the position of the boundary in the coordinates in a unit of SCU (Smallest Coding Unit) in the horizontal direction and the vertical direction within the LCU.

The slice boundary address may be information indicating the position of the boundary in a data processing order in a unit of CU within the LCU.

The upper hierarchy unit may be an entropy slice, the intermediate hierarchy unit may be an LCU (Largest Coding Unit), and the lower hierarchy unit may be a CU (Coding Unit).

According to another aspect of the present disclosure, there is provided an image processing method of an image processing device which includes setting, by a setting unit, the position of a boundary of image data in an upper hierarchy unit to be in a lower hierarchy unit that is lower than the upper hierarchy unit when the image data is encoded in a unit of encoding with a hierarchical structure; generating, by an encoding unit, encoded data by encoding the image data according to the position of the set boundary; and adding, by an addition unit, information on the image data in the upper hierarchy unit before encoded data in an intermediate hierarchy unit that includes the set boundary, is lower than the upper hierarchy unit, and is higher than the lower hierarchy unit.

According to still another aspect of the present disclosure, there is provided an image processing device which includes an extraction unit that extracts information on image data in an upper hierarchy unit added before encoded data in an intermediate hierarchy unit that includes a boundary of the image data in the upper hierarchy unit set in a lower hierarchy unit that is lower than the upper hierarchy unit, is lower than the upper hierarchy unit, and is higher than the lower hierarchy unit from encoded data obtained by encoding the image data in a unit of encoding with a hierarchical structure; a decision unit that decides the position of the boundary of the image data in the upper hierarchy unit based on the information on the image data in the upper hierarchy unit extracted by the extraction unit; and a decoding unit that decodes the encoded data according to the position of the boundary of the image data in the upper hierarchy unit decided by the decision unit.

The upper hierarchy unit may be a slice, the intermediate hierarchy unit may be an LCU (Largest Coding Unit), and the lower hierarchy unit may be a CU (Coding Unit).

The information on the image data in the upper hierarchy unit may be a slice header of the encoded data.

An address decoding unit that decodes encoded data of a slice boundary address indicating the position of the boundary of a slice included in the slice header extracted by the extraction unit may be further included, and the decision unit decides a CU that serves as the boundary of the slice based on the slice boundary address obtained from decoding by the address decoding unit.

The slice boundary address may be information indicating the position of the boundary in a data processing order in a unit of SCU (Smallest Coding Unit) within the LCU.

The slice boundary address may be information indicating the position of the boundary in the coordinates in a unit of SCU (Smallest Coding Unit) in the horizontal direction and the vertical direction within the LCU.

The slice boundary address may be information indicating the position of the boundary in a data processing order in a unit of CU within the LCU.

When one LCU includes a plurality of boundaries of slices, and a plurality of slice headers are added before the LCU, the extraction unit may extract each slice header added before the LCU, and the decision unit may decide the positions of the boundaries of each slice based on each slice header.

The upper hierarchy unit may be an entropy slice, the intermediate hierarchy unit may be an LCU (Largest Coding Unit), and the lower hierarchy unit may be a CU (Coding Unit).

According to still another aspect of the present disclosure, there is provided an image processing method of an image processing device which includes extracting, by an extraction unit, information on image data in an upper hierarchy unit added before encoded data in an intermediate hierarchy unit that includes a boundary of the image data in the upper hierarchy unit set in a lower hierarchy unit that is lower than the upper hierarchy unit, is lower than the upper hierarchy unit, and is higher than the lower hierarchy unit from encoded data obtained by encoding the image data in a unit of encoding with a hierarchical structure; deciding, by a decision unit, the position of the boundary of the image data in the upper hierarchy unit based on the extracted information on the image data in the upper hierarchy unit; and decoding, by a decoding unit, the encoded data according to the decided position of the boundary of the image data in the upper hierarchy unit.

According to the aspect of the present disclosure, the position of a boundary of image data in an upper hierarchy unit is set in a lower hierarchy unit that is lower than the upper hierarchy unit when the image data is encoded in a unit of encoding with a hierarchical structure, an encoding unit that generates encoded data by encoding the image data according to the position of the boundary set by the setting unit, and information on the image data in the upper hierarchy unit is added before encoded data in an intermediate hierarchy unit that includes the set boundary, is lower than the upper hierarchy unit, and is higher than the lower hierarchy unit.

According to another of the present disclosure, information on image data in an upper hierarchy unit added before encoded data in an intermediate hierarchy unit that includes a boundary of the image data in the upper hierarchy unit set in a lower hierarchy unit that is lower than the upper hierarchy unit, is lower than the upper hierarchy unit, and is higher than the lower hierarchy unit is extracted from encoded data obtained by encoding the image data, the position of the boundary of the image data in the upper hierarchy unit is decided based on the extracted information on the image data in the upper hierarchy unit, and the encoded data is decoded according to the decided position of the boundary of the image data in the upper hierarchy unit.

Advantageous Effects of Invention

According to the present disclosure, images can be processed. Particularly, in data having a hierarchical structure, deterioration in control accuracy of data in an upper hierarchy can be suppressed while deterioration in convenience of data is suppressed even when control accuracy of data in a lower hierarchy is lowered. For example, even when the size of an LCU is set to be large in image encoding, deterioration in control accuracy in slice division can be suppressed while deterioration in convenience of encoded data is suppressed.

BRIEF DESCRIPTION OF DRAWINGS

FIG. 4 is a diagram showing examples of slice types defined in the AVC encoding format.

FIG. 10 is a diagram describing an example of a method for designating a slice boundary address.

FIG. 11 is a diagram describing another example of the method for designating a slice boundary address.

DESCRIPTION OF EMBODIMENTS

Hereinafter, preferred embodiments to implement the present technology (hereinafter, referred to as embodiments) will be described. Note that description will be provided in the following order.

1. First Embodiment (Image Encoding Device)
2. Second Embodiment (Image Decoding Device)
3. Third Embodiment (Personal Computer)
4. Fourth Embodiment (Television Receiver Set)
5. Fifth Embodiment (Mobile Telephone)
6. Sixth Embodiment (Hard Disk Recorder)
7. Seventh Embodiment (Camera)

<1. First Embodiment>

[Image Encoding Device of AVC Encoding Format]

Figure 1:
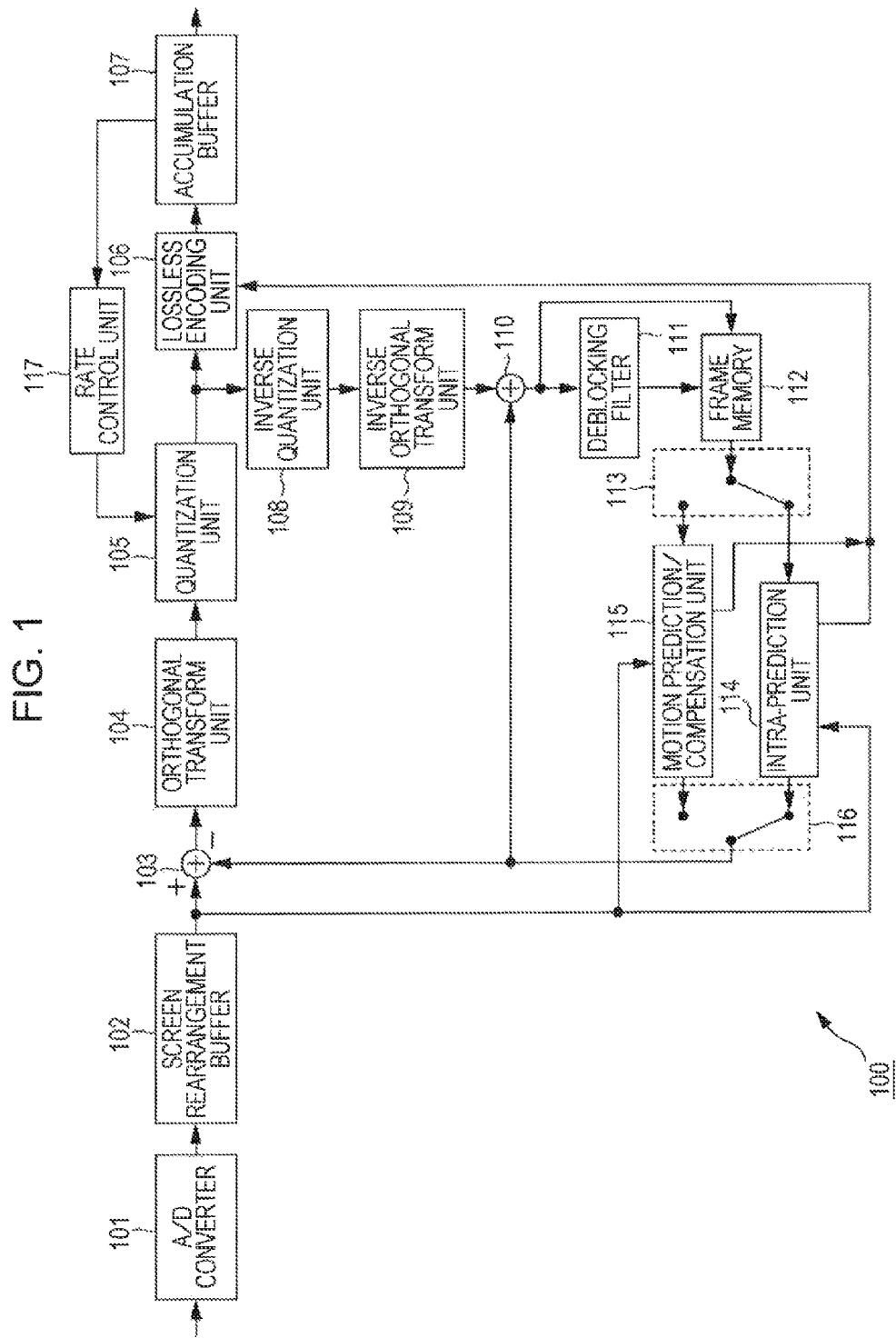
FIG. 1 is a block diagram showing an image encoding device that outputs image compression information based on an AVC encoding format.

FIG. 1 shows a configuration of an embodiment of an image encoding device that encodes images in an encoding format of H.264 and MPEG (Moving Picture Experts Group) 4 Part 10 (AVC (Advanced Video Coding)).

The image encoding device 100 shown in FIG. 1 is a device that encodes and outputs images in an encoding format based on the AVC standard. As shown in FIG. 1, the image encoding device 100 has an A/D converter 101, a screen rearrangement buffer 102, an arithmetic operation unit 103, an orthogonal transform unit 104, a quantization unit 105, a lossless encoding unit 106, and an accumulation buffer 107. In addition, the image encoding device 100 has an inverse quantization unit 108, an inverse orthogonal transform unit 109, an arithmetic operation unit 110, a deblocking filter 111, a frame memory 112, a selection unit 113, an intra-prediction unit 114, a motion prediction/compensation unit 115, a selection unit 116, and a rate control unit 117.

The A/D converter 101 performs A/D conversion on input image data, outputs the result to the screen rearrangement buffer 102 so as to be stored. The screen rearrangement buffer 102 rearranges the stored images with frames in display order in order of frames for encoding according to a GOP (Group of Picture) structure. The screen rearrangement buffer 102 supplies the images of which the order of the frames is rearranged to the arithmetic operation unit 103. In addition, the screen rearrangement buffer 102 also supplies the images of which the order of the frames is rearranged to the intra-prediction unit 114 and the motion prediction/compensation unit 115.

The arithmetic operation unit 103 subtracts a prediction image supplied from the intra-prediction unit 114 or the motion prediction/compensation unit 115 via the selection unit 116 from an image read out from the screen rearrangement buffer 102, and then outputs difference information thereof to the orthogonal transform unit 104.

In the case of an image for which intra-encoding is performed, for example, the arithmetic operation unit 103 subtracts a prediction image supplied from the intra-prediction unit 114 from the image read out from the screen rearrangement buffer 102. In addition, in the case of an image for which inter-coding is performed, for example, the arithmetic operation unit 103 subtracts the prediction image supplied from the motion prediction/compensation unit 115 from the image read out from the screen rearrangement buffer 102.

The orthogonal transform unit 104 performs orthogonal transform such as discrete cosine transform, or Karhunen-Loeve transform on the difference information supplied from the arithmetic operation unit 103, and supplies the transform coefficient to the quantization unit 105.

The quantization unit 105 quantizes a transform coefficient output by the orthogonal transform unit 104. The quantization unit 105 sets a quantization parameter based on information on a target value of code quantity supplied from the rate control unit 117 and performs quantization. The quantization unit 105 supplies the quantized transform coefficient to the lossless encoding unit 106.

The lossless encoding unit 106 performs lossless encoding such as variable length encoding or arithmetic encoding on the quantized transform coefficient. Since the coefficient data is quantized under the control of the rate control unit 117, the code quantity is the target value set by the rate control unit 117 (or approximate to the target value).

The lossless encoding unit 106 acquires information indicating intra-prediction from the intra-prediction unit 114, and acquires information indicating an intra-prediction mode, motion vector information, or the like from the motion prediction/compensation unit 115. Note that information indicating intra-prediction (in-screen prediction) is hereinafter also referred to as intra-prediction mode information. In addition, information indicating an information mode indicating inter-prediction (inter-screen prediction) is hereinafter also referred to as inter-prediction mode information.

The lossless encoding unit 106 encodes the quantized transform coefficient, and sets various kinds of information including a filter coefficient, intra-prediction mode information, inter-prediction mode information, a quantization parameter, so as to be a part of header information of encoded data (multiplexing). The lossless encoding unit 106 supplies the encoded data obtained from the encoding to the accumulation buffer 107 so as to be accumulated.

For example, the lossless encoding unit 106 performs a lossless encoding process such as variable length encoding or arithmetic encoding. As variable length encoding, CAVLC (Context-Adaptive Variable Length Coding) defined in the H.264/AVC format, or the like is exemplified. As arithmetic encoding, CABAC (Context-Adaptive Binary Arithmetic Coding), or the like is exemplified.

The accumulation buffer 107 temporarily stores the encoded data supplied from the lossless encoding unit 106, and outputs the data to, for example, a recording device, a transmission path, or the like not shown in the latter part of the drawing at a predetermined timing as encoded image that is encoded in the H.264/AVC format.

In addition, the transform coefficient quantized in the quantization unit 105 is also supplied to the inverse quantization unit 108. The inverse quantization unit 108 inversely quantizes the quantized transform coefficient in a method corresponding to quantization by the quantization unit 105. The inverse quantization unit 108 supplies the obtained transform coefficient to the inverse orthogonal transform unit 109.

The inverse orthogonal transform unit 109 performs inverse orthogonal transform on the supplied transform coefficient in a method corresponding to an orthogonal transform process by the orthogonal transform unit 104. An output inversely orthogonal transformed (restored difference information) is supplied to the arithmetic operation unit 110.

The arithmetic operation unit 110 adds a prediction image supplied from the intra-prediction unit 114 or the motion prediction/compensation unit 115 via the selection unit 116 to the result of inverse orthogonal transform supplied from the inverse orthogonal transform unit 109, that is, the restored difference information, and obtains an image that is locally decoded (decoded image).

When the difference information corresponds to an image for which intra-encoding is performed, for example, the arithmetic operation unit 110 adds the prediction image supplied from the intra-prediction unit 114 to the difference information. In addition, when the difference information corresponds to an image for which inter-encoding is performed, for example, the arithmetic operation unit 110 adds the prediction image supplied from the motion prediction/compensation unit 115 to the difference information.

The results of the addition are supplied to the deblocking filter 111 or the frame memory 112.

The deblocking filter 111 removes block distortion of the decoded image by appropriately performing a deblocking filtering process. The deblocking filter 111 supplies the result of the filtering process to the frame memory 112. Note that the decoded image output from the arithmetic operation unit 110 can be supplied to the frame memory 112 without passing the deblocking filter 111. In other words, the deblocking filtering process by the deblocking filter 111 can be omitted.

The frame memory 112 stores the supplied decoded image, and outputs the stored decoded image to the intra-prediction unit 114 or the motion prediction/compensation unit 115 via the selection unit 113 at a predetermined timing as a reference image.

When the image is an image for which intra-encoding is performed, for example, the frame memory 112 supplies the reference image to the intra-prediction unit 114 via the selection unit 113. In addition, when the image is an image for which inter-encoding is performed, for example, the frame memory 112 supplies the reference image to the motion prediction/compensation unit 115 via the selection unit 113.

When the reference image supplied from the frame memory 112 is an image for which intra-encoding is performed, the selection unit 113 supplies the reference image to the intra-prediction unit 114. In addition, when the reference image supplied from the frame memory 112 is an image for which inter-encoding is performed, the selection unit 113 supplies the reference image to the motion prediction/compensation unit 115.

The intra-prediction unit 114 performs intra-prediction (in-screen prediction) for generating a prediction image using a pixel value in a picture to be processed that is supplied from the frame memory 112 via the selection unit 113. The intra-prediction unit 114 performs the intra-prediction in a plurality of modes (intra-prediction mode) prepared in advance.

The H.264 image information encoding format can define an intra 4×4 prediction mode, an intra 8×8 prediction mode, and an intra 16×16 prediction mode for luminance signals, and can define a prediction mode for each macroblock for color difference signals, independently of the luminance signals. One intra-prediction mode is defined for respective 4×4 luminance blocks in the intra 4×4 prediction mode, and for respective 8×8 luminance blocks in the intra 8×8 prediction mode. One prediction mode is respectively defined for one macroblock in the intra 16×16 prediction mode and color difference signals.

The intra-prediction unit 114 generates prediction images in all candidate intra-prediction modes, evaluates a cost function value of each of the prediction images using an input image supplied from the screen rearrangement buffer 102, and then selects an optimum mode. When an optimum intra-prediction mode is selected, the intra-prediction unit 114 supplies prediction images generated in the optimum mode to the arithmetic operation units 103 and 110 via the selection unit 116.

In addition, as described above, the intra-prediction unit 114 appropriately supplies information such as intra-prediction mode information indicating an employed intra-prediction mode to the lossless encoding unit 106.

The motion prediction/compensation unit 115 performs motion prediction (inter-prediction) on an image for which inter-encoding is performed using the input image supplied from the screen rearrangement buffer 102 and the reference image supplied from the frame memory 112 via the selection unit 113, performs a motion compensation process according to a detected motion vector, and thereby generates a prediction image (inter-prediction image information). The motion prediction/compensation unit 115 performs such inter-prediction in a plurality of modes (inter-prediction modes) prepared in advance.

The motion prediction/compensation unit 115 generates prediction images in all candidate inter-prediction modes, evaluates a cost function value of each of the prediction images, and then selects an optimum mode. The motion prediction/compensation unit 115 supplies the generated prediction images to the arithmetic operation units 103 and 110 via the selection unit 116.

In addition, the motion prediction/compensation unit 115 supplies inter-prediction mode information indicating an employed inter-prediction mode and motion vector information indicating a computed motion vector to the lossless encoding unit 106.

The selection unit 116 supplies an output of the intra-prediction unit 114 to the arithmetic operation units 103 and 110 in the case of an image for which intra-encoding is performed, and supplies an output of the motion prediction/compensation unit 115 to the arithmetic operation units 103 and 110 in the case of an image for which inter-encoding is performed.

The rate control unit 117 controls a rate of a quantization operation of the quantization unit 105 based on compressed images accumulated in the accumulation buffer 107 so as not to cause overflow or underfloor.

[Image Decoding Device of AVC Encoding Format]

Figure 2:
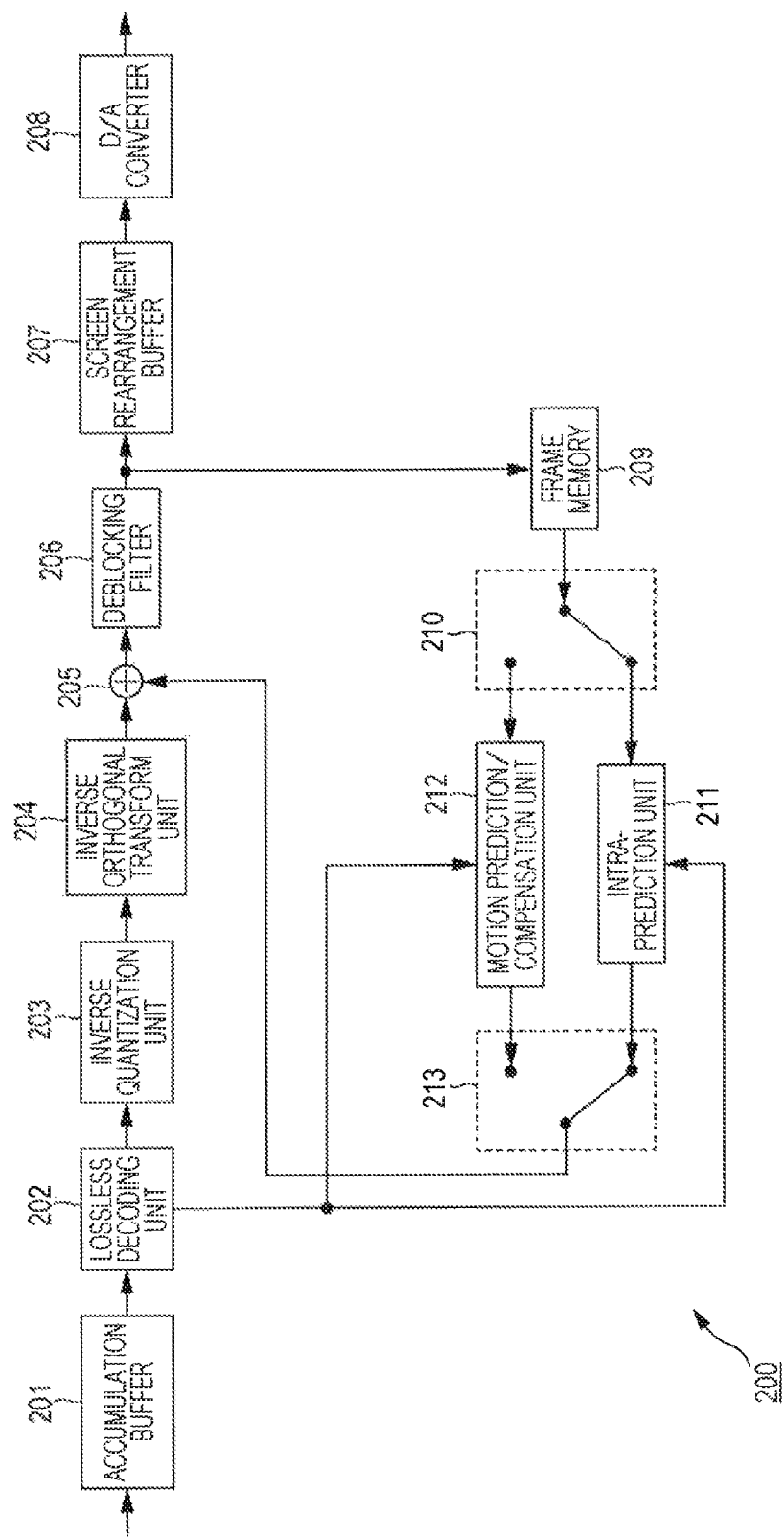
FIG. 2 is a block diagram showing an image decoding device that outputs image compression information based on the AVC encoding format.

FIG. 2 is a block diagram showing a principal configuration example of an image decoding device that realizes image compression using orthogonal transform such as discrete cosine transform, or Karhunen-Loeve transform and motion compensation. The image decoding device 200 shown in FIG. 2 is a decoding device corresponding to the image encoding device 100 of FIG. 1.

Encoded data encoded by the image encoding device 100 is supplied to the image decoding device 200 corresponding to the image encoding device 100 via an arbitrary path, for example, a transmission path, a recording medium, or the like and then decoded.

As shown in FIG. 2, the image decoding device 200 has an accumulation buffer 201, a lossless decoding unit 202, an inverse quantization unit 203, an inverse orthogonal transform unit 204, an arithmetic operation unit 205, a deblocking filter 206, a screen rearrangement buffer 207, and a D/A converter 208. In addition, the image decoding device 200 has a frame memory 209, a selection unit 210, an intra-prediction unit 211, a motion prediction/compensation unit 212, and a selection unit 213.

The accumulation buffer 201 accumulates transmitted encoded data. This encoded data is encoded by the image encoding device 100. The lossless decoding unit 202 decodes the encoded data read out from the accumulation buffer 201 at a predetermined timing in a format corresponding to the encoding format of the lossless encoding unit 106 of FIG. 1.

In addition, when a corresponding frame is intra-encoded, a header portion of the encoded data stores intra-prediction mode information. The lossless decoding unit 202 also decodes the intra-prediction mode information, and supplies the information to the intra-prediction unit 211. On the other hand, when a corresponding frame is inter-encoded, the header portion of the encoded data stores motion vector information. The lossless decoding unit 202 also decodes the motion vector information and supplies the information to the motion prediction/compensation unit 212.

The inverse quantization unit 203 inversely quantizes coefficient data obtained from decoding of the lossless decoding unit 202 (quantization coefficient) in a scheme corresponding to a quantization scheme of the quantization unit 105 of FIG. 1. In other words, the inverse quantization unit 203 performs inverse quantization of a quantization coefficient in the same method as in the inverse quantization unit 108 of FIG. 1.

The inverse quantization unit 203 supplies the inversely quantized coefficient data, that is, an orthogonal transform coefficient to the inverse orthogonal transform unit 204. The inverse orthogonal transform unit 204 performs inverse orthogonal transform on the orthogonal transform coefficient in the scheme corresponding to an orthogonal transform scheme of the orthogonal transform unit 104 of FIG. 1 (the same scheme as that of the inverse orthogonal transform unit 109 of FIG. 1), and acquires decoding remainder data corresponding to remainder data that has not orthogonally transformed in the image encoding device 100. For example, quaternary inverse orthogonal transform is performed.

The decoding remainder data obtained from inverse orthogonal transform is supplied to the arithmetic operation unit 205. In addition, a prediction image is supplied from the intra-prediction unit 211 or the motion prediction/compensation unit 212 to the arithmetic operation unit 205 via the selection unit 213.

The arithmetic operation unit 205 adds the decoding remainder data and the prediction image together, and obtains decoded image data corresponding to image data from which the prediction image has not been subtracted by the arithmetic operation unit 103 of the image encoding device 100. The arithmetic operation unit 205 supplies the decoded image data to the deblocking filter 206.

The deblocking filter 206 removes block distortion of the supplied decoded image, and then supplies the image to the screen rearrangement buffer 207.

The screen rearrangement buffer 207 performs rearrangement for the image. In other words, the order of frames rearranged in the encoding order by the screen rearrangement buffer 102 of FIG. 1 is rearranged in the original display order. The D/A converter 208 performs D/A conversion for the image supplied from the screen rearrangement buffer 207, outputs the image to a display not shown in the drawing to cause the image to be displayed.

The output of the deblocking filter 206 is further supplied to the frame memory 209.

The frame memory 209, the selection unit 210, the intra-prediction unit 211, the motion prediction/compensation unit 212, and the selection unit 213 are respectively corresponding to the frame memory 112, the selection unit 113, the intra-prediction unit 114, the motion prediction/compensation unit 115, and the selection unit 116 of the image encoding device 100.

The selection unit 210 reads out an image that has been inter-processed and an image to be referenced from the frame memory 209, and supplies the images to the motion prediction/compensation unit 212. In addition, the selection unit 210 reads out an image to be used in intra-prediction from the frame memory 209, and supplies the image to the intra-prediction unit 211.

The lossless decoding unit 202 appropriately supplies information indicating an intra-prediction mode obtained by decoding header information, or the like, to the intra-prediction unit 211. The intra-prediction unit 211 generates a prediction image from the reference image acquired from the frame memory 209 based on this information, and supplies the generated prediction image to the selection unit 213.

The motion prediction/compensation unit 212 acquires information obtained by decoding the header information (prediction mode information, motion vector information, reference frame information, flags, and various parameters, and the like) from the lossless decoding unit 202.

The motion prediction/compensation unit 212 generates a prediction image from the reference image acquired from the frame memory 209 based on such information supplied from the lossless decoding unit 202, and supplies the generated prediction image to the selection unit 213.

The selection unit 213 selects a prediction image generated by the motion prediction/compensation unit 212 or the intra-prediction unit 211, and supplies the image to the arithmetic operation unit 205.

[Slice of AVC]

In an image encoding format such as MPEG2 or AVC, one picture can be divided into a plurality of slices, and each of the slices can be processed in parallel.

Figure 3:
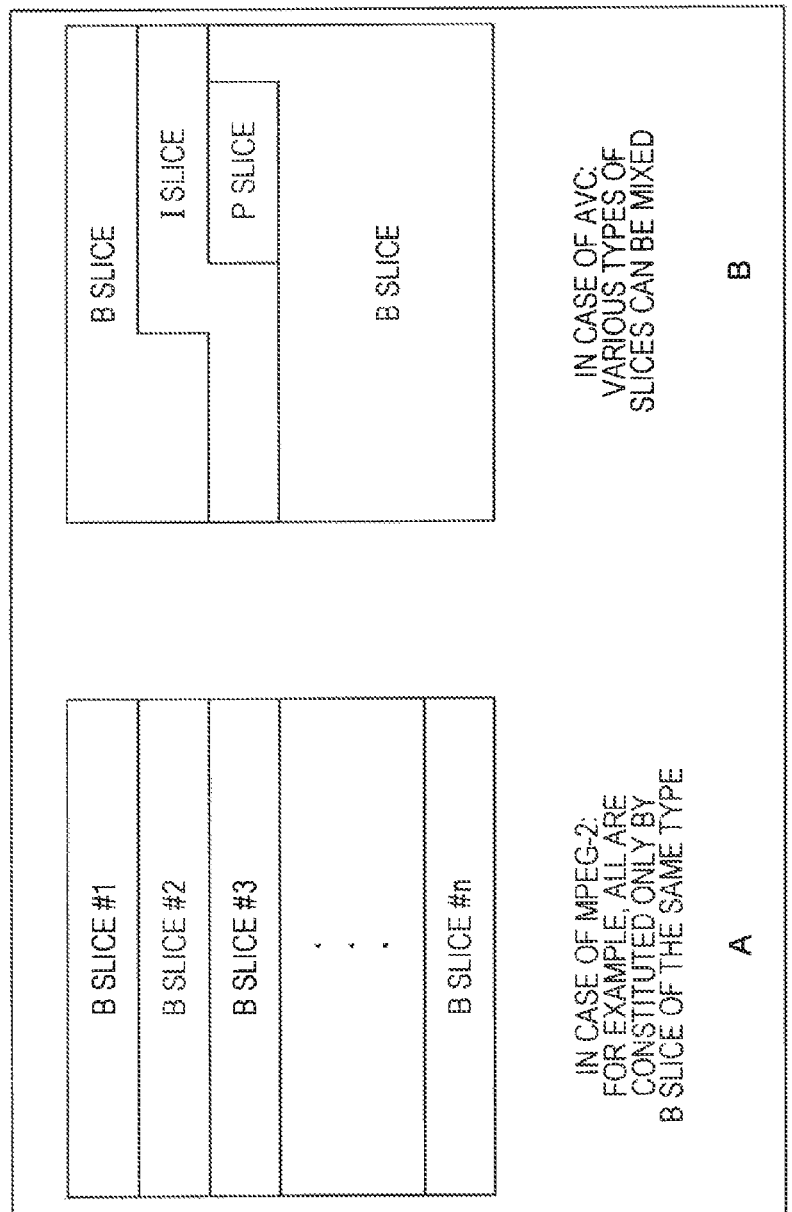
FIG. 3 is a diagram showing an example of slice division defined in the AVC encoding format.

In the case of MPEG2, the maximum size of a slice is one macroblock line, and slices constituting the B picture should all be B slices as shown in A of FIG. 3.

On the other hand, in the case of AVC, a slice may be greater than one macroblock line, and a boundary of slices may not be on the right end (right end of a screen) of a macroblock line, and a single picture may be constituted by different types of slices as shown in B of FIG. 3.

In the case of AVC, slices having the types as shown in, for example, FIG. 4 are defined.

Note that, in the case of AVC, a deblocking filtering process can be executed over slice boundaries. However, a process using adjacent information such as intra-prediction, CABAC, CAVLC, and motion vector prediction cannot be executed over slice boundaries.

In other words, since encoding processes of each of slices can be executed independently of each other, one picture can be divided into a plurality of slices, and each of the slices can be encoded in parallel. After all, with such slice division, reduction in an encoding processing time (speed-up of an encoding process) can be realized.

[Cost Function]

Meanwhile, selecting a suitable prediction mode is important to attain even higher encoding efficiency in the AVC encoding format.

As an example of such a selection scheme, the method loaded in the reference software of H/264/MPEG-4 AVC which is called JM (Joint Model) disclosed in http://iphome-.hhi.de/suchring/tml/index.htm can be exemplified.

In the JM, two mode determination methods of a High Complexity Mode and a Low Complexity Mode to be described below can be selected. In both methods, a cost function value of each prediction mode is computed, and a prediction mode that has the computed value as a minimum value is selected as an optimum mode for a corresponding block and macroblock.

The cost function in the High Complexity Mode is as shown in Formula (1) below.

$$\text{Cost}(\text{Mode} \in \Omega) = D + \lambda * R \quad (1)$$

Wherein, $\Omega$ is a universal set of candidate modes for encoding the block and macroblock, D is differential energy of a decoded image and an input image when encoding is performed in a corresponding prediction mode. $\lambda$ is a Lagrange undetermined multiplier given as a function of a quantization parameter. R is a total code quantity including an orthogonal transform coefficient when encoding is performed in the corresponding mode Mode.

After all, in order to compute the parameters D and R for encoding in the High Complexity Mode, it is necessary to perform a provisional encoding process once in all candidate modes (Mode), which requires a larger amount of arithmetic operation.

The cost function in the Low Complexity Mode is as shown in Formula (2) below.

$$\text{Cost}(\text{Mode} \in \Omega) = D + QP2\text{Quant}(QP) * \text{HeaderBit} \quad (2)$$

Wherein, D is differential energy of a prediction image and an input image, different from the case of the High Complexity Mode. QP2Quant(QP) is given as a function of a quantization parameter QP, and HeaderBit is code quantity of information that belongs to a header such as a motion vector or a mode, which does not include an orthogonal transform coefficient.

In other words, in the Low Complexity Mode, it is necessary to perform a prediction process in each of the candidate modes (Mode), but it is not necessary to even perform an encoding process because a decoded image is not necessary. For this reason, a smaller amount of an arithmetic operation than the High Complexity Mode can be realized.

[Coding Unit]

Hereinafter, a coding unit (Coding Unit) that is defined in an HEVC encoding format will be first described.

A coding unit (CU) is also called a coding tree block (CTB), and is a partial region of an image in a picture unit playing the same role as a macroblock in AVC. Whereas the latter has a fixed size of 16×16 pixels, the former does not have a fixed size, and has a designated size based on image compression information in each sequence.

Particularly, a CU having a maximum size is called an LCU (Largest Coding Unit), and a CU having a minimum size is called an SCU (Smallest Coding Unit). For example, in a sequence parameter set (SPS) included in image compression information, the sizes of regions of the units are designated, but they are square shapes, and limited to sizes expressed by power of two.

Figure 5:
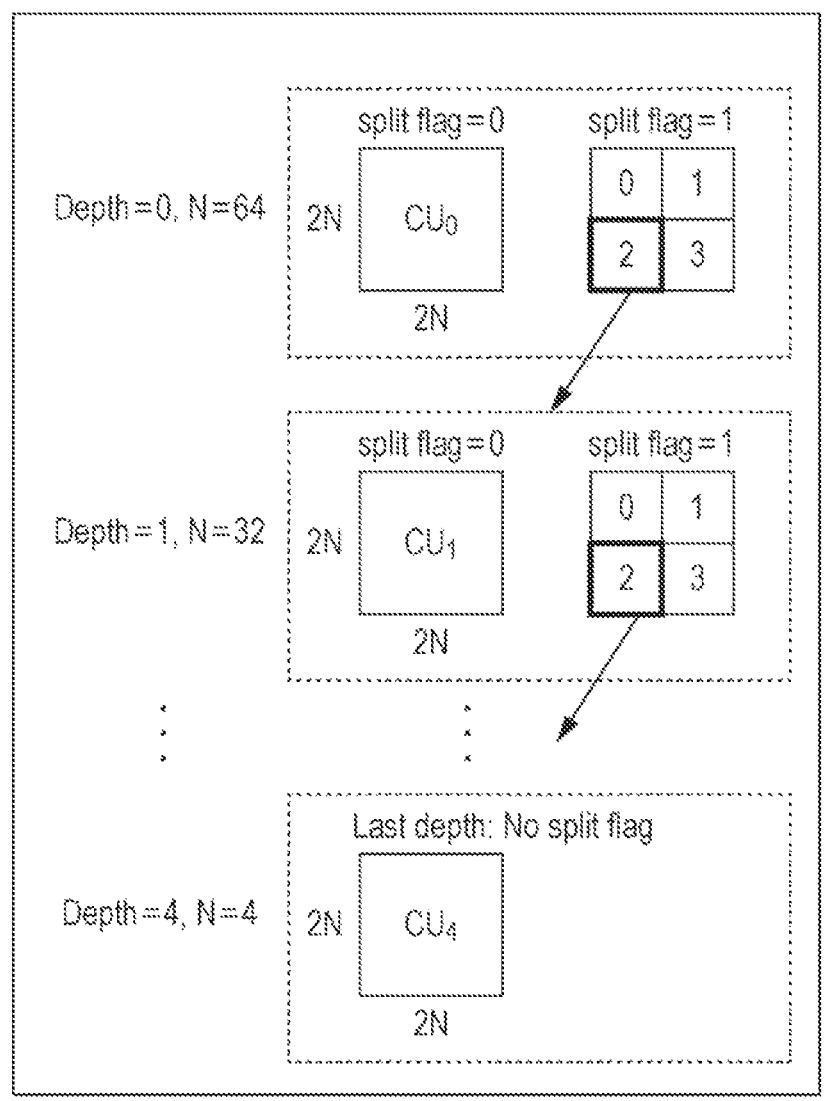
FIG. 5 is a diagram describing a configuration example of a coding unit.

FIG. 5 shows an example of coding units (Coding Unit) defined in HEVC. In the example of FIG. 5, the size of an LCU is 128, and the maximum hierarchical depth is 5. When the value of split_flag is "1", a CU having the size of 2N×2N is divided into a CU having the size of N×N that is in a hierarchy one step lower.

Furthermore, a CU is divided into prediction units (Prediction Unit (PU)) that is a region that serves as a processing unit of intra- or inter-prediction (partial region of an image in a picture unit), or divided into a transform unit (Transform Unit (TU)) that is a region that serves as a processing unit of orthogonal transform (partial region of an image in a picture unit). Currently in HEVC, 16×16 and 32×32 orthogonal transform can be used in addition to 4×4 and 8×8.

[Parallelization of Encoding Process]

When a process is performed in units of coding units (CU) as above, it is necessary to dispose a slice header between LCUs in order to form a so-called onion ring structure in which a high profile completely includes a low profile in syntax. Thus, a proposal has been made to set an LCU as a control unit of slice division.

However, when resolution of one picture improves, as described above, there is concern that the size of an LCU also increase, and accuracy in controlling slice division deteriorates. After all, there is concern that a dividing position of a slice can only be defined in a larger unit.

When, for example, slice division is performed based on data amounts so that the data amounts of each slice are substantially equal, if a unit of slice division increases, adjustment accuracy of the data amounts of each slice deteriorates, and thus, there is concern that data amounts between slices are difficult to be adjusted.

Thus, in this embodiment, the unit of controlling slice division is set to a CU of which the size is smaller than an LCU. By doing this, a processing unit becomes smaller, and thus, reduction in control accuracy of slice division caused by increase of resolution of an image, or the like can be suppressed.

However, if slice division is performed among CUs inside an LCU so that a slice boundary is located in the LCU, and a slice header is located in the LCU, the LCU does not included in slices, and thus, the onion ring structure of syntax collapse.

Figure 6:
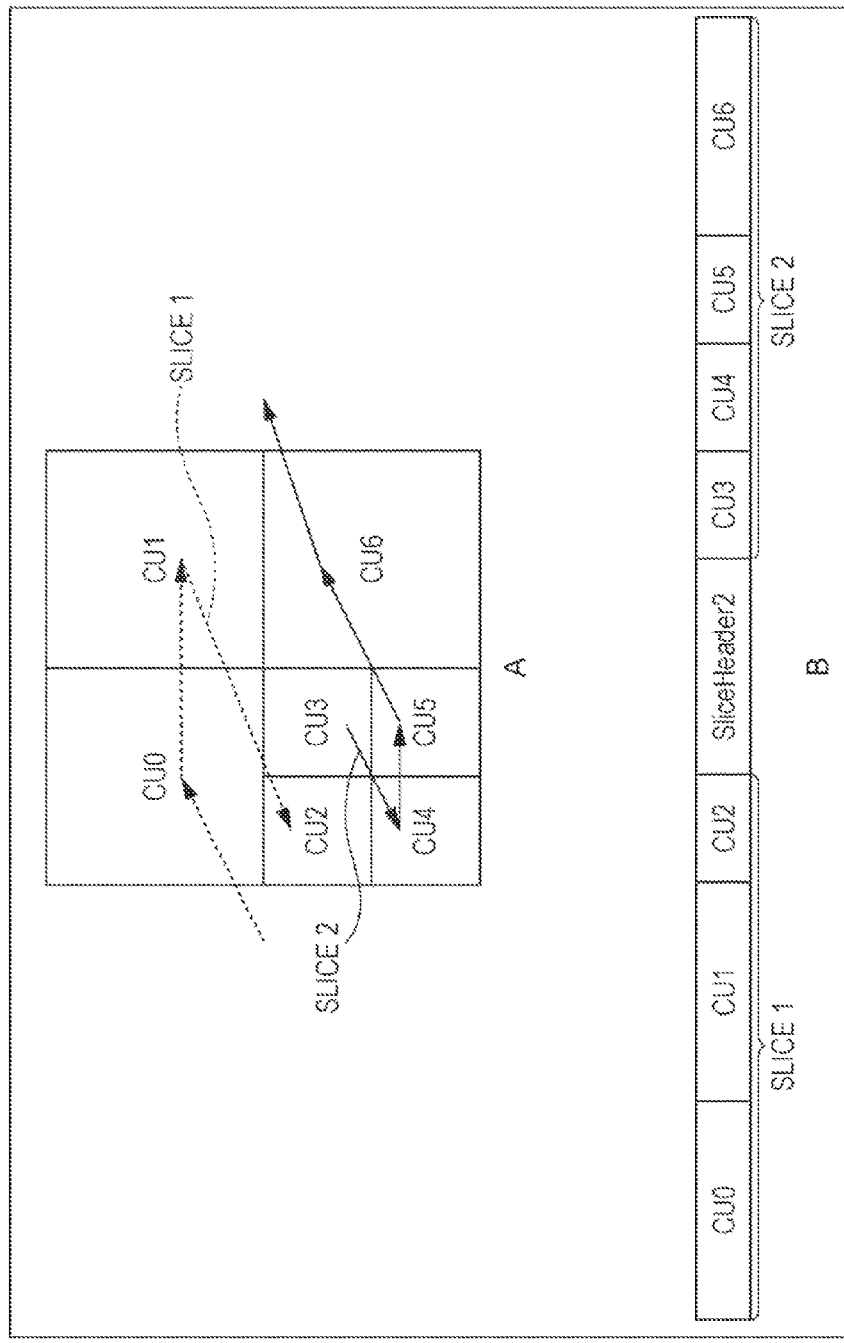
FIG. 6 is a diagram describing an example of a slice header and slice division.

As shown in A of FIG. 6 for example, it is assumed that slices are divided in a CU3 in an LCU constituted by 7 CUs (CU0 to CU6). In this case, the CU0 to CU2 are included in a "slice 1" as indicated by the dotted arrows, and the CU3 to CU6 are included in a "slice 2" as indicated by the solid arrows.

Thus, as shown in B of FIG. 6, a header of the slice 2 (SliceHeader2) is provided between the slice 1 and slice 2, in other words, between the CU2 and CU3. If a code stream is set to have this structure, a slice header that is an NAL is interposed between CU data that is a VCL, and thereby there is concern that an onion ring structure cannot be established in syntax.

If the onion ring structure collapses in syntax in that manner, there is concern that controlling on the premise of the onion ring structure is difficult. For example, there is concern that random access of a code stream is difficult to be realized. In addition, there is concern that packet loss in transmission of a code stream, or the like is difficult to be compensated, and error resistance of the code stream thereby decreases. In this manner, deterioration in convenience of the code stream is concerned.

When data generally has a hierarchical structure in which an upper hierarchy includes a lower hierarchy as above, if control accuracy of the data of the lower hierarchy is lowered, control accuracy of data of the upper hierarchy is also lowered, which is not limited to image encoding. There is concern that such effect becomes profound as data has a higher hierarchy, and control accuracy is further lowered to the extent of exceeding a tolerable range.

Thus, in this embodiment, by improving control accuracy of data of an upper hierarchy while maintaining an inclusive relationship of a data management structure in which an upper hierarchy includes a lower hierarchy in data having a hierarchical structure, reduction in control accuracy of the data in the upper hierarchy can be suppressed while suppressing deterioration of convenience of data even when control accuracy of data of a lower hierarchy is lowered. Particularly, in image encoding, by setting control accuracy of slice division in CU units while maintaining the onion ring structure in syntax, reduction in control accuracy of slice division can be suppressed while suppressing deterioration of convenience of encoded data.

[Entropy Slice]

Meanwhile, it is necessary to divide one picture into a plurality of slices as described above to perform parallelization in AVC. However, since adjacent information between slices cannot be used in an encoding process, there is concern that encoding efficiency decreases.

Thus, Non-Patent Literature 2 described above has proposed to set an entropy slice separate from a general slice. The entropy slice is a slice for encoding processes. In other words, lossless encoding processes such as CABAC, CAVLC, or the like should not be performed over entropy slices, but processes such as intra-prediction or encoding motion vectors other than lossless encoding can be performed over entropy slices.

Setting entropy slices in that manner and using them in encoding processes can further suppress reduction in encoding efficiency than dividing one picture into a plurality of slices.

The method described below can be applied also to such entropy slices.

[Image Encoding Device]

Figure 7:
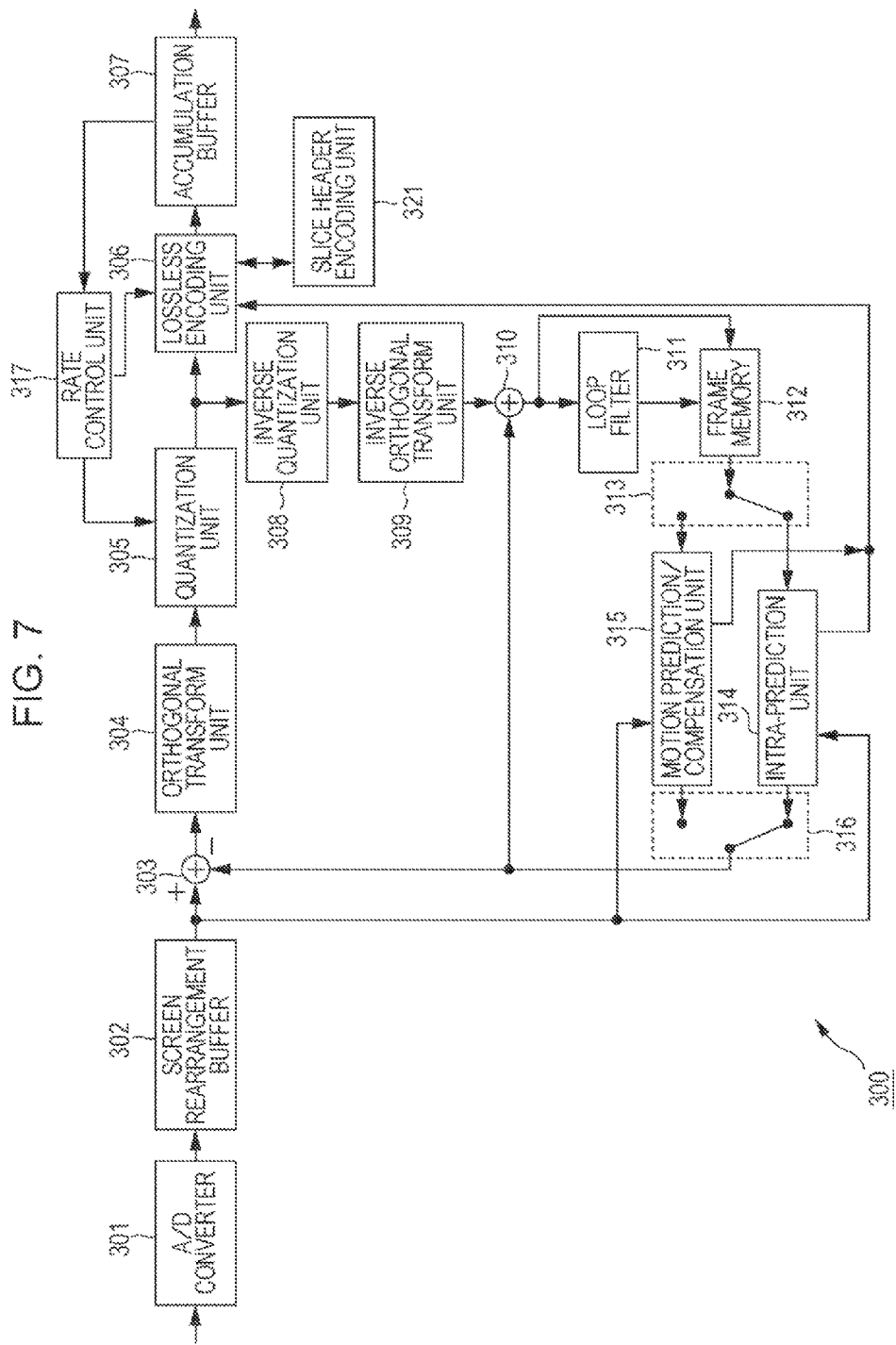
FIG. 7 is a block diagram showing a principal configuration example of an image encoding device.

FIG. 7 is a block diagram showing a principal configuration example of an image encoding device.

The image encoding device 300 shown in FIG. 7 is basically the same device as the image encoding device 100 of FIG. 1, encoding image data. The image encoding device 300 has an A/D converter 301, a screen rearrangement buffer 302, an arithmetic operation unit 303, an orthogonal transform unit 304, a quantization unit 305, a lossless encoding unit 306, and an accumulation buffer 307 as shown in FIG. 7. In addition, the image encoding device 300 has an inverse quantization unit 308, an inverse orthogonal transform unit 309, an arithmetic operation unit 310, a loop filter 311, a frame memory 312, a selection unit 313, an intra-prediction unit 314, a motion prediction/compensation unit 315, a selection unit 316, and a rate control unit 317.

The image encoding device 300 further has a slice header encoding unit 321.

The A/D converter 301 performs A/D conversion on input image data in the same manner as the A/D converter 101. The A/D converter 301 supplies the converted image data (digital data) to the screen rearrangement buffer 302 so as to be stored. The screen rearrangement buffer 302 rearranges the stored image with frames in a display order in frame orders for encoding according to the GOP (Group of Picture) structure in the same manner as the screen rearrangement buffer 102. The screen rearrangement buffer 302 supplies the image of which the order of frame is rearranged to the arithmetic operation unit 303. In addition, the screen rearrangement buffer 302 also supplies the image of which the order of the frames is rearranged to the intra-prediction unit 314 and the motion prediction/compensation unit 315.

The arithmetic operation unit 303 subtracts a prediction image supplied from the intra-prediction unit 314 or the motion prediction/compensation unit 315 via the selection unit 316 from an image read out from the screen rearrangement buffer 302 in the same manner as the arithmetic operation unit 103. The arithmetic operation unit 303 outputs difference information thereof to the orthogonal transform unit 304.

In the case of an image for which intra-encoding is performed, for example, the arithmetic operation unit 303 subtracts a prediction image supplied from the intra-prediction unit 314 from the image read out from the screen rearrangement buffer 302. In addition, in the case of an image for which inter-coding is performed, for example, the arithmetic operation unit 303 subtracts the prediction image supplied from the motion prediction/compensation unit 315 from the image read out from the screen rearrangement buffer 302.

The orthogonal transform unit 304 performs orthogonal transform such as discrete cosine transform, or Karhunen-Loeve transform on the difference information supplied from the arithmetic operation unit 303 in the same manner as the orthogonal transform unit 104. It should be noted that, an arbitrary method for the orthogonal transform may be used. The orthogonal transform unit 304 supplies the transform coefficient to the quantization unit 305.

The quantization unit 305 quantizes a transform coefficient supplied from the orthogonal transform unit 304 in the same manner as the quantization unit 105. The quantization unit 305 sets a quantization parameter based on information on a target value of code quantity supplied from the rate control unit 317 and performs quantization. It should be noted that an arbitrary quantization method may be used. The quantization unit 305 supplies the quantized transform coefficient to the lossless encoding unit 306.

The lossless encoding unit 306 performs lossless encoding such as variable length encoding or arithmetic encoding on the transform coefficient quantized in the quantization unit 305 in the same manner as the lossless encoding unit 106. Since the coefficient data is quantized under the control of the rate control unit 317, this code quantity is the target value set by the rate control unit 317 (or approximate to the target value).

In addition, the lossless encoding unit 306 acquires information indicating an intra-prediction mode, or the like from the intra-prediction unit 314, and acquires motion vector information, or the like indicating an inter-prediction mode from the motion prediction/compensation unit 315. Further, the lossless encoding unit 306 acquires a filter coefficient used in the loop filter 311.

The lossless encoding unit 306 encodes various kinds of information such as the filter coefficient, information indicating intra-prediction and inter-prediction modes, and quantization parameters in the same manner as the lossless encoding unit 106 so as to be a part of header information of encoded data (multiplexing). The lossless encoding unit 306 supplies the encoded data obtained from the encoding to the accumulation buffer 307 so as to be accumulated.

For example, the lossless encoding unit 306 performs a lossless encoding process such as variable length encoding or arithmetic encoding in the same manner as the lossless encoding unit 106. As variable length encoding, CAVLC (Context-Adaptive Variable Length Coding) defined in the H.264/AVC format, or the like is exemplified. As arithmetic encoding, CABAC (Context-Adaptive Binary Arithmetic Coding), or the like is exemplified. Of course, the lossless encoding unit 306 may be set to use methods other than the above methods in encoding.

The accumulation buffer 307 temporarily retains the encoded data supplied from the lossless encoding unit 306 in the same manner as the accumulation buffer 107. The accumulation buffer 307 outputs the retained encoded data to, for example, a recording device (recording medium), a transmission path, or the like not shown in the latter part of the drawing at a predetermined timing.

In addition, the transform coefficient quantized in the quantization unit 305 is also supplied to the inverse quantization unit 308. The inverse quantization unit 308 inversely quantizes the quantized transform coefficient in a method corresponding to quantization by the quantization unit 305 in the same manner as the inverse quantization unit 308. Any method corresponding to a quantization process by the quantization unit 305 may be used as this inverse quantization method. The inverse quantization unit 308 supplies the obtained transform coefficient to the inverse orthogonal transform unit 309.

The inverse orthogonal transform unit 309 performs inverse orthogonal transform on the transform coefficient supplied from the inverse quantization unit 308 in a method corresponding to an orthogonal transform process by the orthogonal transform unit 304 in the same manner as the inverse orthogonal transform unit 109. Any method corresponding to an orthogonal transform process by the orthogonal transform unit 304 may be used as the inverse orthogonal transform method. An output inversely orthogonal transformed (restored difference information) is supplied to the arithmetic operation unit 310.

In the same manner as the arithmetic operation unit 110, the arithmetic operation unit 310 adds a prediction image supplied from the intra-prediction unit 314 or the motion prediction/compensation unit 315 via the selection unit 316 to the result of inverse orthogonal transform supplied from the inverse orthogonal transform unit 309, that is, the restored difference information, and obtains an image that is locally decoded (decoded image).

When the difference information corresponds to an image for which intra-encoding is performed, for example, the arithmetic operation unit 310 adds the prediction image supplied from the intra-prediction unit 314 to the difference information. In addition, when the difference information corresponds to an image for which inter-encoding is performed, for example, the arithmetic operation unit 310 adds the prediction image supplied from the motion prediction/compensation unit 315 to the difference information.

The addition result (decoded image) is supplied to the loop filter 311 or the frame memory 312.

The loop filter 311 includes the deblocking filter 111 or an adaptive loop filter, and appropriately performs a filtering process on the decoded images supplied from the arithmetic operation unit 310. For example, the loop filter 311 removes block distortion of the decoded image by performing the same deblocking filtering process as the deblocking filter 111 on the decoded image. In addition, the loop filter 311 enhances image quality by performing a loop filtering process using a Wiener filter (Wiener Filter) on, for example, the result of the deblocking filtering process (the decoded image of which block distortion is removed).

Note that the loop filter 311 may be set to perform an arbitrary filtering process on a decoded image. In addition, the loop filter 311 may supply a filter coefficient used in a filtering process to the lossless encoding unit 306 so as to be encoded, if necessary.

The loop filter 311 supplies the result of the filtering process (decoded image after the filtering process) to the frame memory 312. It should be noted that, as described above, the decoded image output from the arithmetic operation unit 310 can be supplied to the frame memory 312 without passing the loop filter 311. In other words, the filtering process by the loop filter 311 can be omitted.

The frame memory 312 stores the supplied decoded image and outputs the stored decoded image to the intra-prediction unit 314 or the motion prediction/compensation unit 315 via the selection unit 313 as a reference image at a predetermined timing in the same manner as the memory frame 112.

When the image is an image for which intra-encoding is performed, for example, the frame memory 312 supplies the reference image to the intra-prediction unit 314 via the selection unit 313. In addition, when the image is an image for which inter-encoding is performed, for example, the frame memory 312 supplies the reference image to the motion prediction/compensation unit 315 via the selection unit 313.

When the reference image supplied from the frame memory 312 is an image for which intra-encoding is performed, the selection unit 313 supplies the reference image to the intra-prediction unit 314 in the same manner as the selection unit 113. In addition, when the reference image supplied from the frame memory 312 is an image for which inter-encoding is performed, the selection unit 313 supplies the reference image to the motion prediction/compensation unit 315 in the same manner as the selection unit 113.

The intra-prediction unit 314 performs intra-prediction (in-screen prediction) for generating a prediction image using a value of a pixel in a picture to be processed which is supplied from the frame memory 312 via the selection unit 313. The intra-prediction unit 314 performs the intra-prediction in a plurality of modes (intra-prediction modes) prepared in advance. The intra-prediction unit 314 may perform the intra-prediction in an arbitrary mode other than the modes defined in the AVC encoding format.

The intra-prediction unit 314 generates prediction images in all candidate intra-prediction modes, evaluates a cost function value of each of the prediction images using an input image supplied from the screen rearrangement buffer 102, and then selects an optimum mode. When an optimum intra-prediction mode is selected, the intra-prediction unit 314 supplies prediction images generated in the optimum mode to the arithmetic operation units 303 and 310 via the selection unit 316.

In addition, the intra-prediction unit 314 appropriately supplies information such as intra-prediction mode information indicating an employed intra-prediction mode to the lossless encoding unit 306 so as to be encoded as described above.

The motion prediction/compensation unit 315 performs motion prediction (inter-prediction) on an image for which inter-encoding is performed using the input image supplied from the screen rearrangement buffer 302 and the reference image supplied from the frame memory 312 via the selection unit 313, performs a motion compensation process according to a detected motion vector, and thereby generates a prediction image (inter-prediction image information). The motion prediction/compensation unit 315 performs such inter-prediction in a plurality of modes (inter-prediction modes) prepared in advance. The motion prediction/compensation unit 315 may perform the inter-prediction in an arbitrary mode other than the modes defined in the AVC encoding format.

The motion prediction/compensation unit 315 generates prediction images in all candidate inter-prediction modes, evaluates a cost function value of each of the prediction images, and then selects an optimum mode. The motion prediction/compensation unit 315 supplies the prediction images generated in the optimum mode to the arithmetic operation units 303 and 310 via the selection unit 316 when the optimum inter-prediction mode is selected.

In addition, motion prediction/compensation unit 315 supplies inter-prediction mode information indicating an employed inter-prediction mode and motion vector information indicating a computed motion vector to the lossless encoding unit 306 so as to be encoded.

In the same manner as the selection unit 116, the selection unit 316 supplies an output of the intra-prediction unit 314 to the arithmetic operation units 303 and 310 in the case of an image for which intra-encoding is performed, and supplies an output of the motion prediction/compensation unit 315 to the arithmetic operation units 303 and 310 in the case of an image for which inter-encoding is performed.

The rate control unit 317 controls a rate of quantization operations of the quantization unit 305 based on the encoding amount of encoded data accumulated in the accumulation buffer 307 so as not to cause an overflow or an underfloor.

In addition, the rate control unit 317 supplies code quantity of the encoded data accumulated in the accumulation buffer 307 (generated code quantity) to the lossless encoding unit 306. The lossless encoding unit 306 can perform slice division based on the supplied generated code quantity.

The slice header encoding unit 321 generates a slice header of image data (difference information) encoded in the lossless encoding unit 306. The slice header encoding unit 321 specifies a slice boundary position (slice boundary address) according to the slice structure designated by the lossless encoding unit 306, generates slice header information including the slice boundary address, and then returns the information to the lossless encoding unit 306.

The lossless encoding unit 306 sets the slice structure according to an instruction of a user, specifications, generated code quantity, or the like, performs slice division on the difference information (picture) based on the slice structure, or encodes the slice header information supplied from the slice header encoding unit 321.

[Lossless Encoding Unit and Slice Header Encoding Unit]

Figure 8:
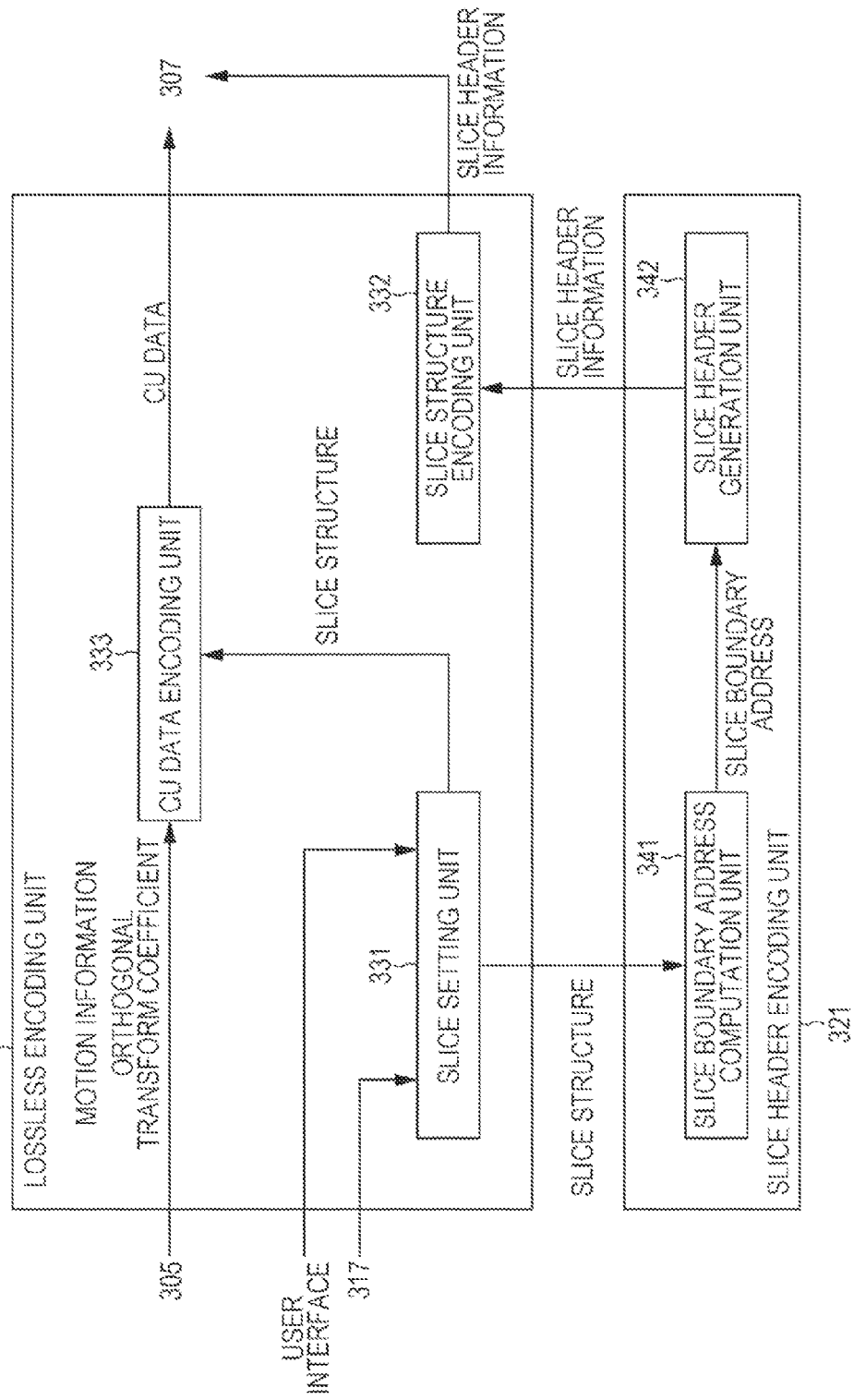
FIG. 8 is a block diagram showing a principal configuration example of a slice header encoding unit and a lossless encoding unit of FIG. 7.

FIG. 8 is a block diagram showing a principal configuration example of the lossless encoding unit 306 and the slice header encoding unit 321 of FIG. 7.

As shown in FIG. 8, the lossless encoding unit 306 has a slice setting unit 331, a slice structure encoding unit 332, and a CU data encoding unit 333.

The slice setting unit 331 sets a slice structure indicating how a picture should be divided into slices based on, for example, a user instruction input via a user interface not shown in the drawing, settings decided in advance (specifications), generated code quantity supplied from the rate control unit 317, or the like. For example the slice setting unit 331 performs slice division for each predetermined number of CUs based on the user instruction, specifications, or the like. In addition, for example, the slice setting unit 331 performs slice division for each predetermined code quantity based on the generated code quantity. Of course, the slice setting unit 331 may perform slice division based on information other than the above.

The slice setting unit 331 controls the position of the slice boundary (end of slice) in units of CUs. That is to say, the slice setting unit 331 sets any CU boundary (end of a CU) as a slice boundary. That is, each slice is constituted by one or a plurality of CUs. In other words, each CU belongs to any one slice.

As will be described in more detail, since the slice setting unit 331 sets a slice boundary as described above, there are cases in which a slice boundary is located in an LCU.

When slice division is performed in setting of a slice boundary in this manner, the slice setting unit 331 supplies a slice structure that is information indicating the state of the slice division to the slide header encoding unit 321.

Any kind of information that indicates how a picture should be divided into slices may be used for the slice structure. For example, information set for each sequence, information set for each picture, information set for each slice, or information set in unit of other data may be possible. The content of the slice structure may at least include information directly or indirectly indicating positions of each slice boundary.

Note that the slice setting unit 331 also supplies the slice structure to the CU data encoding unit 333.

The slice structure encoding unit 332 encodes slice header information that is generated by the slice header encoding unit 321 as information included in a slice header. The slice structure encoding unit 332 supplies the encoded slice header information to the accumulation buffer 307 so as to be accumulated. At this moment, the slice structure encoding unit 332 adds the slice header before the LCU that includes the head of slices. That is to say, the slice structure encoding unit 332 controls supply of encoded slice header information so that the slice header is added before the LCU that includes the head of slices.

The CU data encoding unit 333 encodes VCLs (Video Coding Layers) such as orthogonal transform coefficients (difference information) or motion information supplied from the quantization unit 305 for each CU. An arbitrary method may be used in this encoding (for example, CAVAC, CAVLC, or the like). The CU data encoding unit 333 supplies encoded data of each encoded CU (CU data) to the accumulation buffer 307.

At this moment, the CU data encoding unit 333 executes encoding for each of CUs in parallel for each slice based on the slice structure supplied from the slice setting unit 331. Thus, the CU data encoding unit 333 can further reduce the encoding processing time (further accelerate the encoding process) than when each of the CUs is encoded in series in one pipeline process.

It should be noted that the slice structure used by the CU data encoding unit 333 may be provided in any route. For example, the slice structure encoding unit 332 may generate the slice structure based on the slice header information supplied from the slide header encoding unit 321 (for example, a slice boundary address included in the slice header information), and then provide the slice structure to the CU data encoding unit 333. In addition, for example, the slice structure supplied by the slice setting unit 331 to the slice header encoding unit 321 may be supplied to the slice structure encoding unit 332 from the slice header encoding unit 321 together with the slice header information, or the slice structure encoding unit 332 may supply the slice structure to the CU data encoding unit 333.

As shown in FIG. 8, the slice header encoding unit 321 has a slice boundary address computation unit 341 and a slice header generation unit 342.

The slice boundary address computation unit 341 specifies the position of a slice boundary based on the slice structure supplied from the lossless encoding unit 306, and then computes the slice boundary address indicating the position of the slice boundary. The slice boundary is set in a CU boundary as described above. The slice boundary address computation unit 341 specifies from which CU a slice changes, and then computes information indicating the CU as the slice boundary address.

The slice boundary address computation unit 341 supplies the computed slice boundary address to the slice header generation unit 342.

The slice header generation unit 342 generates slice header information using information on a slice that includes a slice boundary address. The slice header generation unit 342 supplies the slice header information to the slice structure encoding unit 332.

After all of the above, the slice boundary address is included in the slice header and supplied on decoding side.

[Slice Boundary and Slice Header]

Next, a slice boundary and a slice header will be described in more detail.

As described above, since a unit to control the position of a slice boundary is a CU, there are cases in which a slice boundary is located in an LCU. However, in a code stream, a slice header is added before the LCU at all times. To be more specific, the slice header is added before an LCU that includes the head of the slice (slice boundary). Therefore, a unit to control the position of a slice header is an LCU.

Figure 9:
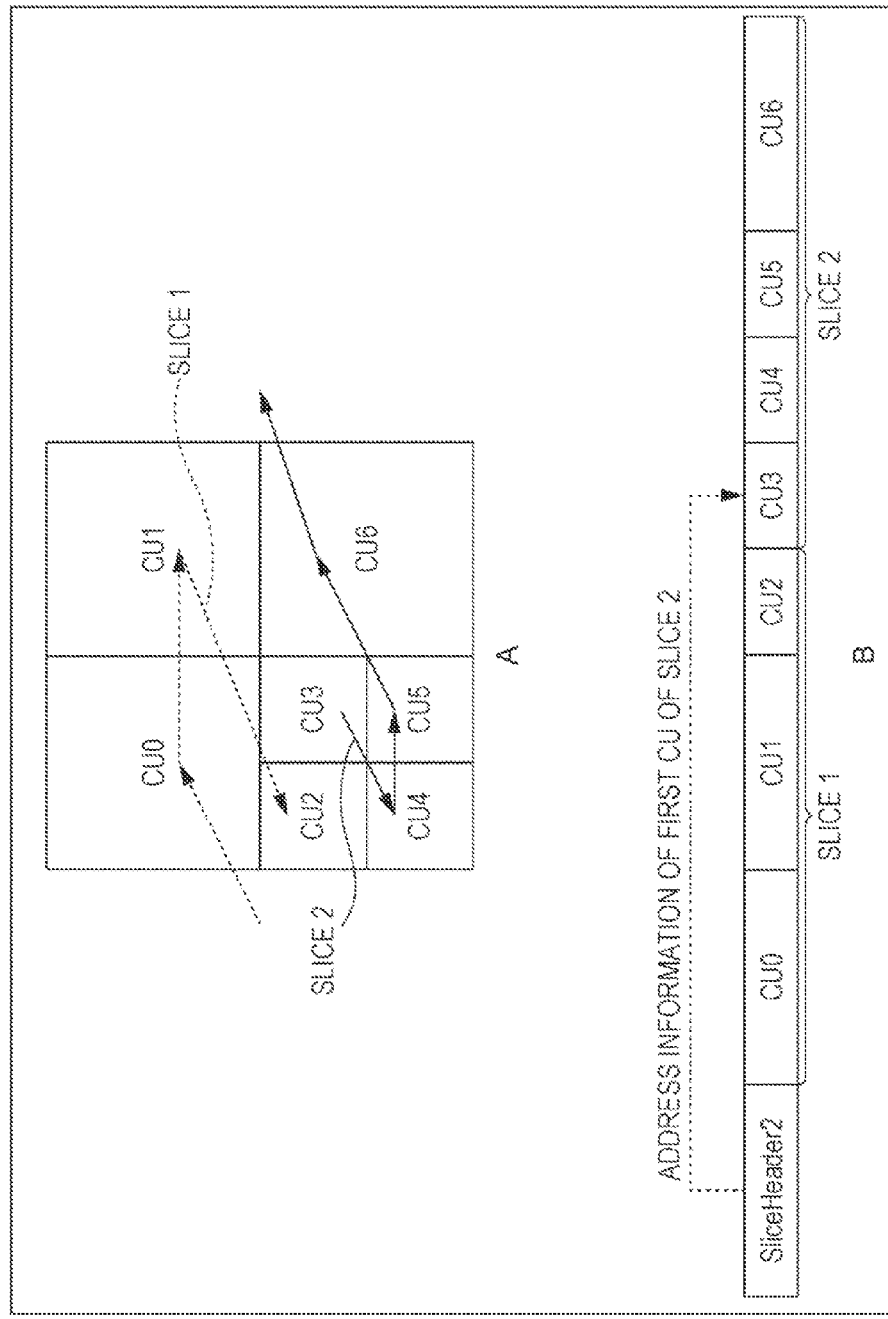
FIG. 9 is a diagram describing another example of a slice header and slice division.

For example, as shown in A of FIG. 9, in an LCU that is constituted by CU0 to CU6 and process in order from CU0 to CU6, CU0 to CU2 belong to a slice 1 and CU3 to CU6 belong to the next slice 2. The header of the slice 2 (SliceHeader2) is added to the head of the LCU (before CU0) that includes the head (CU3) of the slice 2 as shown in B of FIG. 9. Then, in the header of the slice 2 (SliceHeader2), information indicating the position of the head of the slice 2 (CU3) (address information of the first CU of the slice 2) is described to link the header and data.

In this manner, since the positions of slices are controlled in units of CU, it is also possible to compartment slices within the LCU, but by adding the slice header between LCUs, the onion ring structure can be maintained in syntax. Thus, in a code stream, a hierarchical structure such as VCL-NAL can be secured, and random access and error resistance can be guaranteed.

In this manner, the image encoding device 300 can satisfactorily perform slice division with high accuracy while maintaining the onion ring structure in syntax. In other words, the image encoding device 300 can suppress deterioration in control accuracy of slice division while suppressing deterioration in convenience of encoded data.

[Slice Boundary Address]

As described above, a slice boundary address is information indicating a CU that serves as the head of a slice, but an arbitrary method may be used in designating the CU.

As indicated by dotted lines in FIG. 10, for example, an LCU may be divided in units of SCUs, and a CU that serves as the head of the slice 2 may be specified in units of the SCUs. In the example of FIG. 10, the LCU can be divided into 16 SCUs (SCU0 to SCU15). Each of the SUCs is processed in order from SCU0 to SCU15. Each CU in the LCU can be specified in units of the SCUs. In other words, the numbers of the SUCs can be set as the head address of the slice 2 (slice boundary address).

For example, if the head of the slice 2 is set to CU3 as shown in FIG. 9, the CU3 corresponds to SCU9 (SCU processed in $10^{th}$ order) as shown in FIG. 10. Thus, the head address of the slice 2 (slice boundary address) is 9.

In addition, as shown in FIG. 11, the position of the SCU9 may be indicated using two-dimensional information. In the example of FIG. 11, the LCU is divided into 4 SCUs in the horizontal direction×4 SCUs in the vertical direction. That is, the positions of the CUs can be designated in the range of 0 to 3 in the horizontal direction and 0 to 3 in the vertical direction. In the example of FIG. 11, the position of the CU3 that is the head of the slice 2 corresponds to an SCU in $2^{nd}$ order from the left side in the horizontal direction (coordinate 1) and $3^{rd}$ order from the top in the vertical direction (coordinate 2). Thus, the head address of the slice 2 (slice boundary address) is (1,2).

Figure 12:
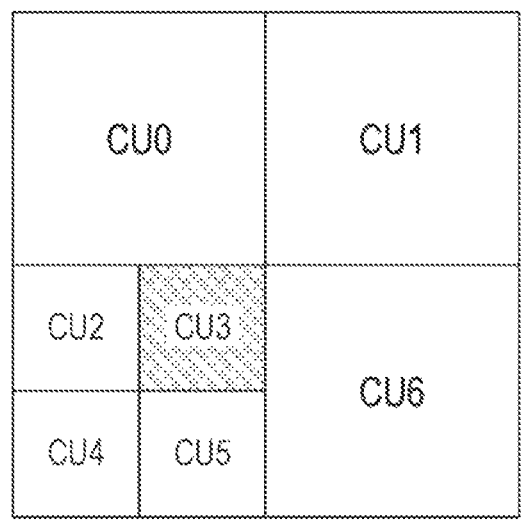
FIG. 12 is a diagram describing still another example of the method for designating a slice boundary address.

Furthermore, as shown in FIG. 12, the CU that serves as the head of the slice 2 (CU3) may be designated in units of CUs. In other words, in this case, the head address of the slice 2 (slice boundary address) is 3.

In the method for expressing a slice boundary address in processing order of SCUs as described referring to FIG. 10 (first method), resolution is high, so it is likely that the information amount of the slice boundary address becomes large. For example, when the head of the slice 2 is CU0, the slice boundary address is 0, and the information amount thereby is small, but when the head of the slice 2 is CU15, the slice boundary address is 15, and the information amount thereby is large. As the number of SCUs included in an LCU increases, the maximum value of an information amount of a slice boundary address increases.

In the method for expressing a slice boundary address using two-dimensional position information in units of SCUs as described referring to FIG. 11 (second method), unevenness in the information amount of the slice boundary address is smaller than that in the method for expressing the slice boundary address in a processing order of SCUs, but two addresses in the horizontal direction and the vertical direction are necessary.

Thus, for example, when the head of the slice 2 is the SCU0, the slice boundary address is (0,0), and the information amount is accordingly greater than in the first method. In addition, for example, when the head of the slice 2 is the CU15, the slice boundary address is (3,3), and the information amount is accordingly smaller than in the first method.

As the information amount of a slice boundary address is smaller, the code quantity of slice header information decreases, and encoding efficiency improves, which is preferable. Whichever method between the first and the second methods is preferable depends on the content of an image. However, in general, since the information amount of a slice boundary information is stable in the second method, it is highly likely that the generated code amount is stable and rate controlling is easy.

In the method for expressing a slice boundary address in processing order of CUs as described referring to FIG. 12 (third method), the maximum value of the slice boundary address is 6, and thus, the information amount of the slice boundary address basically can be further lowered than in the first method. Thus, it is highly likely that encoding efficiency, which actually depends on the content of an image and the structure of CUs, can be further enhanced than in the first and the second methods.

However, in the third method, the structure of CUs may be ascertained in decoding. That is to say, a decoder may ascertain the entire structure of CUs in an LCU by decoding all split flag in order to accurately grasp which CU a slice boundary address indicates.

On the other hand, in the first and second methods, since a slice boundary address is designated in units of SUCs, a decoder can easily ascertain the position of a slice boundary only from the slice boundary address of a slice header.

In the third method, since it is necessary to successively perform decoding processes on split-flag, it is likely that the processing amount increases that much.

Note that an arbitrary method may be used in designating a CU that will serve as the head of a slice, and it may be other than the first to third methods described above.

For example, in the third method, to the head of an LCU, information on how the LCU is divided may be added. By doing this, it is not necessary to successively perform decoding processes on split-flag, but it is likely that the code quantity increases that much.

In addition, for example, the slice setting unit 331 may adaptively select one method out of a plurality of methods prepared in advance for each slice boundary according to, for example, the content of an image, or the like. In this case, information directly or indirectly indicating what method has been used may be included in a slice header, and then supplied on the decoder side.

[LCU]

Note that the case in which a slice boundary is generated in an LCU has been described hereinabove, but a plurality of slice boundaries may be present in one LCU.

Figure 13:
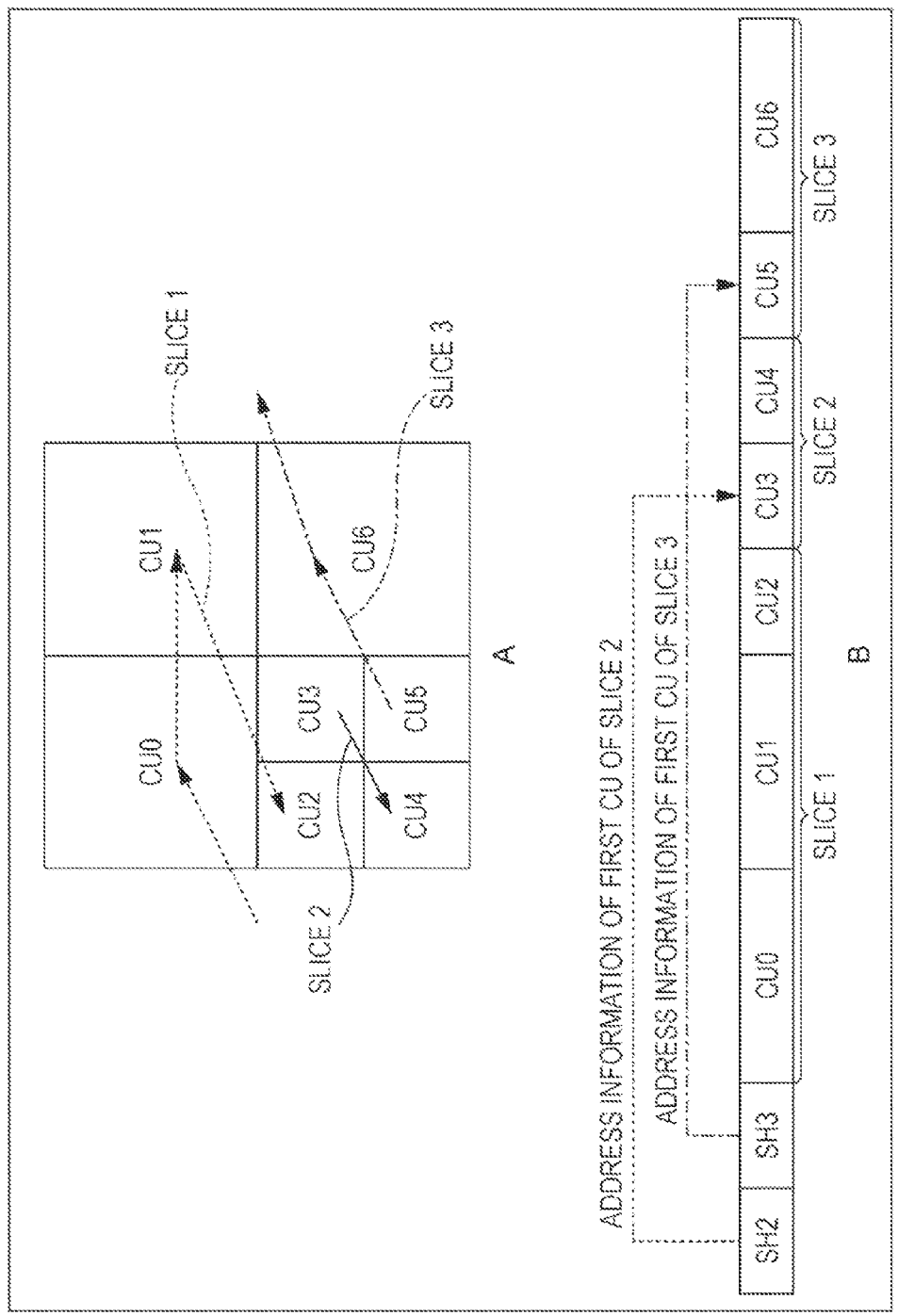
FIG. 13 is a diagram describing still another example of the slice header and slice division.

For example, as shown in A of FIG. 13, it is assumed that CU0 to CU2 belong to a slice 1, CU3 and CU4 belong to a slice 2, and CU5 and CU6 belong to a slice 3. In other words, two slice boundaries of CU3 and CU5 are present in one LCU.

In such a case, for example, both of the header of the slice 2 (SH2) and the header of the slice 3 (SH3) may be added before the LCU as shown in B of FIG. 13. In each of the slice headers, address information of the CUs that serves as the heads of the slices (slice boundary address) is included.

As described above, a plurality of slice headers can be added to one LCU.

Figure 14:
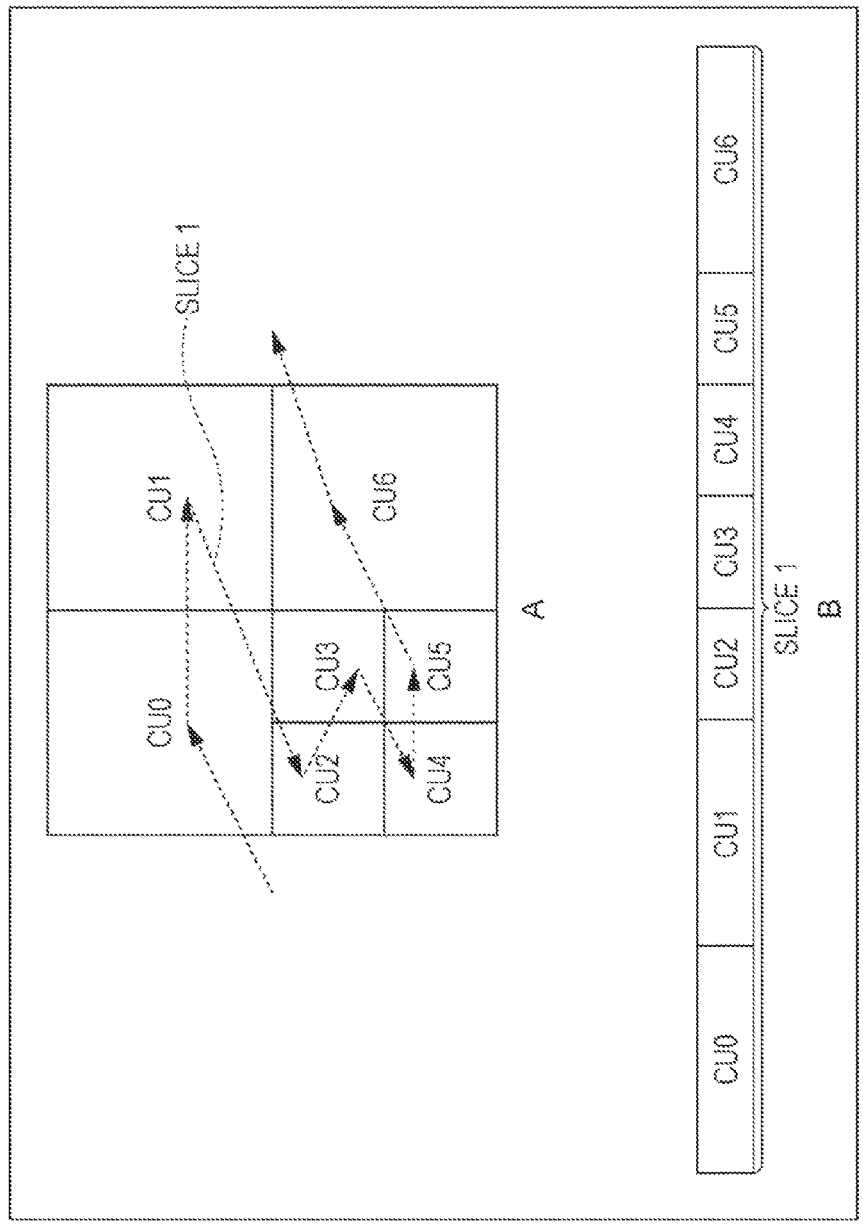
FIG. 14 is a diagram describing an example when there is no slice division.

It should be noted that, for example, when no slice boundary address is present in an LCU as shown in A of FIG. 14, in other words, when all of the CU0 to CU6 belong to the slice 1, a slice header is not included in a code stream of the LCU as shown in B of FIG. 14.

After all of the above, the slice header is added to before the LCU to which a CU that serves as the head of the slice header belongs.

[Flow of Encoding Process]

Next, the flow of each process executed by the image encoding device 300 as described above will be described. First, an example of the flow of an encoding process will be described with reference to the flowchart of FIG. 15.

In Step S301, the A/D converter 301 performs A/D conversion on an input image. In Step S302, the screen rearrangement buffer 302 stores the A/D-converted image, and rearranges the image from the order of displaying each picture to the order of encoding.

In Step S303, the intra-prediction unit 314 performs an intra-prediction process in an intra-prediction mode. In Step S304, the motion prediction/compensation unit 315 performs an inter-motion prediction process to perform motion prediction and motion compensation in an inter-prediction mode.

In Step S305, the selection unit 316 decides an optimum mode based on each cost function value output from the intra-prediction unit 314 and the motion prediction/compensation unit 315. In other words, the selection unit 316 selects either of a prediction image generated by the intra-prediction unit 314 or a prediction image generated by the motion prediction/compensation unit 315.

In addition, selection information that indicates that either prediction image has been selected is supplied to the intra-prediction unit 314 or the motion prediction/compensation unit 315 the prediction image of which has been selected. When a prediction image in an optimum intra-prediction mode is selected, the intra-prediction unit 314 supplies intra-prediction mode information indicating the optimum intra-prediction mode, or the like to the lossless encoding unit 306. When a prediction image in an optimum inter-prediction mode is selected, the motion prediction/compensation unit 315 outputs information indicating the optimum inter-prediction mode and, if necessary, information according to the optimum inter-prediction mode to the lossless encoding unit 306. As the information according to the optimum inter-prediction mode, motion vector information, flag information, reference frame information, and the like are exemplified.

In Step S306, the arithmetic operation unit 303 calculates the difference of the image rearranged in the process of Step S302 and the prediction image selected in the process of Step S305. The prediction image is supplied to the arithmetic operation unit 303 via the selection unit 316 from the motion prediction/compensation unit 315 when inter-prediction is performed, or from the intra-prediction unit 314 when intra-prediction is performed.

The amount of the difference data is reduced in comparison to the original image data. Thus, the data amount can be compressed in comparison to the case in which an image is encoded as it is.

In Step S307, the orthogonal transform unit 304 performs orthogonal transform on the difference information generated in the process of Step S306. To be more specific, orthogonal transform such as discrete cosine transform, Karhunen-Loeve, or the like is performed, and a transform coefficient is output.

In Step S308, the quantization unit 305 quantizes the orthogonal transform coefficient obtained in the process of Step S307.

The difference information quantized in the process of Step S308 is locally decoded as follows. That is, in Step S309, the inverse quantization unit 308 inversely quantizes the orthogonal transform coefficient (also referred to as a quantization coefficient) generated and quantized in the process of Step S308 using the characteristic corresponding to that of the quantization unit 305. In Step S310, the inverse orthogonal transform unit 309 performs inverse orthogonal transform on the orthogonal transform coefficient obtained in the process of Step S307 using the characteristic corresponding to that of the orthogonal transform unit 304.

In Step S311, the arithmetic operation unit 310 adds the prediction image to the difference information that has been locally decoded, and thereby generates a locally decoded image (image corresponding to the input to the arithmetic operation unit 303). In Step S312, the loop filter 311 appropriately performs a loop filtering process such as a deblocking filtering process, an adaptive loop filtering process, or the like, on the locally decoded image obtained in the process of Step S311.

In Step S313, the frame memory 312 stores the decoded image for which the loop filtering process has been performed in the process of Step S312. Note that an image for which a filtering process has not been performed by the loop filter 311 is also supplied from the arithmetic operation unit 310 to the frame memory 312, and stored therein.

In Step S314, the lossless encoding unit 306 encodes the transform coefficient quantized in the process of Step S308. In other words, lossless encoding such as variable length encoding, arithmetic encoding, or the like is performed on the difference image.

It should be noted that the lossless encoding unit 306 encodes the quantized parameter computed in Step S308 and adds the parameter to encoded data. In addition, the lossless encoding unit 306 encodes information on the mode of the prediction image selected in the process of Step S305, and adds the difference image to the encoded data obtained from the encoding. In other words, the lossless encoding unit 306 encodes the optimum intra-prediction mode information supplied from the intra-prediction unit 314 or the optimum inter-prediction mode supplied from the motion prediction/compensation unit 315, or the like, and adds the information to the encoded data.

Furthermore, the lossless encoding unit 306 sets a slice structure, generates slice header information that includes a slice boundary address in the slice header encoding unit 321, or encodes the slice header information so as to be added to the encoded data (CU data).

The accumulation buffer 307 in Step S315 accumulates the encoded data output from the lossless encoding unit 306. The encoded data accumulated in the accumulation buffer 307 is appropriately read out, and transmitted on a decoding side via a transmission path or a recording medium.

In Step S316, the rate control unit 317 controls the rate of the quantization operation of the quantization unit 305 based on the code quantity of the encoded data accumulated in the accumulation buffer 307 in the process of Step S315 (generated code quantity) so as not to cause an overflow or an underfloor. In addition, the rate control unit 317 supplies the generated code quantity to the lossless encoding unit 306.

When the process of Step S316 ends, the encoding process ends.

[Flow of Lossless Encoding Process]

Next, an example of the flow of the lossless encoding process executed in Step S314 of FIG. 15 will be described with reference to the flowchart of FIG. 16.

When the lossless encoding process starts, the slice setting unit 331 sets a slice structure according to a user instruction, specifications, a generated code quantity, or the like, in Step S331. At this moment, the slice setting unit 331 sets the position of each slice boundary in units of CUs.

With decision of each of slices, LCU boundaries between which the slice headers thereof are inserted are also decided. In other words, the slice setting unit 331 sets the position of each slice header in unit of LCUs.

In Step S332, the slice boundary address computation unit 341 computes each slice boundary address based on the slice structure set in Step S331.

In Step S333, the slice header generation unit 342 generates slice header information of each of the slices using information on the slices including the slice boundary address computed in Step S332.

In Step S334, the slice structure encoding unit 332 encodes the slice header information.

In Step S335, the CU data encoding unit 333 encodes CU data based on the slice structure set in Step S331. The CU data encoding unit 333 supplies the encoded CU data to the accumulation buffer 307 so as to be stored therein. The slice structure encoding unit 332 supplies the slice header information encoded in Step S334 to the accumulation buffer 307, and adds the information to the position (LCU boundary) decided in Step S331.

Figure 15:
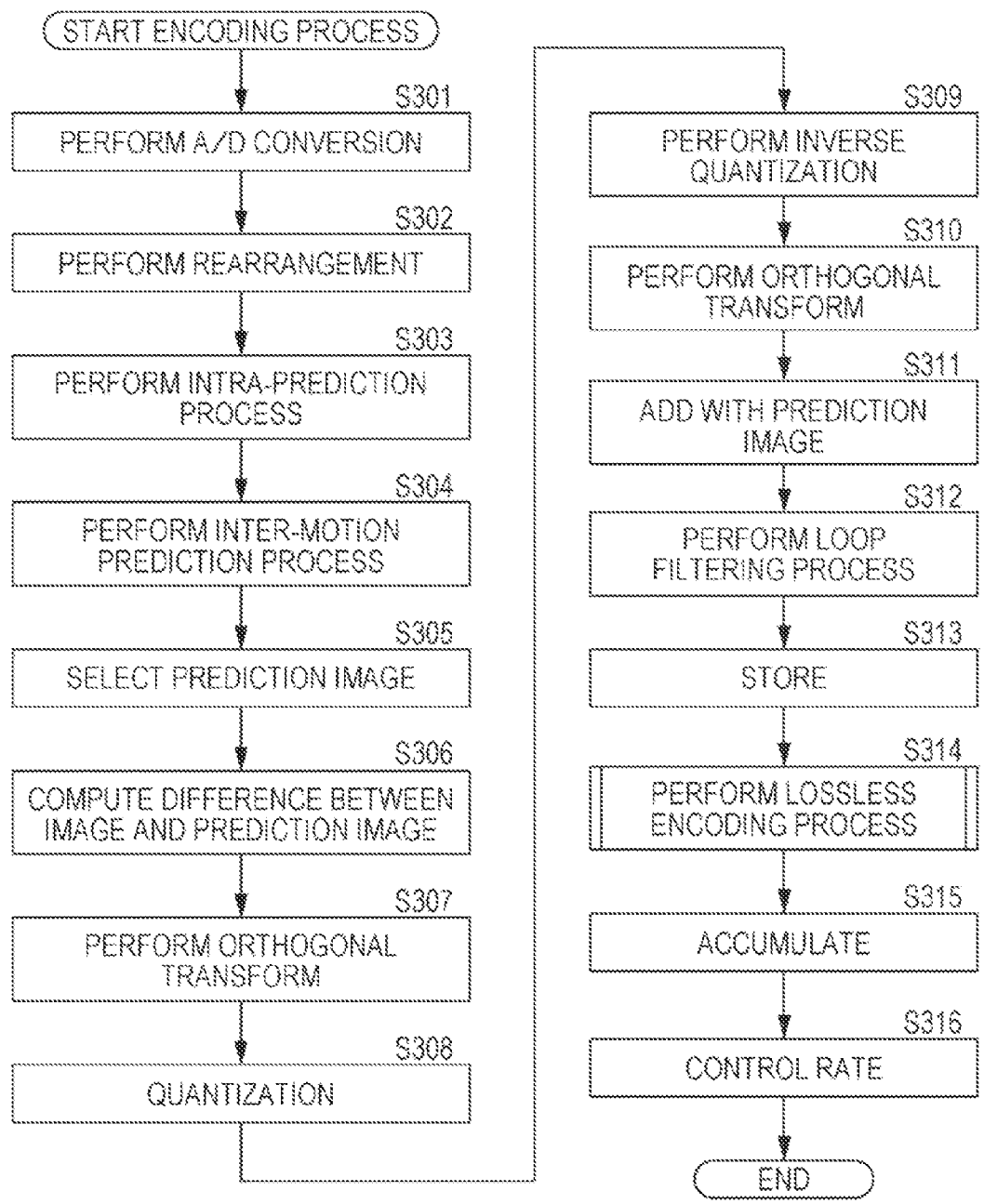
FIG. 15 is a flowchart describing an example of the flow of an encoding process.
Figure 16:
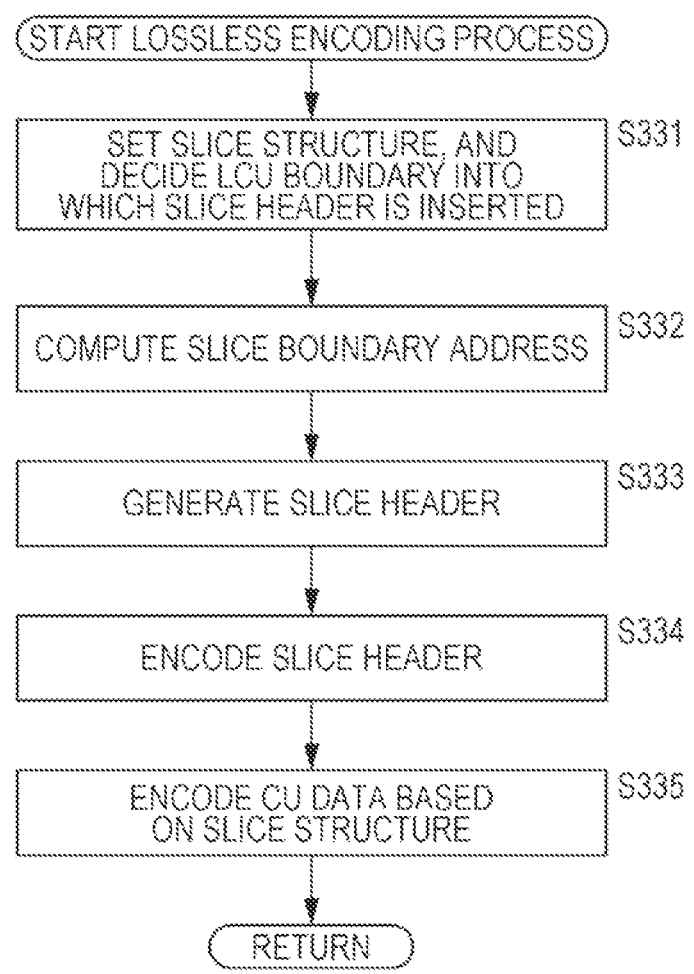
FIG. 16 is a flowchart describing an example of the flow of a lossless encoding process.

When the process of Step S335 ends, the CU data encoding unit 333 finishes the lossless encoding process, and the process returns to Step S314 of FIG. 15, so that processes of Step S315 and thereafter are executed.

As described above, by executing each of the processes, the image encoding device 300 can set control accuracy in slice division in units of CUs while maintaining the onion ring structure in syntax even when the size of an LCU is set to be large in image encoding, and accordingly can suppress lowering of the control accuracy in slice division while suppressing deterioration of convenience of encoded data.

Note that control of the position of a slice boundary has been described hereinabove, but the disclosure is not limited thereto, and the above described methods may be applied to setting of entropy slices disclosed in, for example, Non-Patent Literature 2.

In other words, during setting of entropy slices (division of a picture into entropy slices), the image encoding device 300 may control the position of an entropy slice boundary in units of CUs as described above, and add the header of the entropy slices before the LCU.

By doing this, the image encoding device 300 can set control accuracy of entropy slice division in units of CUs while maintaining the onion ring structure in syntax, in the same manner as described above, and accordingly, can suppress deterioration of control accuracy of entropy slice division while suppressing deterioration of convenience of encoded data.

Of course, the method can be applied also to a data structure other than above-described image encoding. For example, in data having a general hierarchical structure, control accuracy of data in an upper hierarchy may be enhanced while maintaining an inclusive relationship in which a higher level includes a lower level in a data management structure. In other words, in data having a hierarchical structure, the position of a boundary of data of a high hierarchical unit may be set in units smaller than the high hierarchical unit, and information on the data of the high hierarchical unit may be added before data of an intermediate hierarchical unit that includes the data of the high hierarchical unit and is smaller than the high hierarchical unit and greater than a low hierarchical unit. By doing this, even when control accuracy of data in an intermediate hierarchy that is positioned lower than an upper hierarchy deteriorates, reduction in control accuracy of data in the upper hierarchy can be suppressed while suppressing deterioration of convenience of data.

<2. Second Embodiment>

[Image Decoding Device]

Figure 17:
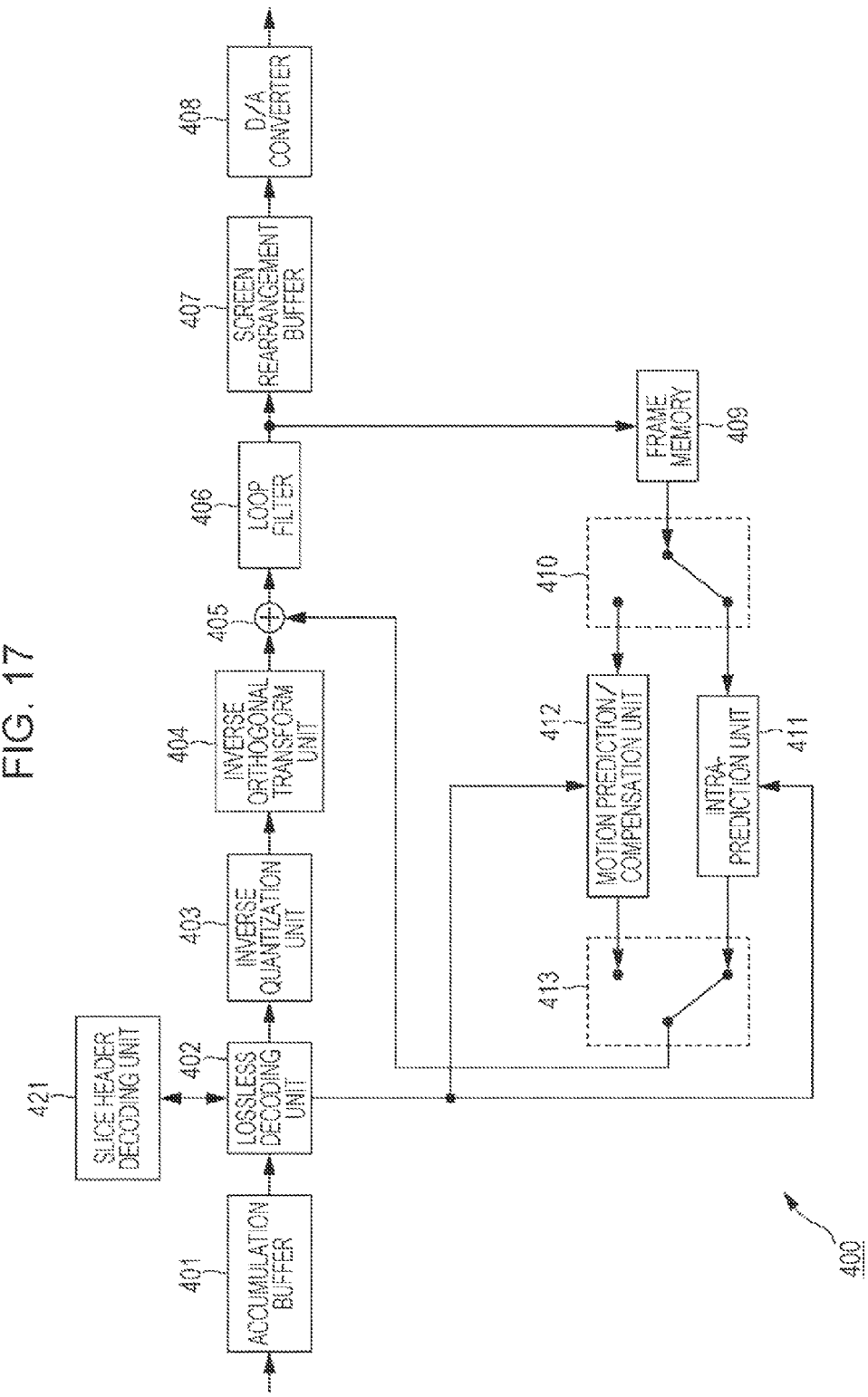
FIG. 17 is a block diagram showing a principal configuration example of an image decoding device.

FIG. 17 is a block diagram showing a principal configuration example of an image decoding device. The image decoding device 400 shown in FIG. 17 is basically the same device as the image decoding device 200 of FIG. 2, and decodes encoded data that is obtained by encoding image data.

The image decoding device 400 shown in FIG. 17 is a decoding device corresponding to the image encoding device 300 of FIG. 7. Encoded data that has been encoded by the image encoding device 300 is supplied to the image decoding device 400 via an arbitrary path, for example, a transmission path, a recoding medium, or the like and then decoded.

The image decoding device 400 has an accumulation buffer 401, a lossless decoding unit 402, an inverse quantization unit 403, an inverse orthogonal transform unit 404, an arithmetic operation unit 405, a loop filter 406, a screen rearrangement buffer 407, and a D/A converter 408 as shown in FIG. 17. In addition, the image decoding device 400 has a frame memory 409, a selection unit 410, an intra-prediction unit 411, a motion prediction/compensation unit 412, and a selection unit 413.

The image decoding device 400 further has a slice header decoding unit 421.

The accumulation buffer 401 accumulates transmitted encoded data in the same manner as the accumulation buffer 201. This encoded data has been encoded by the image encoding device 300. The lossless decoding unit 402 reads out the encoded data from the accumulation buffer 401 at a predetermined timing in the same manner as the lossless decoding unit 202, and decodes in a format corresponding to the encoding format of the lossless encoding unit 306 of FIG. 7.

In addition, when a corresponding frame has been intra-encoded, intra-prediction mode information is stored in the header portion of the encoded data. The lossless decoding unit 402 also decodes the intra-prediction mode information in the same manner as the lossless decoding unit 202, and supplies the information to the intra-prediction unit 411. On the other hand, when the frame has been inter-encoded, motion vector information and inter-prediction mode information are stored in the header portion of the encoded data. The lossless decoding unit 402 also decodes the motion vector information and inter-prediction mode information in the same manner as the lossless decoding unit 202, and supplies the information to the motion prediction/compensation unit 412.

The inverse quantization unit 403 inversely quantizes coefficient data (quantization coefficient) obtained from the decoding by the lossless decoding unit 402 in a scheme corresponding to a quantization scheme of the quantization unit 305 of FIG. 7 in the same manner as the inverse quantization unit 203. In other words, the inverse quantization unit 403 performs inverse quantization of a quantization coefficient in the same manner as that of the inverse quantization unit 308 of FIG. 7.

The inverse quantization unit 403 supplies the coefficient data that has been inversely quantized, that is, an orthogonal transform coefficient to the inverse orthogonal transform unit 404. The inverse orthogonal transform unit 404 performs inverse orthogonal transform on the orthogonal transform coefficient in the scheme corresponding to the orthogonal transform scheme of the orthogonal transform unit 304 of FIG. 7 (the same scheme as that of the inverse orthogonal transform unit 309 of FIG. 7) in the same manner as the inverse orthogonal transform unit 204. The inverse orthogonal transform unit 404 obtains decoding remainder data corresponding to remainder data that has not been orthogonally transformed in the image encoding device 300 from the inverse orthogonal transform process. For example, quaternary inverse orthogonal transform is executed.

The decoding remainder data obtained from inverse orthogonal transform is supplied to the arithmetic operation unit 405. In addition, a prediction image is supplied to the arithmetic operation unit 405 from the intra-prediction unit 411 or the motion prediction/compensation unit 412 via the selection unit 413.

The arithmetic operation unit 405 adds the encoding remainder data to the prediction image and obtains decoded image data corresponding to image data from which the prediction image has not been subtracted by the arithmetic operation unit 303 of the image encoding device 300 in the same manner as the arithmetic operation unit 205. The arithmetic operation unit 405 supplies this decoded image data to the loop filter 406.

The loop filter 406 appropriately performs a loop filtering process including a deblocking filtering process, an adaptive loop filtering process, and the like, on the supplied decoding image, and supplies the data to the screen rearrangement buffer 407.

The loop filter 406 includes the deblocking filter 206, an adaptive loop filter, and the like, and appropriately performs the filtering process on the decoded image data supplied from the arithmetic operation unit 405. For example, the loop filter 406 removes block distortion of the decoded image by performing the deblocking filtering process on the decoded image in the same manner as the deblocking filter 206. In addition, for example, the loop filter 406 improves image quality by performing a loop filtering process on the result of the deblocking filtering process (decoded image of which block distortion has been removed) using a Wiener filter (Wiener Filter).

Note that the loop filter 406 may be set to perform an arbitrary filtering process on the decoded image. In addition, the loop filter 406 may be set to perform a filtering process using the filter coefficient supplied from the image encoding device 300 of FIG. 7.

The loop filter 406 supplies the filtering process result (decoded image that has undergone the filtering process) to the screen rearrangement buffer 407 and the frame memory 409. Note that the decoded image output from the arithmetic operation unit 405 can be supplied to the screen rearrangement buffer 407 and the frame memory 409 without passing the loop filter 406. In other words, the filtering process by the loop filter 406 can be omitted.

The screen rearrangement buffer 407 performs rearrangement of the image in the same manner as the screen rearrangement buffer 207. In other words, the order of frames rearranged for the encoding order by the screen rearrangement buffer 302 of FIG. 7 is rearranged in the original display order. The D/A converter 408 performs D/A conversion on the image supplied from the screen rearrangement buffer 407 in the same manner as the D/A converter 208, and outputs to a display, not shown in the drawing, so as to be displayed.

The frame memory 409 stores the supplied decoded image, and outputs the stored decoded image to the intra-prediction unit 411 or the motion prediction/compensation unit 412 via the selection unit 410 at a predetermined timing as a reference image in the same manner as the frame memory 209.

When the image is an intra-encoded image, for example, the frame memory 409 supplies the reference image to the intra-prediction unit 411 via the selection unit 410. In addition, when the image is an inter-encoded image, for example, the frame memory 409 supplies the reference image to the motion prediction/compensation unit 412 via the selection unit 410.

When the intra-encoded image is decoded, the selection unit 410 supplies the reference image supplied from the frame memory 409 to the intra-prediction unit 411 in the same manner as the selection unit 210. In addition, when the inter-encoded image is decoded, the selection unit 410 supplies the reference image supplied from the frame memory 409 to the motion prediction/compensation unit 412 in the same manner as the selection unit 210.

The lossless decoding unit 402 appropriately supplies information indicating an intra-prediction mode obtained by decoding header information, or the like to the intra-prediction unit 411. The intra-prediction unit 411 performs intra-prediction using the reference image acquired from the frame memory 409 in the intra-prediction mode used in the intra-prediction unit 314 to generate a prediction image, in the same manner as the intra-prediction unit 211. In other words, the intra-prediction unit 411 can perform the intra-prediction in an arbitrary mode other than the mode defined in the AVC encoding format in the same manner as the intra-prediction unit 314.

The intra-prediction unit 411 supplies the generated prediction image to the selection unit 413.

The motion prediction/compensation unit 412 acquires information obtained by decoding header information (prediction mode information, motion vector information, reference frame information, flags, various parameters, and the like) from the lossless decoding unit 402 in the same manner as the motion prediction/compensation unit 212.

The motion prediction/compensation unit 412 performs inter-prediction using the reference image acquired from the frame memory 409 in the inter-prediction mode used in the motion prediction/compensation unit 315 to generate a prediction image in the same manner as the motion prediction/compensation unit 212. In other words, the motion prediction/compensation unit 412 can perform the intra-prediction in an arbitrary mode other than the mode defined in the AVC encoding format in the same manner as the motion prediction/compensation unit 315.

The motion prediction/compensation unit 412 supplies the generated prediction image to the selection unit 413 in the same manner as the motion prediction/compensation unit 212.

The selection unit 413 selects the prediction image generated by the motion prediction/compensation unit 412 or the intra-prediction unit 411, and then supplies the image to the arithmetic operation unit 405 in the same manner as the selection unit 213.

[Lossless Decoding Unit and Slice Header Decoding Unit]

Figure 18:
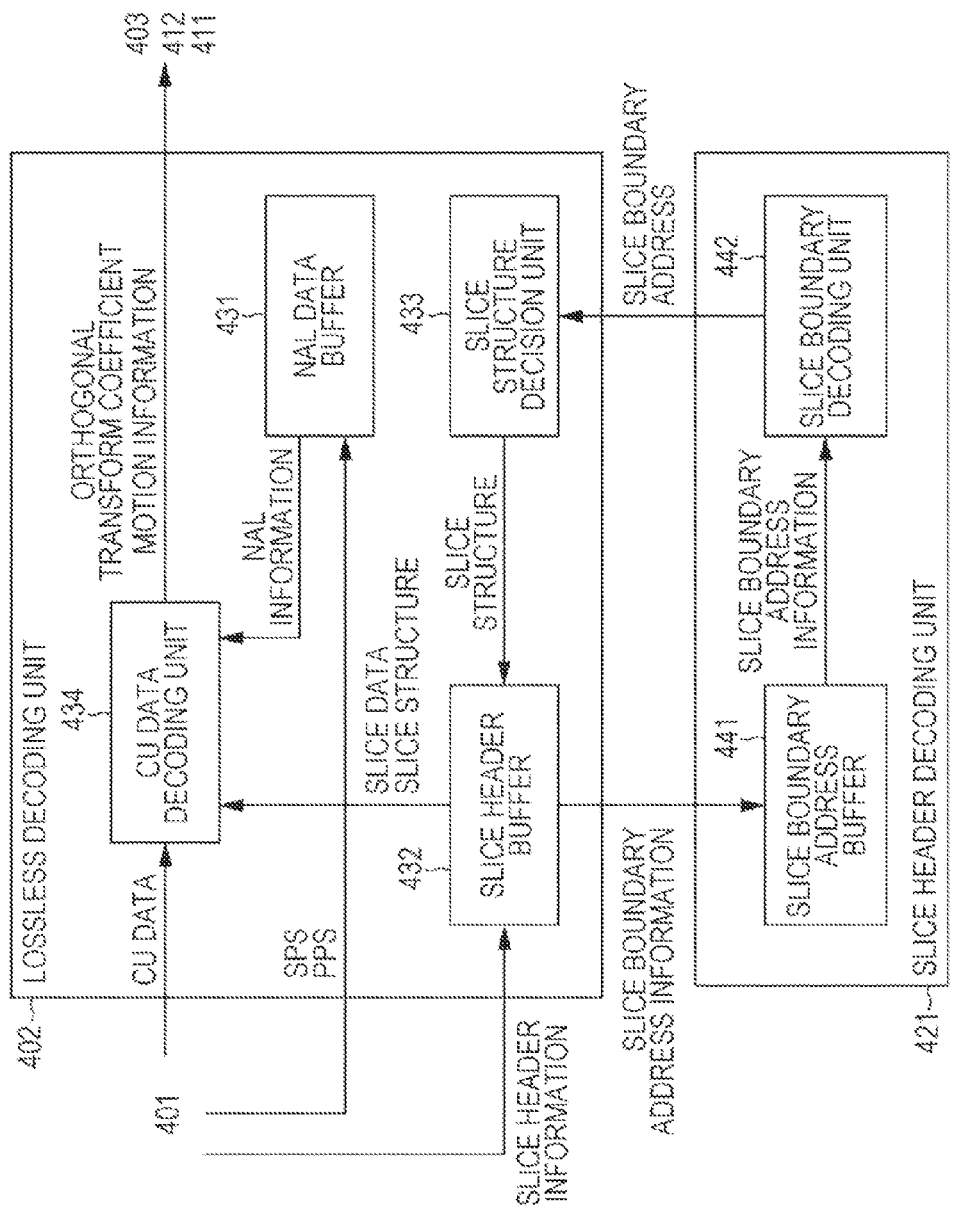
FIG. 18 is a block diagram showing a principal configuration example of a slice header decoding unit and a lossless decoding unit.

FIG. 18 is a block diagram showing a principal configuration example of a slice header decoding unit 421 and a lossless decoding unit 402 of FIG. 17.

As shown in FIG. 18, the lossless decoding unit 402 has an NAL data buffer 431, a slice header buffer 432, a slice structure decision unit 433, and a CU data decoding unit 434.

The NAL data buffer 431 acquires and stores NAL data such as a sequence parameter set (SPS), or a picture parameter set (PPS) which is supplied from the accumulation buffer 401 and extracted from a code stream other than slice header information. The NAL data buffer 431 decodes the stored NAL data, and supplies the decoding result to the CU data decoding unit 434 as NAL information at a predetermined timing.

The slice header buffer 432 acquires and stores slice header information supplied from the accumulation buffer 401 and extracted from a code stream. The slice header buffer 432 decodes the stored slice header information. The slice header buffer 432 extracts slice boundary address information included in the slice header information, and supplies the information to the slice header decoding unit 421 at a predetermined timing.

In addition, when a slice structure supplied from the slice structure decision unit 433 is acquired, the slice header buffer 432 supplies the structure to the CU data decoding unit 434 at a predetermined timing. Furthermore, the slice header buffer 432 supplies information such as a direct mode to the CU data decoding unit 434 as slice data if necessary.

When the slice boundary address supplied from the slice header decoding unit 421 is acquired, the slice structure decision unit 433 re-constructs a slice structure set in the image encoding device 300 from the slice boundary address. The slice structure decision unit 433 supplies this slice structure to the slice header buffer 432.

The CU data decoding unit 434 decodes CU data (encoded data) supplied from the accumulation buffer 401 based on the NAL information supplied from the NAL data buffer 431 and the slice structure supplied from the slice header buffer 432. The CU data decoding unit 434 causes decoding of each piece of CU data to be pipelined so as to be executed in parallel with each other. In other words, the CU data decoding unit 434 parallelizes decoding processes of CU data according to the slice structure. Thus, the CU data decoding unit 434 can further reduce the processing time (can perform decoding processes faster) than when all pieces of CU data are sequentially decoded (decoded in series).

Note that, when information such as a direct mode, or the like is supplied from the slice header buffer 432 as slice data, the CU data decoding unit 434 performs a decoding process using the information.

The CU data decoding unit 434 supplies information such as an orthogonal transform coefficient, motion information, or the like obtained from decoding to the inverse quantization unit 403, the motion prediction/compensation unit 412, the intra-prediction unit 411, and the like.

In FIG. 18, the slice header decoding unit 421 has a slice boundary address buffer 441 and a slice boundary decoding unit 442. The slice boundary address buffer 441 acquires and stores a slice boundary address supplied from the lossless decoding unit 402. The slice boundary address buffer 441 supplies the stored slice boundary address information to the slice boundary decoding unit 442.

When the slice boundary address information (encoded data) supplied from the slice boundary address buffer 441 is acquired, the slice boundary decoding unit 442 decodes the information. The slice boundary decoding unit 442 supplies the slice boundary address obtained from the decoding to the lossless decoding unit 402.

As described above, the lossless decoding unit 402 extracts the slice boundary address information from the slice header information supplied from the device on the encoding side, and causes the information to be decoded in the slice header decoding unit 421. The lossless decoding unit 402 decodes CU data using the slice boundary address obtained from the decoding by the slice header decoding unit 421.

In this manner, the image decoding device 400 can re-construct the slice structure set by the image encoding device 300 in a right way using he slice boundary address included in the slice header. Thus, the image decoding device 400 can appropriately decode encoded data generated by the image encoding device 300 encoding image data according to the slice structure, and thereby obtain a decoded image. After all of the above, the image decoding device 400 can realize a method for controlling deterioration in control accuracy of slice division while suppressing deterioration in convenience of encoded data by setting the control accuracy of slice division in units of CUs while maintaining the onion ring structure in syntax.

[Flow of Decoding Process]

Next, the flow of each process executed by the image decoding device 400 as described above will be described. First, an example of the flow of a decoding process will be described referring to the flowchart of FIG. 19.

When a decoding process is started, the accumulation buffer 401 accumulates encoded data that has been transmitted in Step S401. In Step S402, the lossless decoding unit 402 decodes the encoded data supplied from the accumulation buffer 401 (encoded data obtained from the image encoding device 300 by encoding image data).

In Step S403, the inverse quantization unit 403 performs inverse quantization on a quantized orthogonal transform coefficient obtained from decoding by the lossless decoding unit 402 in a method corresponding to a quantization process by the quantization unit 305 of FIG. 7. In Step S404, the inverse quantization unit 404 performs inverse quantization transform on the orthogonal transform coefficient obtained from inverse quantization in the inverse quantization unit 403 in a method corresponding to an orthogonal transform process by the orthogonal transform unit 304 of FIG. 7. Accordingly, difference information corresponding to an input of the orthogonal transform unit 304 of FIG. 7 (output of the arithmetic operation unit 303) is decoded.

In Step S405, the arithmetic operation unit 405 adds a prediction image to the difference information obtained from the process of Step S404. Accordingly, the original image data is decoded.

In Step S406, the loop filter 406 appropriately filters the decoded image obtained from the process of Step S405.

In Step S407, the frame memory 409 stores the filtered decoded image.

In Step S408, the intra-prediction unit 411 and the motion prediction/compensation unit 412 performs prediction processes to generate prediction images.

In Step S409, the selection unit 413 selects one of the prediction images generated in the process of Step S408. In other words, the prediction image generated by the intra-prediction unit 411 or the prediction image generated by the motion prediction/compensation unit 412 is supplied to the selection unit 413. The selection unit 413 selects one side from which the prediction image is supplied, and supplies the prediction image to the arithmetic operation unit 405. This prediction image is added to the difference information in the process of Step S405.

In Step S410, the screen rearrangement buffer 407 rearranges frames of the decoded image data. In other words, the order of the frames of the decoded image data which have been rearranged for encoding by the screen rearrangement buffer 302 (of FIG. 7) of the image encoding device 300 is rearranged in the original display order.

In Step S411, the D/A converter 408 performs D/A conversion on the decoded image data of which frames are rearranged in the screen rearrangement buffer 407. This decoded image data is output to a display not shown in the drawing so that the image is displayed.

[Flow of Lossless Decoding Process]

Next, an example of the flow of the lossless decoding process executed in Step S402 of FIG. 19 will be described referring to the flowchart of FIG. 20.

When the lossless decoding process is started, the slice header buffer 432 extracts and acquires slice header information from encoded data retained in the accumulation buffer 401 in Step S431.

In Step S432, the slice boundary address buffer 441 extracts slice boundary address information from the slice header information extracted in Step S431.

In Step S433, the slice boundary decoding unit 442 decodes the slice boundary address information extracted in Step S432.

In Step S434, the slice structure decision unit 433 decides the position of a slice boundary based on the slice boundary address decoded in Step S433, and then generates a slice structure.

In Step S435, the CU data decoding unit 434 decodes CU data while appropriately performing parallelization based on the position of the slice boundary (slice structure) decided in Step S434.

Figure 19:
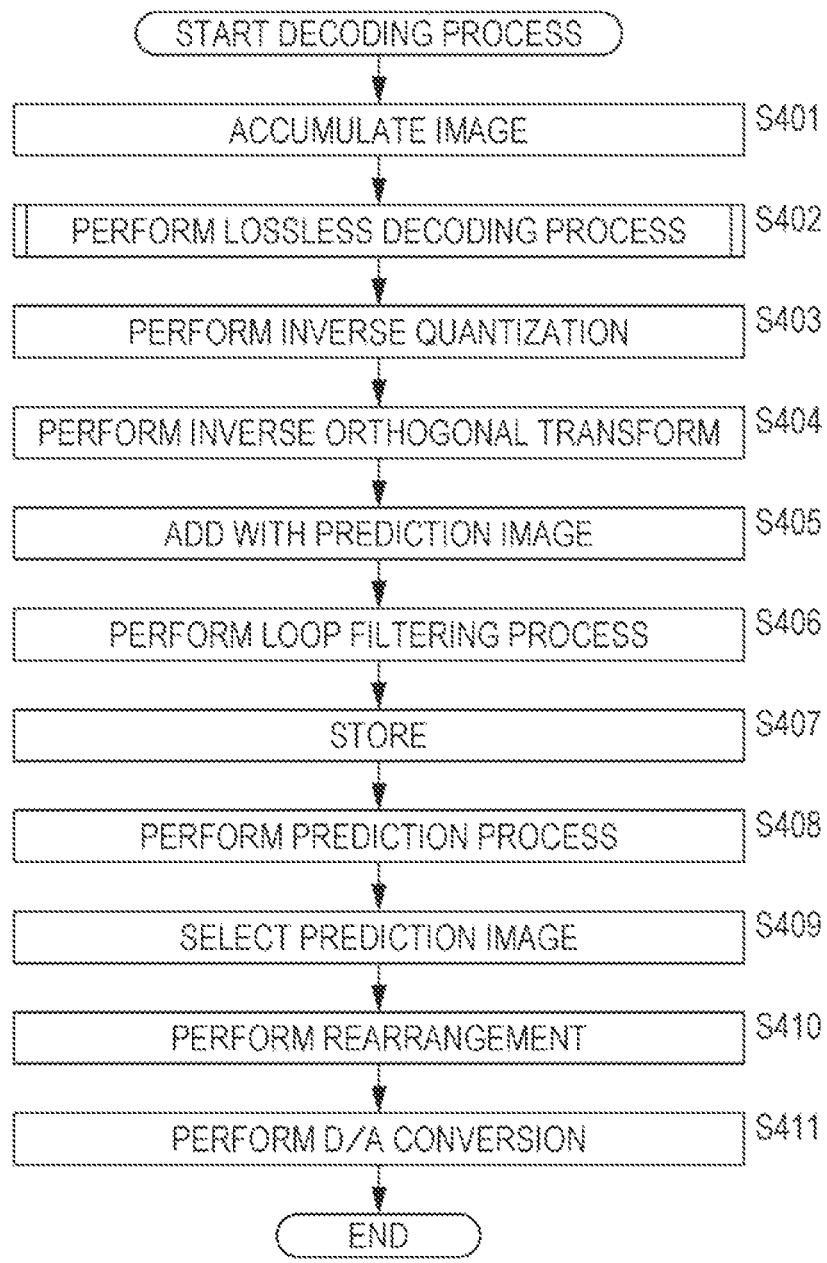
FIG. 19 is a flowchart describing an example of the flow of a decoding process.
Figure 20:
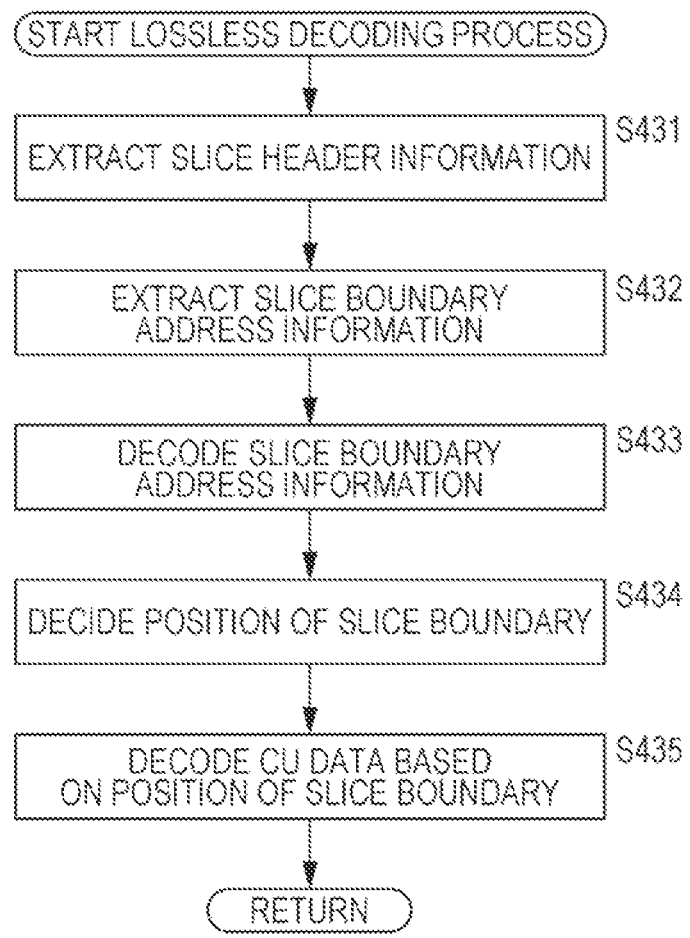
FIG. 20 is a flowchart describing an example of the flow of a lossless decoding process.

When the process of Step S435 ends, the CU data decoding unit 434 causes the process to return to Step S402 of FIG. 19, and thereby processes of Step S403 and the following steps are executed.

By executing each of the processes as described above, the image decoding device 400 can realize the method for suppressing deterioration of control accuracy of slice division while suppressing deterioration in convenience of encoded data by setting the control accuracy of the slice division in units of CUs while maintaining the onion ring structure in syntax.

It should be noted that, in the above description, the slice boundary address has been described so as to be included in the slice header, but the information indicating a slice boundary may be stored in, for example, a sequence parameter set (SPS), a picture parameter set (PPS), or the like, other than in a slice header. In addition, for example, the information indicating a slice boundary may be stored in a parameter set such as SEI (Suplemental Enhancement Information), or the like (for example, the header of a sequence or a picture, or the like).

Furthermore, the information indicating a slice boundary may be transmitted on the decoding side, separate from encoded data. In this case, it is necessary to clarify the corresponding relationship between the information indicating the slice boundary and the encoded data (to facilitate the decoding side to grasp the relationship), but the method is arbitrary. For example, table information indicating the corresponding relationship may be separately created, or link information indicating data to be corresponded may be stored in respective data sides.

In addition, the method for setting the slice structure may be shared between the image encoding device 300 and the image decoding device 400 in advance. In this case, there are cases in which transmission of the information indicating the slice boundary can be omitted.

<3. Third Embodiment>

[Personal Computer]

A series of processes described above can be executed by hardware, or software. In such a case, for example, a personal computer as shown in FIG. 21 may be configured.

Figure 21:
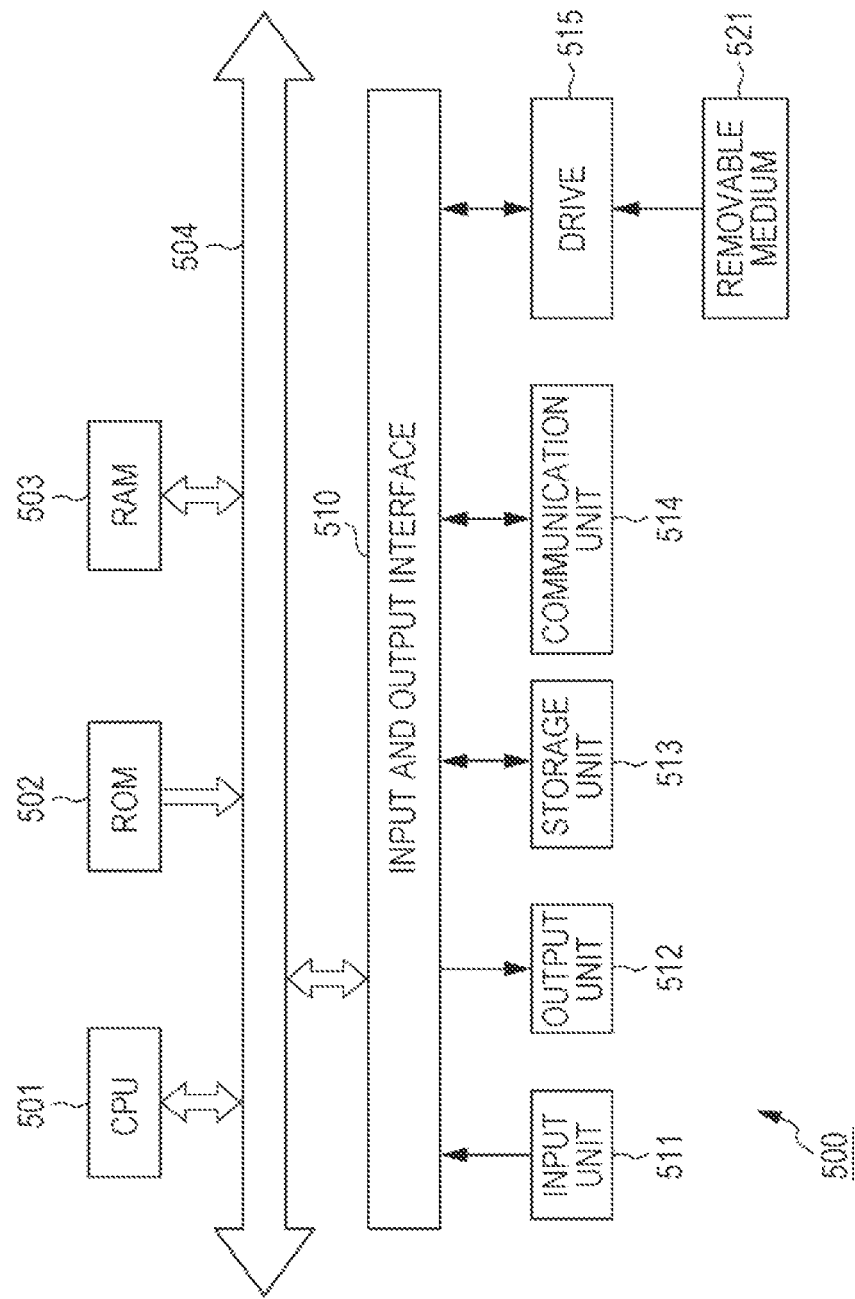
FIG. 21 is a block diagram showing a principal configuration example of a personal computer.

In FIG. 21, a CPU (Central Processing Unit) 501 of the personal computer 500 executes various processes according to a program stored in a ROM (Read Only Memory) 502, or a program loaded on a RAM (Random Access Memory) 503 from a storage unit 513. The RAM 503 appropriately stores data, or the like, necessary for the CPU 501 to execute various processes.

The CPU 501, the ROM 502, and the RAM 503 are connected to one another via a bus 504. An input and output interface 510 is also connected to the bus 504.

The input and output interface 510 is connected to an input unit 511 including a keyboard, a mouse, and the like, an output unit 512 including a display such as a CRT (Cathode Ray Tube), an LCD (Liquid Crystal Display), or the like, a speaker, and the like, a storage unit 513 including a hard disk, or the like, and a communication unit 514 including a modem, or the like. The communication unit 514 performs a communication process via a network including the Internet.

The input and output interface 510 is also connected to a drive 515, if necessary, a removable medium 521 such as a magnetic disk, an optical disc, a magneto-optical disc, a semiconductor memory, or the like is appropriately loaded thereon, and a computer program read from the medium is installed in the storage unit 513, if necessary.

When the series of processes described above are executed by software, a program constituting the software is installed from a network or a recoding medium.

As shown in FIG. 21, for example, this recording medium not only includes the removable medium 521 such as a magnetic disk (including a flexible disk), an optical disc (including a CD-ROM (Compact Disc-Read Only Memory), or a DVD (Digital Versatile Disc)), a magneto-optical disc (including an MD (Mini Disc)), a semiconductor memory, or the like on which a program is recorded, and which is separate from the main body of the device and distributed for delivering a program to a user, but also a hard disk included in the ROM 502 or the storage unit 513 on which a program is recorded, and which is delivered to a user while being incorporated into the main body of the device.

It should be noted that a program executed by the computer may be a program in which processes are performed in a time series manner along the order described in the present specification, or may be a program in which processes are performed at a required timing such as in a parallel manner or when there is a call-out.

In addition, in the present specification, a step to describe a program recorded in a recording medium not only includes a process performed in time series along the disclosed order, but also includes a process performed in parallel or independently, not necessarily a process performed in time series.

In addition, in the present specification, a system refers to entire equipment constituted by a plurality of devices (units).

In addition, in the above description, a configuration described as one device (or a processing unit) may be divided so as to configure a plurality of devices (or processing units). Conversely, a configuration described as a plurality of devices (or processing units) in the above may be integrated so as to configure one device (or a processing unit). In addition, a configuration other than the above-described configuration may be added to the configuration of each device (or a processing unit). Furthermore, as long as the configuration or the operation as a whole system is substantially the same, a part of the configuration of a device (or a processing unit) may be included in the configuration of another device (or another processing unit). In other words, an embodiment of the present technology is not limited to the above-described embodiments, and can be variously changed within the scope not departing from the gist of the present technology.

For example, the lossless encoding unit 306 and the slice header encoding unit 321 shown in FIG. 8 may be respectively configured to be independent devices. In addition, the slice setting unit 331, the slice structure encoding unit 332, the CU data encoding unit 333, the slice boundary address computation unit 341, and the slice header generation unit 342 shown in FIG. 8 may be respectively configured to be independent devices. Furthermore, the respective processing units may be arbitrarily combined, or configured to be independent devices. Of course, they may be combined with an arbitrary processing unit shown in FIG. 7, or may be combined with a processing unit not shown in the drawing.

In addition, for example, the image encoding device and the image decoding device described above can be applied to an arbitrary electronic apparatus. Hereinafter, an example thereof will be described.

<4. Fourth Embodiment>
[Television Receiver Set]

Figure 22:
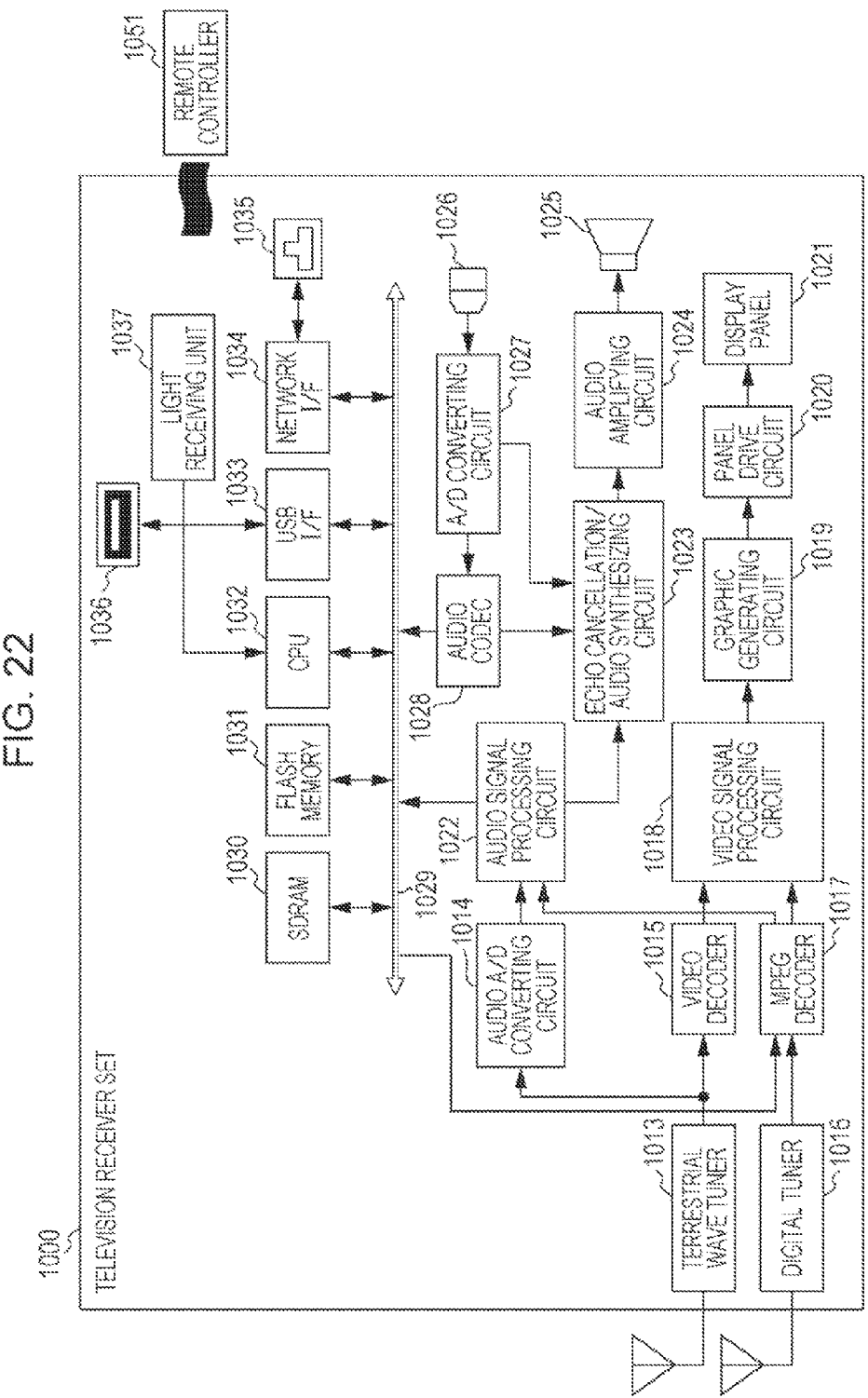
FIG. 22 is a block diagram showing a principal configuration example of a television receiver set.

FIG. 22 is a block diagram showing a principal configuration example of a television receiver set using the image decoding device 400.

The television receiver set 1000 shown in FIG. 22 has a terrestrial wave tuner 1013, a video decoder 1015, a video signal processing circuit 1018, a graphic generating circuit 1019, a panel drive circuit 1020, and a display panel 1021.

The terrestrial wave tuner 1013 receives broadcast wave signals of terrestrial analog broadcasting via an antenna, demodulates the signal to acquire video signals, and then supplies the signals to the video decoder 1015. The video decoder 1015 performs a decoding process on the video signals supplied from the terrestrial wave tuner 1013, and supplies obtained digital component signals to the video signal processing circuit 1018.

The video signal processing circuit 1018 performs a predetermined process such as noise removal, or the like, on the video data supplied from the video decoder 1015, and supplies the obtained video data to the graphic generating circuit 1019.

The graphic generating circuit 1019 generates video data of a program to be displayed on the display panel 1021, or image data from a process based on an application supplied via a network, or the like, and supplies the generated video data or image data to the panel drive circuit 1020. In addition, the graphic generating circuit 1019 generates video data (graphic) for displaying a screen used by a user through selection of an item, or the like, and also appropriately performs a process of supplying video data obtained by overlapping the former video data on video data of a program to the panel drive circuit 1020.

The panel drive circuit 1020 drives the display panel 1021 based on the data supplied from the graphic generating circuit 1019, and causes videos of a program or various screens described above to be displayed on the display panel 1021.

The display panel 1021 includes an LCD (Liquid Crystal Display), or the like, and displays videos of a program, or the like, according to the control by the panel drive circuit 1020.

In addition, the television receiver set 1000 further has an audio A/D (Analog/Digital) converting circuit 1014, an audio signal processing circuit 1022, an echo cancellation/audio synthesizing circuit 1023, an audio amplifying circuit 1024, and a speaker 1025.

The terrestrial wave tuner 1013 acquires audio signals as well as video signals by demodulating received broadcast wave signals. The terrestrial wave tuner 1013 supplies the acquired audio signals to the audio A/D converting circuit 1014.

The audio A/D converting circuit 1014 performs an A/D converting process on the audio signals supplied from the terrestrial wave tuner 1013, and supplies the obtained digital audio signals to the audio signal processing circuit 1022.

The audio signal processing circuit 1022 performs a predetermined process such as noise removal, or the like, on the audio data supplied from the audio A/D converting circuit 1014, and then supplies the obtained audio data to the echo cancellation/audio synthesizing circuit 1023.

The echo cancellation/audio synthesizing circuit 1023 supplies the audio data supplied from the audio signal processing circuit 1022 to the audio amplifying circuit 1024.

The audio amplifying circuit 1024 performs D/A converting process and amplifying process on audio data supplied from the echo cancellation/audio synthesizing circuit 1023, adjusts the audio sound level to a predetermined volume, and then causes sound to be output from the speaker 1025.

Furthermore, the television receiver set 1000 also has a digital tuner 1016, and an MPEG decoder 1017.

The digital tuner 1016 receives broadcast wave signals of digital broadcasting (terrestrial digital broadcasting, or BS (Broadcasting Satellite)/CS (Communications Satellite) digital broadcasting) via an antenna, demodulates the signals to acquire MPEG-TS (Moving Picture Experts Group-Transport Stream), and then supplies the data to the MPEG decoder 1017.

The MPEG decoder 1017 descrambles the MPEG-TS supplied from the digital tuner 1016, and extracts a stream including data of a program to be reproduced (to be viewed) therefrom. The MPEG 1017 decodes audio packets constituting the extracted stream, supplies the obtained audio data to the audio signal processing circuit 1022, decodes video packets constituting the stream, and supplies the obtained video data to the video signal processing circuit 1018. In addition, the MPEG decoder 1017 supplies EPG (Electronic Program Guide) data extracted from the MPEG-TS to a CPU 1032 via a path, not shown in the drawing.

The television receiver set 1000 uses the above-described image decoding device 400 as the MPEG decoder 1017 that decodes video packets as above. It should be noted that the MPEG-TS transmitted from a broadcasting station, or the like is encoded by the image encoding device 300.

The MPEG decoder 1017 re-constructs a slice structure set on the encoding side, and decodes the encoded data according to the slice structure using a slice boundary address included in a slice header added before an LCU including a slice boundary of encoded data, in the same manner as the image decoding device 400. Thus, the MPEG decoder 1017 can realize the improvement of control accuracy of data in an upper hierarchy while maintaining the inclusive relationship in which a high level includes a low level in a data management structure for data having a hierarchical structure. Accordingly, the MPEG decoder 1017 can realize the method for suppressing deterioration in control accuracy of slice division while suppressing deterioration in convenience of encoded data.

Video data supplied from the MPEG decoder 1017 undergoes a predetermined process in the video signal processing circuit 1018, in the same manner as the video data supplied from the video decoder 1015, appropriately is overlapped over generated video data, or the like, in the graphic generating circuit 1019, and supplied to the display panel 1021 via the panel drive circuit 1020, and then images thereof are displayed.

Audio data supplied from the MPEG decoder 1017 undergoes a predetermined process in the audio signal processing circuit 1022, supplied to the audio amplifying circuit 1024 via the echo cancellation/audio synthesizing circuit 1023, and undergoes D/A converting process and amplifying process, in the same manner as the audio data supplied from the audio A/D converting circuit 1014. As a result, sound adjusted to a predetermined volume is output from the speaker 1025.

In addition, the television receiver set 1000 also has a microphone 1026, and an A/D converting circuit 1027.

The A/D converting circuit 1027 receives audio signals of a user collected by the microphone 1026 provided in the television receiver set 1000 for speech, performs an A/D converting process on the received audio signals, and then supplies the obtained digital audio data to the echo cancellation/audio synthesizing circuit 1023.

When audio data of a user (user A) of the television receiver set 1000 is supplied from the A/D converting circuit 1027, the echo cancellation/audio synthesizing circuit 1023 performs echo cancellation on the audio data of the user A, and causes audio data obtained by synthesizing the data with other audio data, or the like to be output from the speaker 1025 via the audio amplifying circuit 1024.

Furthermore, the television receiver set 1000 also has an audio codec 1028, an internal bus 1029, an SDRAM (Synchronous Dynamic Random Access Memory) 1030, a flash memory 1031, a CPU 1032, a USB (Universal Serial Bus) I/F 1033, and a network I/F 1034.

The A/D converting circuit 1027 receives audio signals of a user collected by the microphone 1026 provided in the television receiver set 1000 for speech, performs an A/D converting process on the received audio signals, and then supplies the obtained digital audio data to the audio codec 1028.

The audio codec 1028 converts the audio data supplied from the A/D converting circuit 1027 into data in a predetermined format for being transmitted via a network, and supplies the data to the network I/F 1034 via the internal bus 1029.

The network I/F 1034 is connected to a network via a cable installed in a network terminal 1035. The network I/F 1034 transmits audio data supplied from the audio codec 1028 to, for example, another device connected to the network. In addition, the network I/F 1034 receives, for example, audio data transmitted from another device connected via the network via the network terminal 1035, and supplies the data to the audio codec 1028 via the internal bus 1029.

The audio codec 1028 converts the audio data supplied from the network I/F 1034 into data in a predetermined format, and supplies the data to the echo cancellation/audio synthesizing circuit 1023.

The echo cancellation/audio synthesizing circuit 1023 performs echo cancellation on the audio data supplied from the audio codec 1028, and causes audio data obtained by synthesizing the former data with other audio data, or the like to be output from the speaker 1025 via the audio amplifying circuit 1024.

The SDRAM 1030 stores various kinds of data necessary for the CPU 1032 to perform a process.

The flash memory 1031 stores programs executed by the CPU 1032. The programs stored in the flash memory 1031 are read by the CPU 1032 at a predetermined timing such as upon a start of the television receiver set 1000. In the flash memory 1031, EPG data acquired via digital broadcasting, data acquired from a predetermined server via a network, or the like are also stored.

In the flash memory 1031, for example, MPEG-TS including content data acquired from a predetermined server via a network with control of the CPU 1032 is stored. The flash memory 1031 supplies the MPEG-TS to the MPEG decoder 1017 via the internal bus 1029 with, for example, the control of the CPU 1032.

The MPEG decoder 1017 processes the MPEG-TS in the same manner as MPEG-TS supplied from the digital tuner 1016. In this manner, the television receiver set 1000 can receive content data that includes videos, sound, and the like via a network, decodes the data using the MPEG decoder 1017, and causes the videos to be displayed or the sound to be output.

In addition, the television receiver set 1000 also has a light receiving unit 1037 that receives light of infrared signals transmitted from a remote controller 1051.

The light receiving unit 1037 receives light of an infrared ray from the remote controller 1051, and outputs a control code indicating the content of a user operation obtained by demodulation to the CPU 1032.

The CPU 1032 executes a program stored in the flash memory 1031, and controls all operations of the television receiver set 1000 according to control codes supplied from the light receiving unit 1037, or the like. The CPU 1032 and each unit of the television receiver set 1000 are connected via a route not shown.

The USB I/F 1033 transmits and receives data between an external device of the television receiver set 1000 that is connected thereto via a USB cable provided in a USB terminal 1036. The network I/F 1034 is connected to a network via a cable provided in the network terminal 1035, and also transmits and receives data other than audio data to and from various devices connected to the network.

The television receiver set 1000 can suppress deterioration in control accuracy of slice division while suppressing deterioration in convenience of content data acquired via a network and broadcast wave signals received via an antenna using the image decoding device 400 as the MPEG decoder 1017.

<5. Fifth Embodiment>

[Mobile Telephone]

Figure 23:
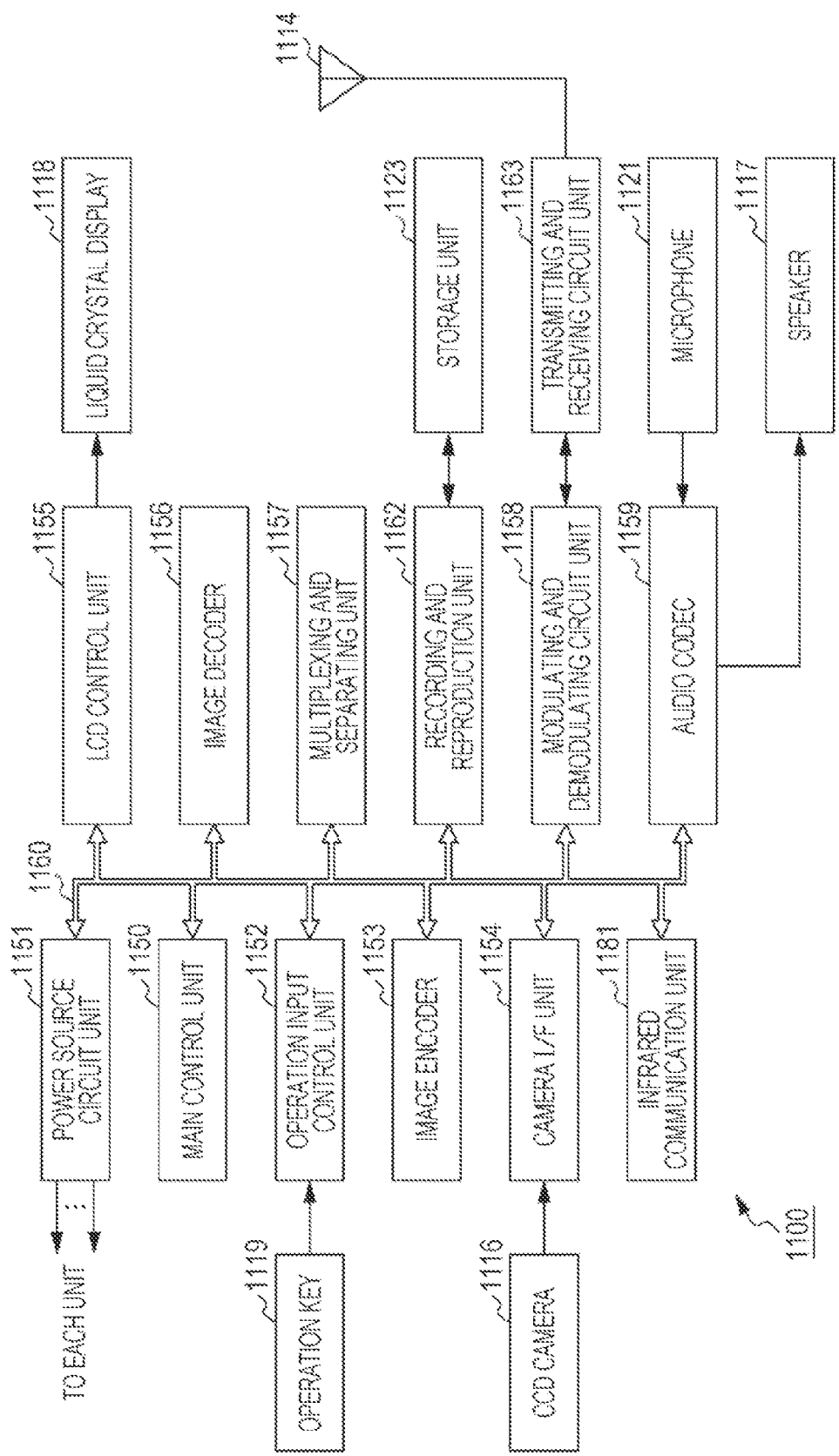
FIG. 23 is a block diagram showing a principal configuration example of a mobile telephone.

FIG. 23 is a block diagram showing a principal configuration example of a mobile telephone that uses the image encoding device 300 and the image decoding device 400.

The mobile telephone 1100 shown in FIG. 23 has a main control unit 1150 that performs overall control on each unit, a power source circuit unit 1151, an operation input control unit 1152, an image encoder 1153, a camera I/F unit 1154, an LCD control unit 1155, an image decoder 1156, a multiplexing and separating unit 1157, a recoding and reproduction unit 1162, a modulating and demodulating circuit unit 1158, and an audio codec 1159. They are connected to one another via a bus 1160.

In addition, the mobile telephone 1100 has operations keys 1119, a CCD (Charge Coupled Devices) camera 1116, a liquid crystal display 1118, a storage unit 1123, a transmitting and receiving circuit unit 1163, an antenna 1114, a microphone (mike) 1121, and a speaker 1117.

When a call is finished and the power source key is turned on by an operation of a user, the power source circuit unit 1151 starts the mobile telephone 1100 to be in an operable state by supplying power to each unit from a battery pack.

The mobile telephone 1100 performs various operations such as transmission and reception of audio signals, transmission and reception of electronic mails and image data, image photographing, data recording, or the like in various modes such as a voice call mode, data communication mode, and the like based on the control of the main control unit 1150 that includes a CPU, a ROM, a RAM, and the like.

For example, in the voice call mode, the mobile telephone 1100 converts audio signals collected in the microphone (mike) 1121 into digital audio data using the audio codec 1159, performs a spread spectrum process on the data using the modulating and demodulating circuit unit 1158, and then performs a digital-analog converting process and a frequency converting process on the data using the transmitting and receiving circuit unit 1163. The mobile telephone 1100 transmits signals for transmission obtained from the converting processes to a base station not shown via the antenna 1114. The signals for transmission (audio signals) transferred to the base station are supplied to a mobile telephone of a counterpart via a public telephone network.

In addition, in the voice call mode, for example, the mobile telephone 1100 amplifies the reception signals received from the antenna 1114 using the transmitting and receiving circuit unit 1163, further performs a frequency converting process and an analog/digital converting process on the signals, performs a despread spectrum process using the modulating and demodulating circuit unit 1158, and then converts the data into analog audio signals using the audio codec 1159. The mobile telephone 1100 output the analog audio signals obtained from the conversion from the speaker 1117.

Furthermore, when electronic mail is transmitted in a data communication mode, for example, the mobile telephone 1100 receives text data of the electronic mail input by an operation of the operation keys 1119 in the operation input control unit 1152. The mobile telephone 1100 processes the text data in the main control unit 1150, and causes the data to be displayed on the liquid crystal display 1118 via the LCD control unit 1155 as an image.

In addition, the mobile telephone 1100 generates an electronic mail based on the text data received by the operation input control unit 1152, a user instruction, and the like in the main control unit 1150. The mobile telephone 1100 performs a spread spectrum process on the electronic mail data using the modulating and demodulating circuit unit 1158, and then performs a digital/analog converting process and a frequency converting process on the data using the transmitting and receiving circuit unit 1163. The mobile telephone 1100 transmits signals for transmission obtained from the converting process to a base station, not shown, via the antenna 1114. The signals for transmission (electronic mail) transferred to the base station are supplied to a predetermined recipient via a network, a mail server, and the like.

In addition, when electronic mail is received in the data communication mode, for example, the mobile telephone 1100 receives signals transmitted from the base station in the transmitting and receiving circuit unit 1163 via the antenna 1114, amplifies the signals, and further performs a frequency converting process and an analog/digital converting process thereon. The mobile telephone 1100 restores the original electronic mail data by performing a despread spectrum process on the received signals using the modulating and demodulating circuit unit 1158. The mobile telephone 1100 displays the restored electronic mail data on the liquid crystal display 1118 via the LCD control unit 1155.

It should be noted that the mobile telephone 1100 also can record (store) the received electronic mail data in the storage unit 1123 via the recording and reproducing unit 1162.

The storage unit 1123 is an arbitrary rewritable storage medium. The storage unit 1123 may be a semiconductor memory, for example, a RAM, a built-in flash memory, or the like, may be a hard disk, or may be a removable medium such as a magnetic disk, a magneto-optical disc, an optical disc, a USB memory, or a memory card. Of course, other mediums may be possible.

Furthermore, when image data is transmitted in the data communication mode, for example, the mobile telephone 1100 generates image data using the CCD camera 1116 by imaging. The CCD camera 1116 has optical devices such as a lens, and a diaphragm, and a CCD as a photoelectric conversion element, images subjects, converts intensity of received light into electric signals, and generates image data of the image of a subject. The CCD camera 1116 encodes the image data using the image encoder 1153 via the camera I/F unit 1154 so as to convert the data into encoded image data.

The mobile telephone 1100 uses the above-described image encoding device 300 as the image encoder 1153 that performs the process as above. The image encoder 1153 controls the position of a slice boundary in units of CUs, includes the slice boundary address indicating the position of the slice boundary in a slice header, and adds the slice header before an LCU that includes the slice boundary, in the same manner as the image encoding device 300. In other words, the image encoder 1153 can set the control accuracy of slice division in units of CUs while maintaining the onion ring structure in syntax. In other words, the image encoder 1153 can enhance the control accuracy of data in an upper hierarchy while maintaining an inclusive relationship in which a high level includes a low level in a data management structure for data having a hierarchical structure. Accordingly, the image encoder 1153 can control deterioration in control accuracy of slice division while suppressing deterioration in convenience of encoded data.

Note that, at the same time, the mobile telephone 1100 performs analog-digital conversion in the audio codec 1159 on sound collected from the microphone (mike) 1121 during imaging by the CCD camera 1116, and further performs encoding.

The mobile telephone 1100 multiplexes the encoded image data supplied from the image encoder 1153 and the digital audio data supplied from the audio codec 1159 in a predetermined format in the multiplexing and separating unit 1157. The mobile telephone 1100 performs a spread spectrum process on the multiplexed data obtained from the result using the modulating and demodulating circuit unit 1158, and performs a digital-analog converting process and a frequency converting process on the data using the transmitting and receiving circuit unit 1163. The mobile telephone 1100 transmits signals for transmission obtained from the converting processes to a base station not shown via the antenna 1114. The signals for transmission (image data) transferred to the base station are supplied to a counterpart via a network, or the like.

It should be noted that, when image data is not transmitted, the mobile telephone 1100 can also display image data generated by the CCD camera 1116 on the liquid crystal display 1118 via the LCD control unit 1155, not via the image encoder 1153.

In addition, when data of a moving image file linked to a simple home page, or the like is received in the data communication mode, for example, the mobile telephone 1100 receives signals transmitted from a base station using the transmitting and receiving circuit unit 1163 via the antenna 1114, amplifies the signals, and further performs a frequency converting process and an analog/digital converting process thereon. The mobile telephone 1100 performs a despread spectrum process on the received signals using the modulating and demodulating circuit unit 1158 so as to restore the original multiplexed data. The mobile telephone 1100 separates the multiplexed data in the multiplexing and separating unit 1157 so as to divide the data into encoded image data and audio data.

The mobile telephone 1100 generates reproduced moving image data by decoding the encoded image data in the image decoder 1156, and causes the data to be displayed on the liquid crystal display 1118 via the LCD control unit 1155. Accordingly, for example, moving image data included in the moving image file linked to the simple home page is displayed on the liquid crystal display 1118.

The mobile telephone 1100 uses the above-described image decoding device 400 as the image decoder 1156 that performs the process as above. In other words, the image decoder 1156 reconstructs a slice structure set on the encoding side using a slice boundary address included in a slice header added before an LCU that includes the slice boundary of the encoded data, and decodes the encoded data according to the slice structure, in the same manner as the image decoding device 400. Thus, the image decoder 1156 can realize enhancement of control accuracy of data in an upper hierarchy while maintaining an inclusive relationship in which a high level includes a low level in a data management structure for data having a hierarchical structure. Accordingly, the image decoder 1156 can realize a method for suppressing deterioration in control accuracy of slice division while suppressing deterioration in convenience of encoded data.

In this case, at the same time, the mobile telephone 1100 converts digital audio data into analog audio signals using the audio codec 1159, and outputs the signals from the speaker 1117. Accordingly, audio data included in, for example, the moving image file linked to the simple home page is reproduced.

It should be noted that, in the same manner as the case of an electronic mail, the mobile telephone 1100 can also record (store) the received data linked to the simple home page, or the like in the storage unit 1123 via the recording and reproducing unit 1162.

In addition, the mobile telephone 1100 can analyze two-dimensional codes obtained from imaging by the CCD camera 1116 in the main control unit 1150, and thereby acquire information recorded in the two-dimensional codes.

Furthermore, the mobile telephone 1100 can communicate with an external device using infrared rays in the infrared communication unit 1181.

The mobile telephone 1100 can suppress deterioration in control accuracy of slice division while suppressing deterioration in convenience of encoded data by using the image encoding device 300 as the image encoder 1153 when, for example, the image data generated in the CCD camera 1116 is encoded and then transferred.

In addition, the mobile telephone 1100 can suppress deterioration in control accuracy of slice division while suppressing deterioration in convenience of data of the moving image file (encoded data) linked to, for example, the simple home page, or the like by using the image decoding device 400 as the image decoder 1156.

Note that, in the above description, the mobile telephone 1100 has been described as using the CCD camera 1116, but an image sensor (CMOS image sensor) using a CMOS (Complementary Metal Oxide Semiconductor) may be used instead of the CCD camera 1116. Also in this case, the mobile telephone 1100 can image subjects, and generate image data of the images of the subjects in the same manner as when the CCD camera 1116 is used.

In addition, the mobile telephone 1100 has been described hereinabove, but any equipment can apply the image encoding device 300 and the image decoding device 400 in the same manner as the mobile telephone 1100 as long as the equipment, for example, a PDA (Personal Digital Assistants), a smartphone, a UMPC (Ultra Mobile Personal Computer), a netbook, a note-type personal computer, or the like has the same imaging function and communication function as the mobile telephone 1100.

<6. Sixth Embodiment>

[Hard Disk Recorder]

Figure 24:
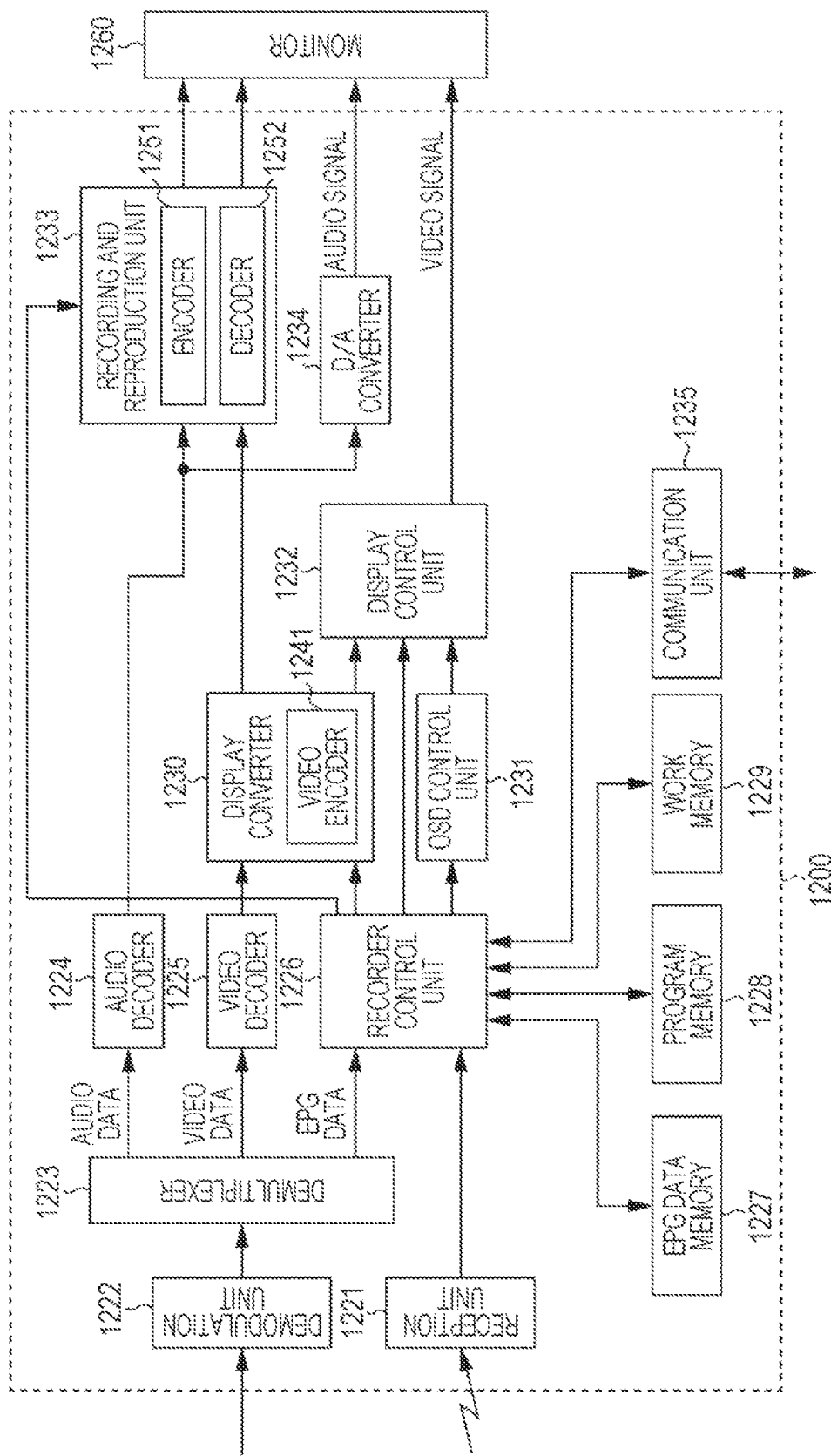
FIG. 24 is a block diagram showing a principal configuration example of a hard disk recorder.

FIG. 24 is a block diagram showing a principal configuration example of a hard disk recorder using the image encoding device 300 and the image decoding device 400.

The hard disk recorder (HDD recorder) 1200 shown in FIG. 24 is a device that stores audio data and video data of a broadcasting program included in broadcast wave signals (television signals) transmitted from satellite and terrestrial antennas, and the like which are received by a tuner in a built-in hard disk, provides the stored data to a user at a timing according to a user instruction.

The hard disk recorder 1200 can extract audio data and video data from, for example, broadcast wave signals, appropriately decode the signals, and store them in a built-in hard disk. In addition, the hard disk recorder 1200 can also acquire audio data and video data from, for example, other devices via a network, appropriately decode the data, and store the data in the built-in hard disk.

Furthermore, the hard disk recorder 1200 can decode the audio data and video data recorded on, for example, the built-in hard disk so as to be supplied to a monitor 1260, causes images thereof to be displayed on the screen of the monitor 1260, and causes sound thereof to be output from a speaker of the monitor 1260. In addition, the hard disk recorder 1200 also can decode, for example, the audio data and video data extracted from the broadcast wave signals acquired via the tuner, or the audio data and video data acquired from other devices via a network so as to be supplied to the monitor 1260, causes images thereof to be displayed on the screen of the monitor 1260, and causes sound thereof to be output from the speaker of the monitor 1260.

Of course, other operations are also possible.

As shown in FIG. 24, the hard disk recorder 1200 has a reception unit 1221, a demodulation unit 1222, a demultiplexer 1223, an audio decoder 1224, a video decoder 1225, and a recorder control unit 1226. The hard disk recorder 1200 further has an EPG data memory 1227, a program memory 1228, a work memory 1229, a display converter 1230, an OSD (On Screen Display) control unit 1231, a display control unit 1232, a recording and reproduction unit 1233, a D/A converter 1234, and a communication unit 1235.

In addition, the display converter 1230 has a video encoder 1241. The recording and reproduction unit 1233 has an encoder 1251 and a decoder 1252.

The reception unit 1221 receives infrared signals from a remote controller (not shown), and converts the signals into electric signals and then outputs the signals to the recorder control unit 1226. The recorder control unit 1226 includes, for example, a microprocessor, or the like, and executes various processes according to a program stored in the program memory 1228. In this case, the recorder control unit 1226 uses the work memory 1229, if necessary.

The communication unit 1235 is connected to a network, and performs communication processes with other devices via the network. For example, the communication unit 1235 is controlled by the recorder control unit 1226, communicates with a tuner (not shown), and outputs tuning control signals mainly to the tuner.

The demodulation unit 1222 demodulates the signals supplied from the tuner, and outputs the data to the demultiplexer 1223. The demultiplexer 1223 separates the data supplied from the demodulation unit 1222 into audio data, video data, and EPG data, and outputs the data to the audio decoder 1224, the video decoder 1225, or the recorder control unit 1226, respectively.

The audio decoder 1224 decodes the input audio data, and outputs the data to the recording and reproduction unit 1233. The video decoder 1225 decodes the input video data, and outputs the data to the display converter 1230. The recorder control unit 1226 supplies the input EPG data to the EPG data memory 1227 so as to be stored.

The display converter 1230 encodes the video data supplied from the video decoder 1225 or the recorder control unit 1226 using the video encoder 1241 to be, for example, video data in an NTSC (National Television Standards Committee) format, and outputs the data to the recording and reproduction unit 1233. In addition, the display converter 1230 converts the size of the screen of the video data supplied from the video decoder 1225 or the recorder control unit 1226 into a size corresponding to the size of the monitor 1260, converts the data into video data in the NTSC format using the video encoder 1241, converts the data input analog signals, and then outputs the data to the display control unit 1232.

The display control unit 1232 overlaps an OSD signal output by the OSD (On-screen Display) control unit 1231 on the video signal input by the display converter 1230 based on the control of the recorder control unit 1226, outputs the data to the display of the monitor 1260 so as to be displayed.

In addition, the audio data output by the audio decoder 1224 is converted into analog signals by the D/A converter 1234 and supplied to the monitor 1260. The monitor 1260 outputs the audio signals from a built-in speaker.

The recording and reproduction unit 1233 has a hard disk as a storage medium on which video data, audio data, and the like are recorded.

The recording and reproduction unit 1233 encodes, for example, the audio data supplied from the audio decoder 1224 using the encoder 1251. In addition, the recording and reproduction unit 1233 encodes the video data supplied from the video encoder 1241 of the display converter 1230 using the encoder 1251. The recording and reproduction unit 1233 synthesizes the encoded data of the audio data and the encoded data of the video data using a multiplexer. The recording and reproduction unit 1233 amplifies the synthesized data by performing channel coding, and writes the data on the hard disk via a recording head.

The recording and reproduction unit 1233 reproduces the data recorded on the hard disk via a reproduction head, amplifies the data, and separates the data into audio data and video data using the demultiplexer. The recording and reproduction unit 1233 decodes the audio data and video data using the decoder 1252. The recording and reproduction unit 1233 performs D/A conversion on the decoded audio data, and outputs the data to the speaker of the monitor 1260. In addition, the recording and reproduction unit 1233 performs D/A conversion on the decoded video data, and outputs the data to the display of the monitor 1260.

The recorder control unit 1226 reads the latest EPG data from the EPG data memory 1227 based on a user instruction expressed in infrared signals from the remote controller received via the reception unit 1221, and supplies the data to the OSD control unit 1231. The OSD control unit 1231 generates image data corresponding to the input EPG data, and outputs the data to the display control unit 1232. The display control unit 1232 outputs the video data input from the OSD control unit 1231 to the display of the monitor 1260 so as to be displayed. Accordingly, the display of the monitor 1260 displays an EPG (Electronic Program Guide).

In addition, the hard disk recorder 1200 can acquire various types of data such as video data, audio data, EPG data, and the like supplied from other devices via a network such as the Internet.

The communication unit 1235 is controlled by the recorder control unit 1226, acquires encoded data such as video data, audio data, EPG data, and the like transmitted from other devices via a network, and supplies the data to the recorder control unit 1226. The recorder control unit 1226 supplies the encoded data, for example, the acquired video data and audio data to the recording and reproduction unit 1233 so as to be stored in the hard disk. In this case, the recorder control unit 1226 and the recording and reproduction unit 1233 may perform the encoding process, and the like again, if necessary.

In addition, the recorder control unit 1226 decodes the encoded data of the acquired video data and audio data, and supplies the obtained video data to the display converter 1230. The display converter 1230 processes the video data supplied from the recorder control unit 1226 in the same manner as the video data supplied from the video decoder 1225, supplies the data to the monitor 1260 via the display control unit 1232 so that an image thereof is displayed.

In addition, in accordance with the image display, the recorder control unit 1226 may supply the decoded audio data to the monitor 1260 via the D/A converter 1234 so that sound thereof is output from the speaker.

Furthermore, the recorder control unit 1226 decodes encoded data of the acquired EPG data, and supplies the decoded EPG data to the EPG data memory 1227.

As above, the hard disk recorder 1200 uses the image decoding device 400 as the video decoder 1225, the decoder 1252, and the decoder built in the recorder control unit 1226. In other words, the video decoder 1225, the decoder 1252, and the decoder built in the recorder control unit 1226 reconstructs a slice structure set on the encoding side using a slice boundary address included in a slice header added before an LCU that includes a slice boundary of encoded data, and decodes the encoded data according to the slice structure, in the same manner as the image decoding device 400. Thus, the video decoder 1225, the decoder 1252, and the decoder built in the recorder control unit 1226 can realize enhancement in control accuracy of data in an upper hierarchy while maintaining an inclusive relationship in which a high level includes a low level in a data management structure for data having a hierarchical structure. Accordingly, the video decoder 1225, the decoder 1252, and the decoder built in the recorder control unit 1226 can realize the method for suppressing deterioration in control accuracy of slice division while suppressing deterioration in convenience of encoded data.

Thus, the hard disk recorder 1200 can suppress deterioration in control accuracy of slice division while suppressing deterioration in convenience of video data (encoded data) that, for example, the tuner and the communication unit 1235 receives and video data (encoded data) that the recording and reproduction unit 1233 reproduces.

In addition, the hard disk recorder 1200 uses the image encoding device 300 as the encoder 1251. Thus, the encoder 1251 controls the position of the slice boundary in units of CUs, causes the slice boundary address indicating the position of the slice boundary to be included in a slice header, and adds the slice header before an LCU that includes the slice boundary, in the same manner as the image encoding device 300. In other words, the encoder 1251 can set control accuracy of slice division in units of CUs while maintaining the onion ring structure in syntax. In other words, the encoder 1251 can improve control accuracy of data in an upper hierarchy while maintaining the inclusive relationship in which a high level includes a low level in the data management structure for data having a hierarchical structure. Accordingly, the encoder 1251 can suppress deterioration in control accuracy of slice division while suppressing deterioration in convenience of encoded data.

Thus, the hard disk recorder 1200 can suppress deterioration in control accuracy of slice division while suppressing deterioration in convenience of encoded data, for example, recorded in the hard disk.

Note that, hereinabove, the hard disk recorder 1200 that records video data and audio data on a hard disk has been described, but of course, any recording medium may be possible. Any recorder to which a recording medium, for example a flash memory, an optical disk, a video tape, or the like other than a hard disk is applied can apply the image encoding device 300 and the image decoding device 400, in the same manner as the above-described hard disk recorder 1200.

<7. Seventh Embodiment>
[Camera]

Figure 25:
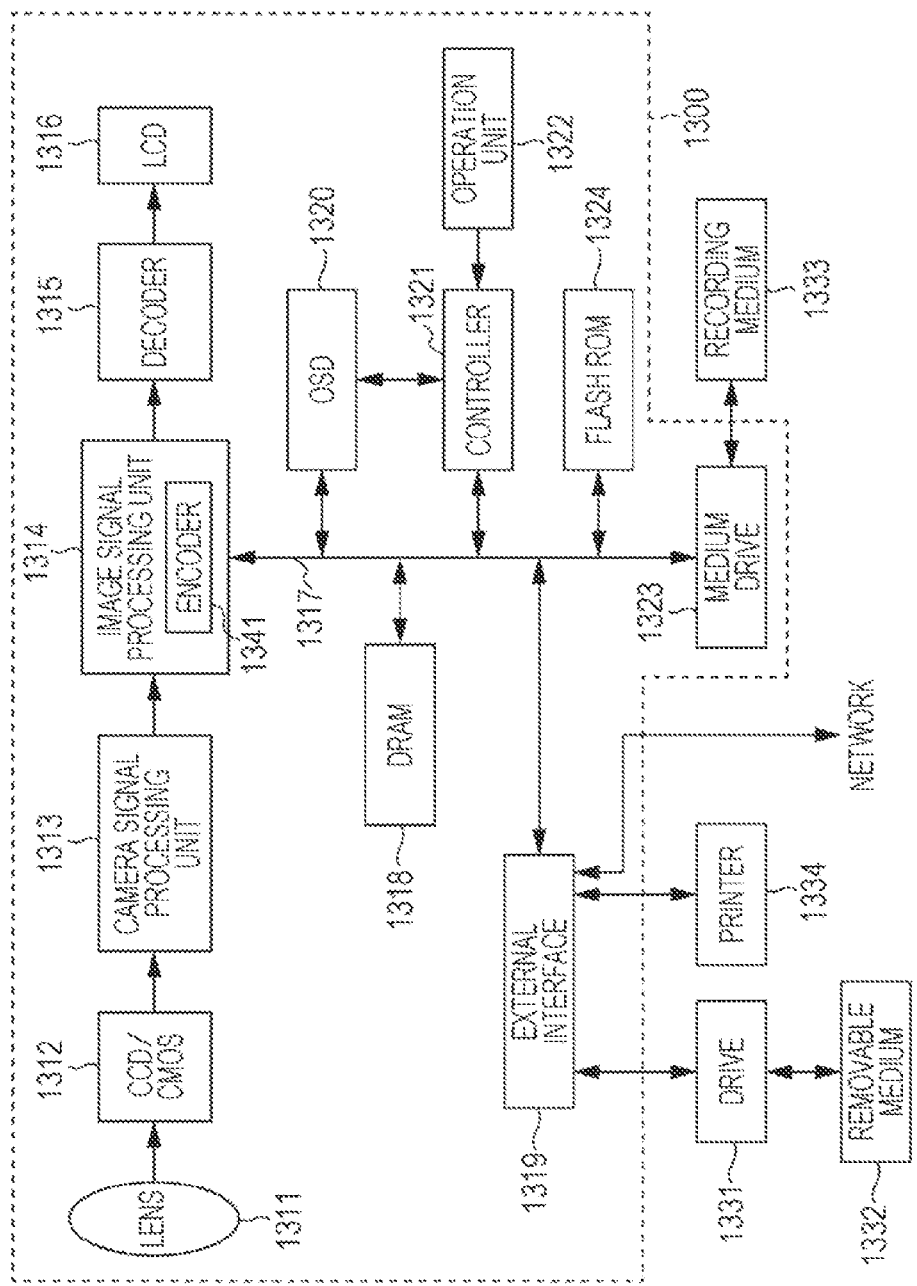
FIG. 25 is a block diagram showing a principal configuration example of a camera.

FIG. 25 is a block diagram showing a principal configuration example of a camera using the image encoding device 300 and the image decoding device 400.

The camera 1300 shown in FIG. 25 images subjects, displays the images of the subjects on an LCD 1316, or records the images on a recording medium 1333 as image data.

A lens block 1311 causes light (in other words, a video of a subject) to be incident to a CCD/CMOS 1312. The CCD/CMOS 1312 is an image sensor using a CCD or a CMOS, converts intensity of received light into electric signals, and supplies the signals to a camera signal processing unit 1313.

The camera signal processing unit 1313 converts the electric signals supplied from the CCD/CMOS 1312 into color-difference signals of Y, Cr, and Cb, and supplies the signals to an image signal processing unit 1314. The image signal processing unit 1314 performs a predetermined image process on the image signals supplied from the camera signal processing unit 1313, or encodes the image signals using an encoder 1341 under the control of a controller 1321. The image signal processing unit 1314 supplies the encoded data generated by encoding the image signals to a decoder 1315. Furthermore, the image signal processing unit 1314 acquires data for display generated in an on-screen display (OSD) 1320, and then supplies the data to the decoder 1315.

In the above process, the camera signal processing unit 1313 appropriately uses a DRAM (Dynamic Random Access Memory) 1318 connected via a bus 1317 so as to retain the image data, the encoded data obtained by encoding the image data, and the like in the DRAM 1318, if necessary.

The decoder 1315 decodes the encoded data supplied from the image signal processing unit 1314, and supplies the obtained image data (decoded image data) to the LCD 1316. In addition, the decoder 1315 supplies the data for display supplied from the image signal processing unit 1314 to the LCD 1316. The LCD 1316 appropriately synthesizes images of the decoded image data supplied from the decoder 1315 and images of the data for display, and then displays the synthesized images thereon.

The on-screen display 1320 outputs the data for display such as a menu screen, icons, and the like including symbols, characters, or figures to the image signal processing unit 1314 via the bus 1317 under the control of the controller 1321.

The controller 1321 executes various processes and controls the image signal processing unit 1314, the DRAM 1318, an external interface 1319, an on-screen display 1320, a medium drive 1323, and the like, via the bus 1317 based on signals indicating the content instructed by user using an operation unit 1322. A FLASH ROM 1324 stores program, data, and the like necessary for the controller 1321 to execute various processes.

For example, the controller 1321 can encode image data stored in the DRAM 1318, or decode the encoded data stored in the DRAM 1318, instead of the image signal processing unit 1314 or the decoder 1315. In this case, the controller 1321 may perform encoding and decoding processes in the same formats as encoding and decoding formats of the image signal processing unit 1314 or the decoder 1315, or may perform encoding and decoding processes in formats not corresponding to those of the image signal processing unit 1314 or the decoder 1315.

In addition, when a start of image printing is instructed from the operation unit 1322, for example, the controller 1321 reads image data from the DRAM 1318, and supplies the data to a printer 1334 connected to the external interface 1319 via the bus 1317 so as to be printed.

Furthermore, when image recording is instructed from the operation unit 1322, for example, the controller 1321 reads encoded data from the DRAM 1318, and supplies the data to the recording medium 1333 loaded on the medium drive 1323 via the bus 1317 so as to be stored.

The recording medium 1333 is an arbitrary readable and writable removable medium, for example, a magnetic disk, a magneto-optical disc, an optical disk, a semiconductor memory, or the like. Of course, the type of the removable medium 1333 is also arbitrary, and a tape device may be possible, a disk may be possible, and a memory card may be possible. Of course, a non-contact IC card, or the like may be possible.

In addition, the medium drive 1323 may be integrated with the recording medium 1333 so as to be configured as a non-portable storage medium, for example, a built-in hard disk drive, an SSD (Solid State Drive), or the like.

The external interface 1319 is configured as, for example, a USB input and output terminal, or the like, and is connected to the printer 1334 when printing images. In addition, the drive 1331 is connected to the external interface 1319, if necessary, and the removable medium 1332 such as a magnetic disk, an optical disc, a magneto-optical disc, or the like is appropriately loaded therein, and a computer program read from the medium is installed in the FLASH ROM 1324, if necessary.

Furthermore, the external interface 1319 has a network interface connected to a predetermined network such as a LAN, the Internet, or the like. The controller 1321 can read encoded data from the DRAM 1318, and supplies the data to other devices that are connected via the network from the external interface 1319 according to, for example, instructions from the operation unit 1322. In addition, the controller 1321 can acquire encoded data and image data supplied from other devices via the network through the external interface 1319, and then retain the data in the DRAM 1318, or supply the data to the image signal processing unit 1314.

The camera 1300 as described above uses the image decoding device 400 as the decoder 1315. In other words, the decoder 1315 reconstructs a slice structure set on the encoding side and decodes encoded data according to the slice structure using a slice boundary address included in a slice header added before an LCU that includes a slice boundary of the encoded data, in the same manner as the image decoding device 400. Thus, the decoder 1315 can realize enhancement in control accuracy of data in an upper hierarchy while maintaining an inclusive relationship in which a high level includes a low level in a data management structure for data having a hierarchical structure.

Accordingly, the decoder 1315 can realize the method for suppressing deterioration in control accuracy of slice division while suppressing deterioration in convenience of encoded data.

Thus, the camera 1300 can suppress deterioration in control accuracy of slice division while suppressing deterioration in convenience of image data generated in, for example, the CCD/CMOS 1312, encoded data of video data read from the DRAM 1318 or the recording medium 1333, and encoded data of video data acquired via a network.

In addition, the camera 1300 uses the image encoding device 300 as an encoder 1341. The encoder 1341 controls the position of a slice boundary in units of CUs, causes a slice boundary address indicating the position of the slice boundary to be included in a slice header, and adds the slice header before an LCU that includes the slice boundary, in the same manner as the image encoding device 300.

In other words, the encoder 1341 can set control accuracy of slice division in units of CUs while maintaining an onion ring structure in syntax. In other words, the encoder 1341 can enhance control accuracy of data in an upper hierarchy while maintaining an inclusive relationship in which a high level includes a low level in a data management structure for data having a hierarchical structure. Accordingly, the encoder 1341 can suppress deterioration in control accuracy of slice division while suppressing deterioration in convenience of encoded data.

Thus, the camera 1300 can suppress deterioration in control accuracy of slice division while suppressing deterioration in convenience of encoded data recorded on, for example, the DRAM 1318 and the recording medium 1333, and encoded data supplied to other devices.

It should be noted that the decoding method of the image decoding device 400 may be applied to the decoding process performed by the controller 1321. In the same manner, the encoding method of the image encoding device 300 may be applied to the encoding process performed by the controller 1321.

In addition, image data imaged by the camera 1300 may be a moving image, or may be a still image.

Of course, the image encoding device 300 and the image decoding device 400 can also be applied to equipment and systems other than the above-described equipment.

The present technology can be applied to an image encoding device and image decoding device used when image information (bit streams) compressed using orthogonal transform such as discrete cosine transform and motion compensation, for example, MPEG, H.26x, or the like is received via a network medium such as satellite broadcasting, cable TV, the Internet, or a mobile telephone, or is processed on a storage medium such as optical and magnetic disks, and a flash memory.

Note that the present technology can also take the following configurations.

(1) An image processing device that includes a setting unit that sets the position of a boundary of image data in an upper hierarchy unit to be in a lower hierarchy unit that is lower than the upper hierarchy unit when the image data is encoded in a unit of encoding with a hierarchical structure;

an encoding unit that generates encoded data by encoding the image data according to the position of the boundary set by the setting unit; and an addition unit that adds information on the image data in the upper hierarchy unit before encoded data in an intermediate hierarchy unit that includes the boundary set by the setting unit, is lower than the upper hierarchy unit, and is higher than the lower hierarchy unit.

(2) The image processing device described in (1) above, in which the upper hierarchy unit is a slice, the intermediate hierarchy unit is an LCU (Largest Coding Unit), and the lower hierarchy unit is a CU (Coding Unit).

(3) The image processing device described in (2) above, in which the information on the image data in the upper hierarchy unit is a slice header of the encoded data.

(4) The image processing device described in (3) above, which further includes a computation unit that computes a slice boundary address indicating the position of the boundary set by the setting unit; and a generation unit that generates the slice header that includes the slice boundary address computed by the computation unit, in which the addition unit adds the slice header generated by the generation unit before the LCU that includes the boundary.

(5) The image processing device described in (4) above, in which, when a plurality of boundaries of slices are set in one LCU by the setting unit, the addition unit adds the slice header of a slice of which the boundary thereof serves as the head before the LCU.

(6) The image processing device described in (4) or (5) above, in which, the slice boundary address is information indicating the position of the boundary in a data processing order in a unit of SCU (Smallest Coding Unit) within the LCU.

(7) The image processing device described in (4) or (5) above, in which the slice boundary address is information indicating the position of the boundary in the coordinates in a unit of SCU (Smallest Coding Unit) in the horizontal direction and the vertical direction within the LCU.

(8) The image processing device described in (4) or (5) above, in which the slice boundary address is information indicating the position of the boundary in a data processing order in a unit of CU within the LCU.

(9) The image processing device described in any one of (1) to (8) above, in which the upper hierarchy unit is an entropy slice, the intermediate hierarchy unit is an LCU (Largest Coding Unit), and the lower hierarchy unit is a CU (Coding Unit).

(10) An image processing method of an image processing device which includes setting, by a setting unit, the position of a boundary of image data in an upper hierarchy unit to be in a lower hierarchy unit that is lower than the upper hierarchy unit when the image data is encoded in a unit of encoding with a hierarchical structure;

generating, by an encoding unit, encoded data by encoding the image data according to the position of the set boundary; and adding, by an addition unit, information on the image data in the upper hierarchy unit before encoded data in an intermediate hierarchy unit that includes the set boundary, is lower than the upper hierarchy unit, and is higher than the lower hierarchy unit.

(11) An image processing device which includes an extraction unit that extracts information on image data in an upper hierarchy unit added before encoded data in an intermediate hierarchy unit that includes a boundary of the image data in the upper hierarchy unit set in a lower hierarchy unit that is lower than the upper hierarchy unit, is lower than the upper hierarchy unit, and is higher than the lower hierarchy unit from encoded data obtained by encoding the image data in a unit of encoding with a hierarchical structure;

a decision unit that decides the position of the boundary of the image data in the upper hierarchy unit based on the information on the image data in the upper hierarchy unit extracted by the extraction unit; and a decoding unit that decodes the encoded data according to the position of the boundary of the image data in the upper hierarchy unit decided by the decision unit.

(12) The image processing device described in (11) above, in which the upper hierarchy unit is a slice, the intermediate hierarchy unit is an LCU (Largest Coding Unit), and the lower hierarchy unit is a CU (Coding Unit).

(13) The image processing device described in (12) above, in which the information on the image data in the upper hierarchy unit is a slice header of the encoded data.

(14) The image processing device described in (13), which further includes an address decoding unit that decodes encoded data of a slice boundary address indicating the position of the boundary of a slice included in the slice header extracted by the extraction unit, in which the decision unit decides a CU that serves as the boundary of the slice based on the slice boundary address obtained from decoding by the address decoding unit.

(15) The image processing device described in (14) above, in which the slice boundary address is information indicating the position of the boundary in a data processing order in a unit of SCU (Smallest Coding Unit) within the LCU.

(16) The image processing device described in (14) or (15) above, in which the slice boundary address is information indicating the position of the boundary in the coordinates in a unit of SCU (Smallest Coding Unit) in the horizontal direction and the vertical direction within the LCU.

(17) The image processing device described in (14) or (15) above, in which the slice boundary address is information indicating the position of the boundary in a data processing order in a unit of CU within the LCU.

(18) The image processing device described in any one of (14) to (17) above, in which, when one LCU includes a plurality of boundaries of slices, and a plurality of slice headers are added before the LCU, the extraction unit extracts each slice header added before the LCU; and the decision unit decides the positions of the boundaries of each slice based on each slice header.

(19) The image processing device described in any one of (11) to (18) above, in which the upper hierarchy unit is an entropy slice, the intermediate hierarchy unit is an LCU (Largest Coding Unit), and the lower hierarchy unit is a CU (Coding Unit).

(20) An image processing method of an image processing device which includes extracting, by an extraction unit, information on image data in an upper hierarchy unit added before encoded data in an intermediate hierarchy unit that includes a boundary of the image data in the upper hierarchy unit set in a lower hierarchy unit that is lower than the upper hierarchy unit, is lower than the upper hierarchy unit, and is higher than the lower hierarchy unit from encoded data obtained by encoding the image data in a unit of encoding with a hierarchical structure;

deciding, by a decision unit, the position of the boundary of the image data in the upper hierarchy unit based on the extracted information on the image data in the upper hierarchy unit; and decoding, by a decoding unit, the encoded data according to the decided position of the boundary of the image data in the upper hierarchy unit.

REFERENCE SIGNS LIST

300 IMAGE ENCODING DEVICE
306 LOSSLESS ENCODING UNIT
321 SLICE HEADER ENCODING UNIT
331 SLICE SETTING UNIT
332 SLICE STRUCTURE ENCODING UNIT
333 CU DATA ENCODING UNIT
341 SLICE BOUNDARY ADDRESS COMPUTATION UNIT
342 SLICE HEADER GENERATION UNIT
400 IMAGE DECODING DEVICE
402 LOSSLESS DECODING UNIT
421 SLICE HEADER DECODING UNIT
431 NAL DATA BUFFER
432 SLICE HEADER BUFFER
433 SLICE STRUCTURE DECISION UNIT
434 CU DATA DECODING UNIT
441 SLICE BOUNDARY ADDRESS BUFFER
442 SLICE BOUNDARY DECODING UNIT

The invention claimed is:

1. An image processing device comprising:
a setting unit that sets the position of a boundary of image data in an upper hierarchy unit to be in a lower hierarchy unit that is lower than the upper hierarchy unit when the image data is encoded in a unit with a hierarchical structure;
an encoding unit that generates encoded data by encoding the image data according to the position of the boundary set by the setting unit; and
an addition unit that adds information on the image data in the upper hierarchy unit before encoded data in an intermediate hierarchy unit that includes the boundary set by the setting unit, is lower than the upper hierarchy unit, and is higher than the lower hierarchy unit,
wherein the upper hierarchy unit is a slice, the intermediate hierarchy unit is an LCU (Largest Coding Unit) that is a unit of encoding having a maximum size, and the lower hierarchy unit is a CU (Coding Unit) that is a unit of encoding,
wherein the addition unit sets the information on the image data in the upper hierarchy unit to be a slice header of the encoded data,
wherein the addition unit sets a slice boundary address indicating the position of the boundary set by the setting unit as the slice header, and adds the set slice header before the LCU that includes the boundary,
wherein, when a plurality of boundaries of slices are set in one LCU by the setting unit, the addition unit organizes and disposes the address of the unit of encoding indicating the position of the unit of encoding positioned in the head of the slices before the LCU as a slice header, and wherein the setting unit, the encoding unit, and the addition unit are each implemented via at least one processor.

2. The image processing device according to claim 1, wherein the slice boundary address is information indicating the position of the boundary in a data processing order in a unit of SCU (Smallest Coding Unit) within the LCU.

3. The image processing device according to claim 1, wherein the slice boundary address is information indicating the position of the boundary in the coordinates in a unit of SCU (Smallest Coding Unit) in the horizontal direction and the vertical direction within the LCU.

4. The image processing device according to claim 1, wherein the slice boundary address is information indicating the position of the boundary in a data processing order in a unit of CU within the LCU.

5. An image processing device comprising:
a setting unit that sets the position of a boundary of image data in an upper hierarchy unit to be in a lower hierarchy unit that is lower than the upper hierarchy unit when the image data is encoded in a unit with a hierarchical structure;
an encoding unit that generates encoded data by encoding the image data according to the position of the boundary set by the setting unit; and
an addition unit that adds information on the image data in the upper hierarchy unit before encoded data in an intermediate hierarchy unit that includes the boundary set by the setting unit, is lower than the upper hierarchy unit, and is higher than the lower hierarchy unit,
wherein the upper hierarchy unit is a slice, the intermediate hierarchy unit is an LCU (Largest Coding Unit) that is a unit of encoding having a maximum size, and the lower hierarchy unit is a CU (Coding Unit) that is a unit of encoding,
wherein the addition unit sets the information on the image data in the upper hierarchy unit to be a slice header of the encoded data,
wherein the addition unit sets a slice boundary address indicating the position of the boundary set by the setting unit as the slice header, and adds the set slice header before the LCU that includes the boundary,
wherein, when a plurality of boundaries of slices are set in one LCU by the setting unit, the addition unit organizes and disposes a plurality of slice boundary addresses before the LCU as slice headers, and
wherein the setting unit, the encoding unit, and the addition unit are each implemented via at least one processor.

6. An image processing method of an image processing device, comprising:
setting, by a setting unit, the position of a boundary of image data in an upper hierarchy unit to be in a lower hierarchy unit that is lower than the upper hierarchy unit when the image data is encoded in a unit having a hierarchical structure;
generating, by an encoding unit, encoded data by encoding the image data according to the position of the set boundary; and
adding, by an addition unit, information on the image data in the upper hierarchy unit before encoded data in an intermediate hierarchy unit that includes the set boundary, is lower than the upper hierarchy unit, and is higher than the lower hierarchy unit,
wherein the upper hierarchy unit is a slice, the intermediate hierarchy unit is an LCU (Largest Coding Unit) that is a unit of encoding having a maximum size, and the lower hierarchy unit is a CU (Coding Unit) that is a unit of encoding,
wherein the information on the image data in the upper hierarchy unit is set by the addition unit to be a slice header of the encoded data,
wherein a slice boundary address indicating the position of the boundary set by the setting unit is set by the addition unit as the slice header, and the set slice header is added by the addition unit before the LCU that includes the boundary, and
wherein, when a plurality of boundaries of slices are set in one LCU by the setting unit, the address of the unit of encoding indicating the position of the unit of encoding positioned in the head of the slices before the LCU is organized and disposed by the addition unit as a slice header.

7. An image processing device comprising:
an extraction unit that extracts information on image data in an upper hierarchy unit added before encoded data in an intermediate hierarchy unit that includes a boundary of the image data in the upper hierarchy unit set in a lower hierarchy unit that is lower than the upper hierarchy unit, is lower than the upper hierarchy unit, and is higher than the lower hierarchy unit from encoded data obtained by encoding the image data in a unit having a hierarchical structure;
a decision unit that decides the position of the boundary of the image data in the upper hierarchy unit based on the information on the image data in the upper hierarchy unit extracted by the extraction unit;
a decoding unit that decodes the encoded data according to the position of the boundary of the image data in the upper hierarchy unit decided by the decision unit,
wherein the upper hierarchy unit is a slice, the intermediate hierarchy unit is an LCU (Largest Coding Unit) that is a unit of encoding having a maximum size, and the lower hierarchy unit is a CU (Coding Unit) that is a unit of encoding, and wherein the extraction unit extracts the information on the image data in the upper hierarchy unit from a slice header of the encoded data; and
an address decoding unit that decodes encoded data of a slice boundary address indicating the position of the boundary of the slice included in the information on the image data in the upper hierarchy unit extracted from the slice header by the extraction unit,
wherein the decision unit decides a CU that serves as the boundary of the slice based on the slice boundary address obtained from decoding by the address decoding unit,
wherein, when one LCU includes a plurality of boundaries of slices, and a plurality of addresses of units of encoding indicating the positions of the units of encoding positioned in the head of the slices are organized and disposed before the LCU as slice headers, the extraction unit extracts the plurality of addresses of units of encoding from the slice headers added before the LCU, and the decision unit decides the positions of the boundaries of each slide based on the plurality of extracted addresses of the units of encoding, and
wherein the extraction unit, the decision unit, the decoding unit, and the address decoding unit are each implemented via at least one processor.

8. The image processing device according to claim 7, wherein the slice boundary address is information indicating the position of the boundary in a data processing order in a unit of SCU (Smallest Coding Unit) within the LCU.

9. The image processing device according to claim 7, wherein the slice boundary address is information indicating the position of the boundary in the coordinates in a unit of SCU (Smallest Coding Unit) in the horizontal direction and the vertical direction within the LCU.

10. The image processing device according to claim 7, wherein the slice boundary address is information indicating the position of the boundary in a data processing order in a unit of CU within the LCU.

11. An image processing device comprising:
  an extraction unit that extracts information on image data in an upper hierarchy unit added before encoded data in an intermediate hierarchy unit that includes a boundary of the image data in the upper hierarchy unit set in a lower hierarchy unit that is lower than the upper hierarchy unit, is lower than the upper hierarchy unit, and is higher than the lower hierarchy unit from encoded data obtained by encoding the image data in a unit having a hierarchical structure;
  a decision unit that decides the position of the boundary of the image data in the upper hierarchy unit based on the information on the image data in the upper hierarchy unit extracted by the extraction unit;
  a decoding unit that decodes the encoded data according to the position of the boundary of the image data in the upper hierarchy unit decided by the decision unit, wherein the upper hierarchy unit is a slice, the intermediate hierarchy unit is an LCU (Largest Coding Unit) that is a unit of encoding having a maximum size, and the lower hierarchy unit is a CU (Coding Unit) that is a unit of encoding, and wherein the extraction unit extracts the information on the image data in the upper hierarchy unit from a slice header of the encoded data; and
  an address decoding unit that decodes encoded data of a slice boundary address indicating the position of the boundary of the slice included in the information on the image data in the upper hierarchy unit extracted from the slice header by the extraction unit,
  wherein the decision unit decides a CU that serves as the boundary of the slice based on the slice boundary address obtained from decoding by the address decoding unit,
  wherein, when one LCU includes a plurality of boundaries of slices, and a plurality of slice boundary addresses are organized and disposed before the LCU as slice headers, the extraction unit extracts the plurality of slice boundary addresses from the slice headers added before the LCU, and the decision unit decides the positions of the boundaries of each slice based on the plurality of extracted slice boundary addresses, and
  wherein the extraction unit, the decision unit, the decoding unit, and the address decoding unit are each implemented via at least one processor.

12. An image processing method of an image processing device comprising:
  extracting, by an extraction unit, information on image data in an upper hierarchy unit added before encoded data in an intermediate hierarchy unit that includes a boundary of the image data in the upper hierarchy unit set in a lower hierarchy unit that is lower than the upper hierarchy unit, is lower than the upper hierarchy unit, and is higher than the lower hierarchy unit from encoded data obtained by encoding the image data in a unit having a hierarchical structure;
  deciding, by a decision unit, the position of the boundary of the image data in the upper hierarchy unit based on the extracted information on the image data in the upper hierarchy unit;
  decoding, by a decoding unit, the encoded data according to the decided position of the boundary of the image data in the upper hierarchy unit, wherein the upper hierarchy unit is a slice, the intermediate hierarchy unit is an LCU (Largest Coding Unit) that is a unit of encoding having a maximum size, and the lower hierarchy unit is a CU (Coding Unit) that is a unit of encoding, and wherein the information on the image data in the upper hierarchy unit is extracted by the extraction unit from a slice header of the encoded data;
  decoding, by an address decoding unit, encoded data of a slice boundary address indicating the position of the boundary of the slice included in the information on the image data in the upper hierarchy unit extracted from the slice header by the extraction unit; and
  deciding, by the decision unit, a CU that serves as the boundary of the slice based on the slice boundary address obtained from decoding by the address decoding unit,
  wherein, when one LCU includes a plurality of boundaries of slices, and a plurality of addresses of units of encoding indicating the positions of the units of encoding positioned in the head of the slices are organized and disposed before the LCU as slice headers, the plurality of addresses of units of encoding is extracted by the extraction unit from the slice headers added before the LCU, and the positions of the boundaries of each slice is decided by the decision unit based on the plurality of extracted addresses of the units of encoding.

* * * * *